US011847284B2

(12) United States Patent
Takahashi et al.

(10) Patent No.: US 11,847,284 B2
(45) Date of Patent: Dec. 19, 2023

(54) TRANSPARENT ELECTRODE MEMBER, MULTILAYER TRANSPARENT ELECTRODE MEMBER, AND CAPACITIVE SENSOR

(71) Applicant: Alps Alpine Co., Ltd., Tokyo (JP)

(72) Inventors: Toru Takahashi, Niigata-ken (JP); Masayoshi Takeuchi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 804 days.

(21) Appl. No.: 16/987,832

(22) Filed: Aug. 7, 2020

(65) Prior Publication Data

US 2020/0363909 A1 Nov. 19, 2020

Related U.S. Application Data

(63) Continuation of application No. PCT/JP2019/010788, filed on Mar. 15, 2019.

(30) Foreign Application Priority Data

Mar. 22, 2018 (JP) .................................. 2018-055390

(51) Int. Cl.
*G06F 3/044* (2006.01)
*H01B 5/14* (2006.01)

(52) U.S. Cl.
CPC ............. *G06F 3/0446* (2019.05); *H01B 5/14* (2013.01); *G06F 2203/04111* (2013.01)

(58) Field of Classification Search
CPC .................................. G06F 3/0446; H01B 5/14
See application file for complete search history.

(56) References Cited

U.S. PATENT DOCUMENTS

2016/0139710 A1    5/2016   Yamai et al.

FOREIGN PATENT DOCUMENTS

| JP | 2008-282924   |        | 11/2006 |
| JP | 2010-140859 A |        | 6/2010  |
| JP | 2010-157400   |        | 7/2010  |
| JP | 2010-165460   |        | 7/2010  |
| JP | 2013-152578   |        | 8/2013  |
| JP | 2015-201023 A |        | 11/2015 |

(Continued)

OTHER PUBLICATIONS

European Search Report dated Nov. 17, 2021 for Application No. 19771718.4.

(Continued)

*Primary Examiner* — Peter M Albrecht
(74) *Attorney, Agent, or Firm* — Beyer Law Group LLP

(57) ABSTRACT

A transparent electrode member includes a translucent base, and first transparent electrodes that are arranged side by side in a first direction on a first surface of the base. An insulating layer does not overlap partial regions PR when viewed in the direction of the normal to the first surface. A rectangular region in which a part other than the conductive portion is composed of the partial regions over the entire part is defined as a first rectangular region, a rectangular region in which at least the insulating layer is contained is defined as a second rectangular region, and a relationship between an area Sa of the part other than the conductive portion in the first rectangular region and an area Sb of a part other than the conductive portion in the second rectangular region satisfies Sa/Sb=1±0.3.

10 Claims, 47 Drawing Sheets

(56) References Cited

FOREIGN PATENT DOCUMENTS

| | | |
|---|---|---|
| JP | 2016-197554 A | 11/2016 |
| WO | 2015/019805 | 2/2015 |
| WO | 2015-102099 A1 | 9/2015 |

OTHER PUBLICATIONS

International Search Report dated May 14, 2019 from International Application No. PCT/JP2019/010788.

FIG. 44
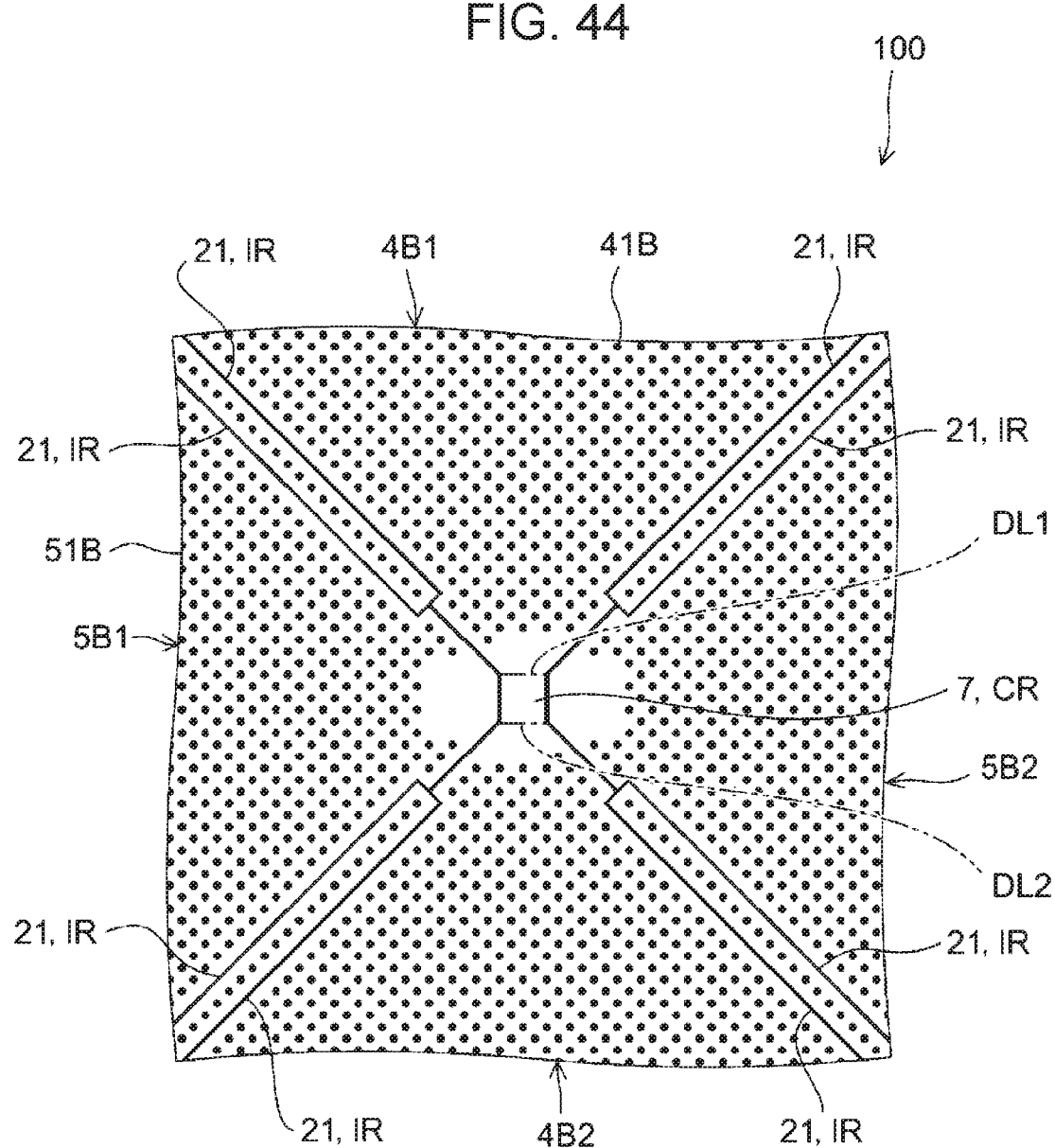
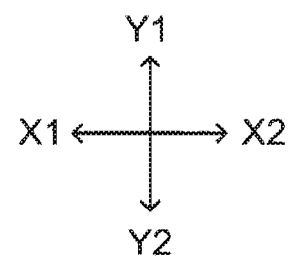

FIG. 45
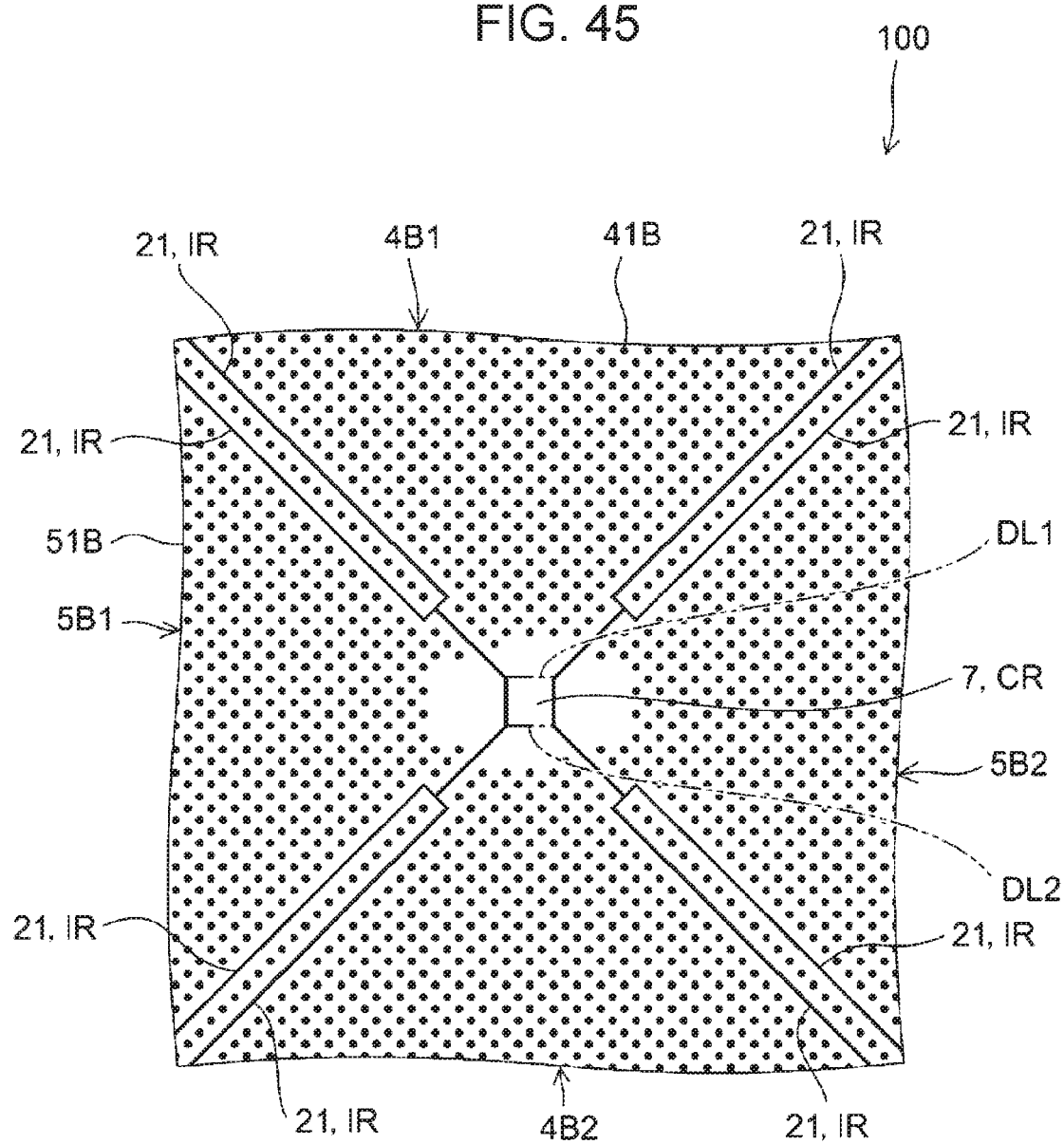
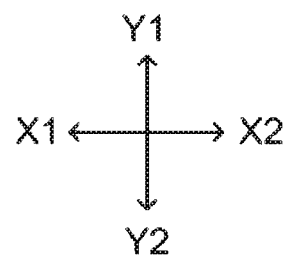

FIG. 47
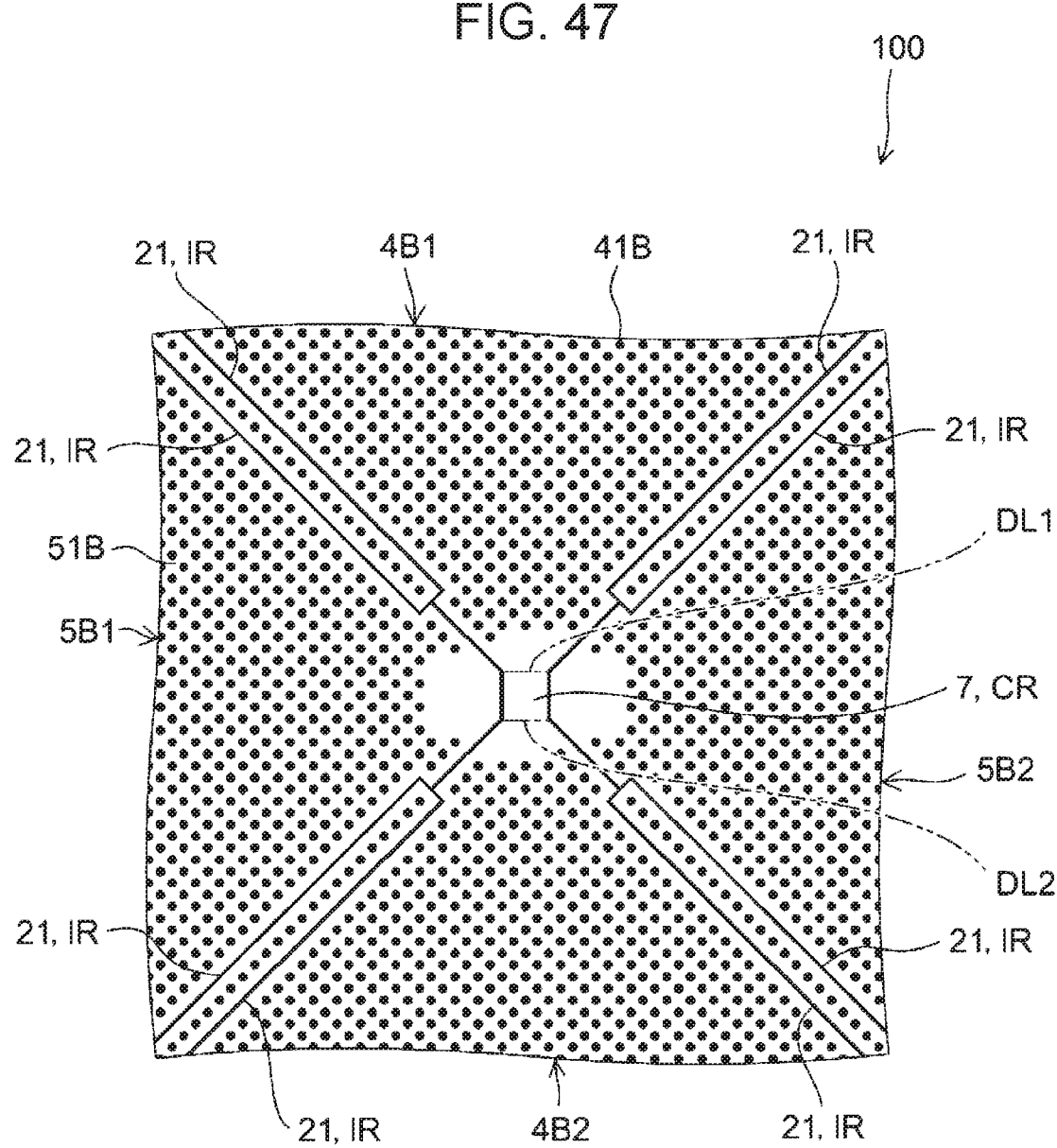
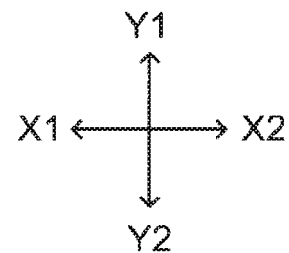

FIG. 48
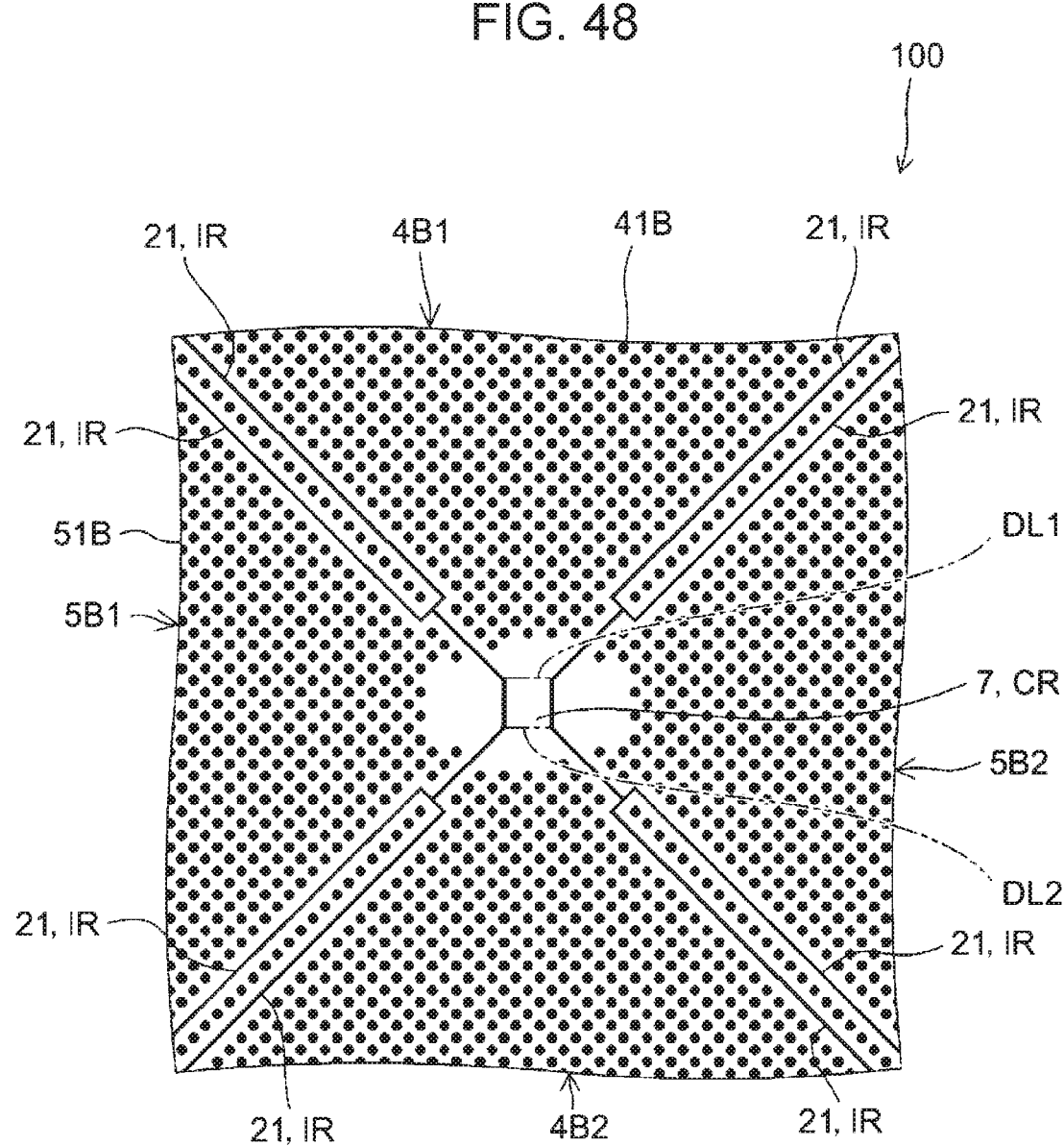
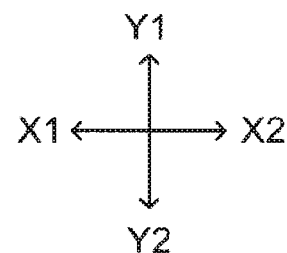

FIG. 49
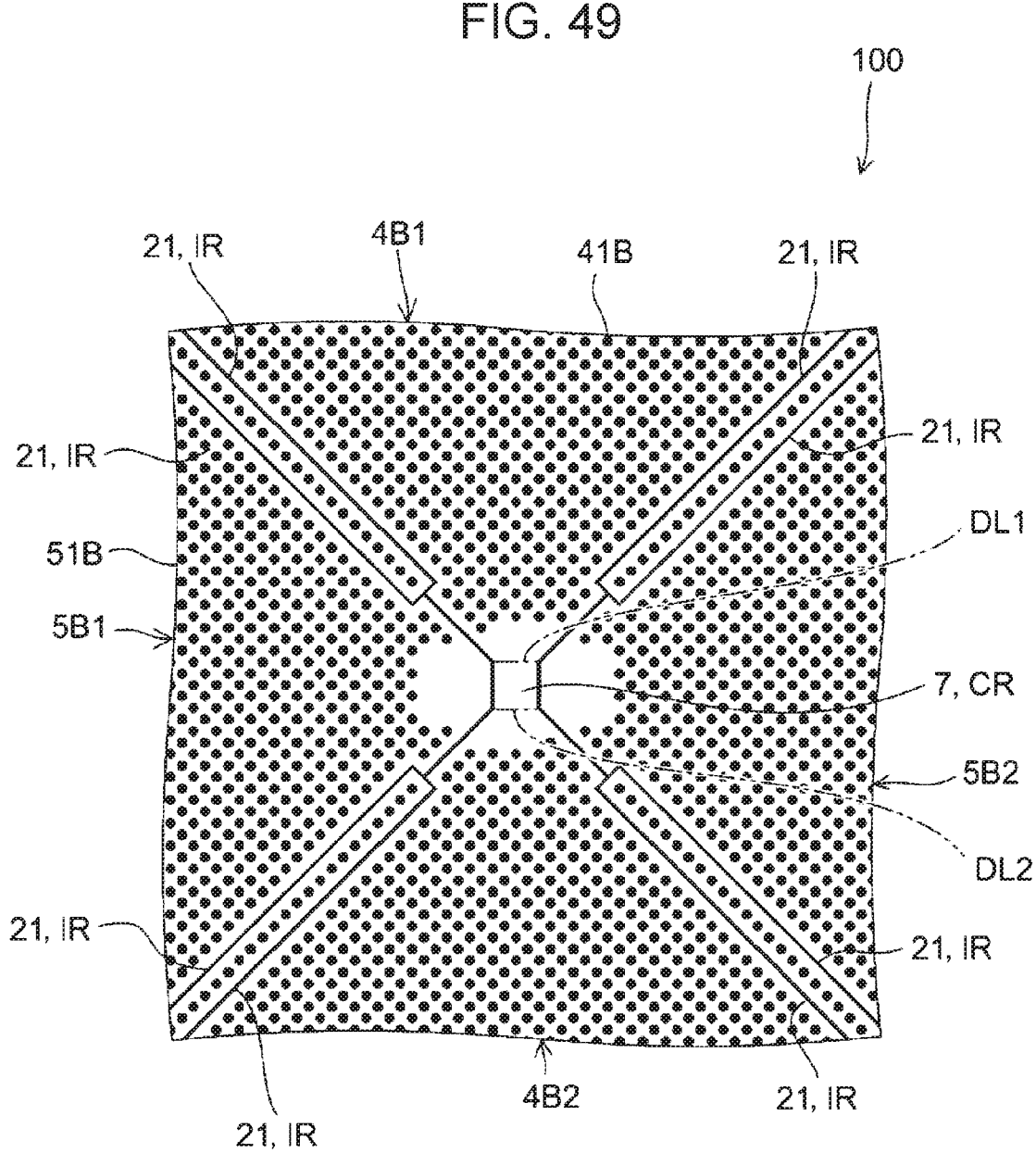
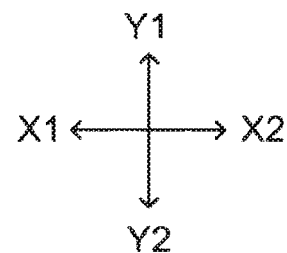

FIG. 50
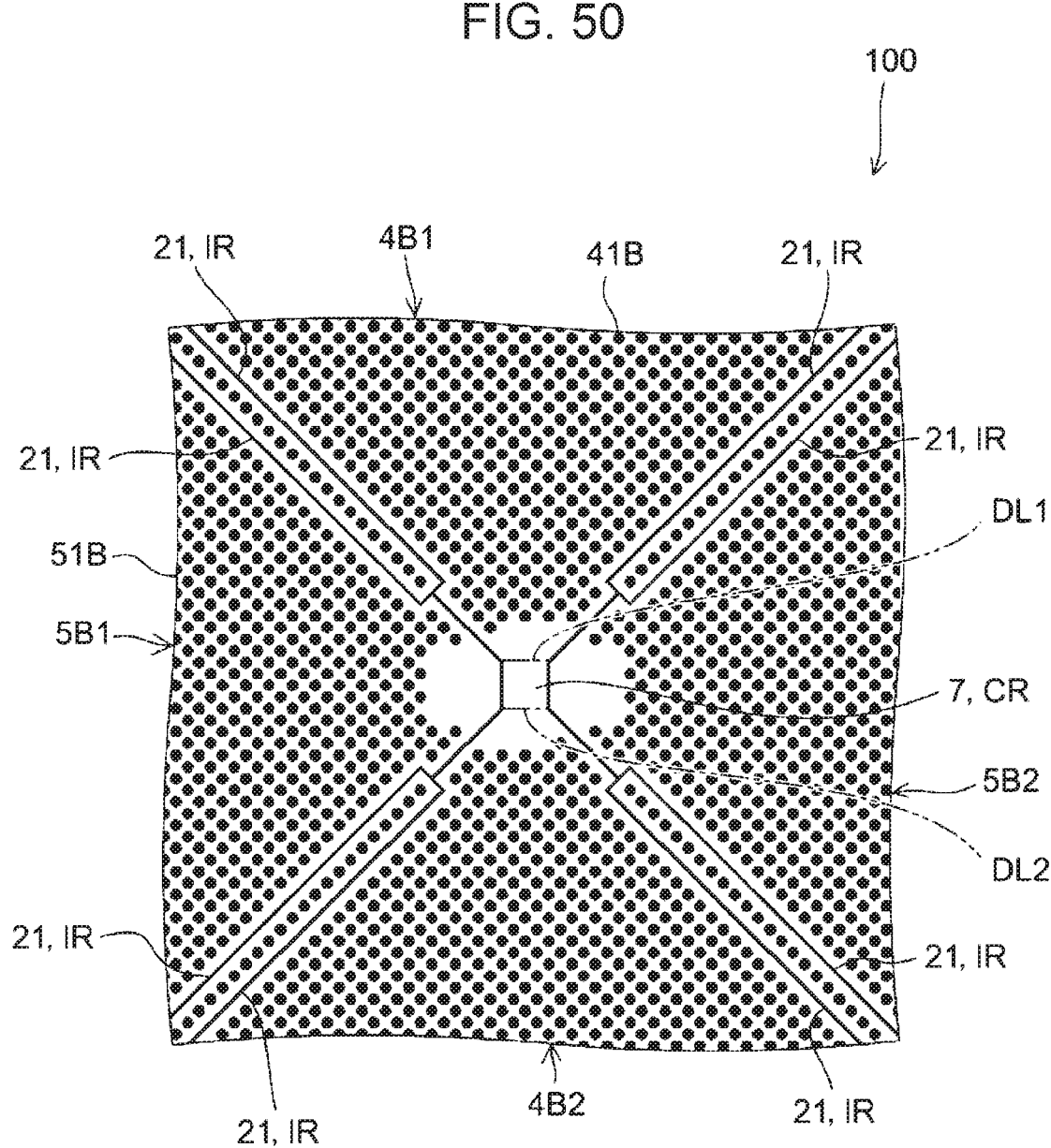
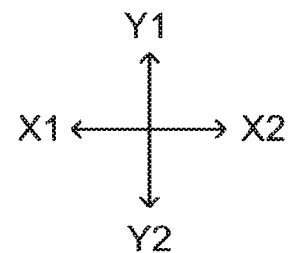

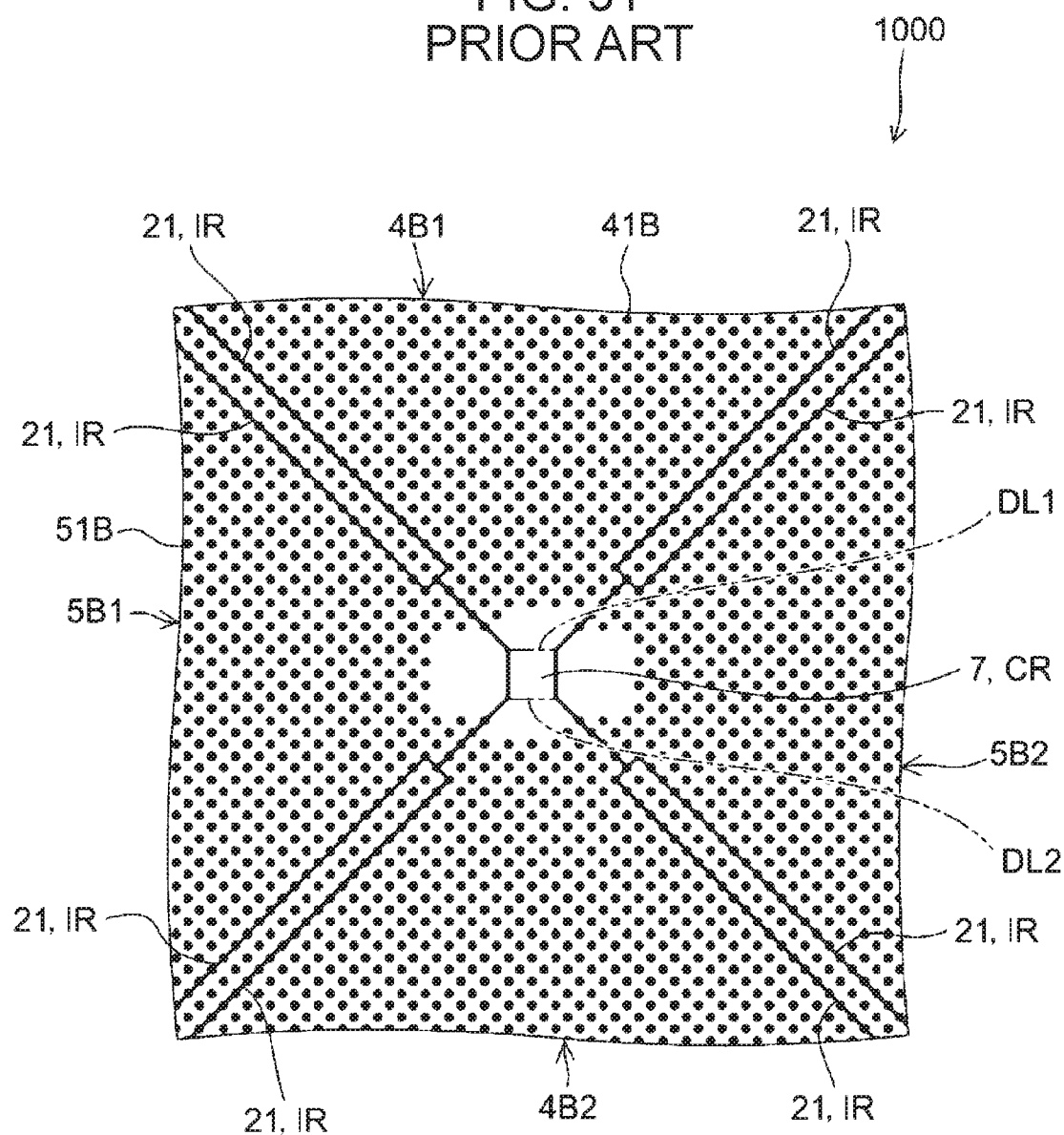
FIG. 51
PRIOR ART
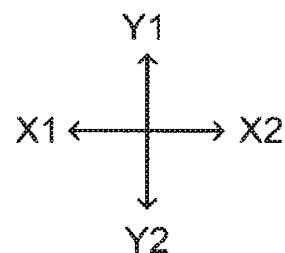

FIG. 55
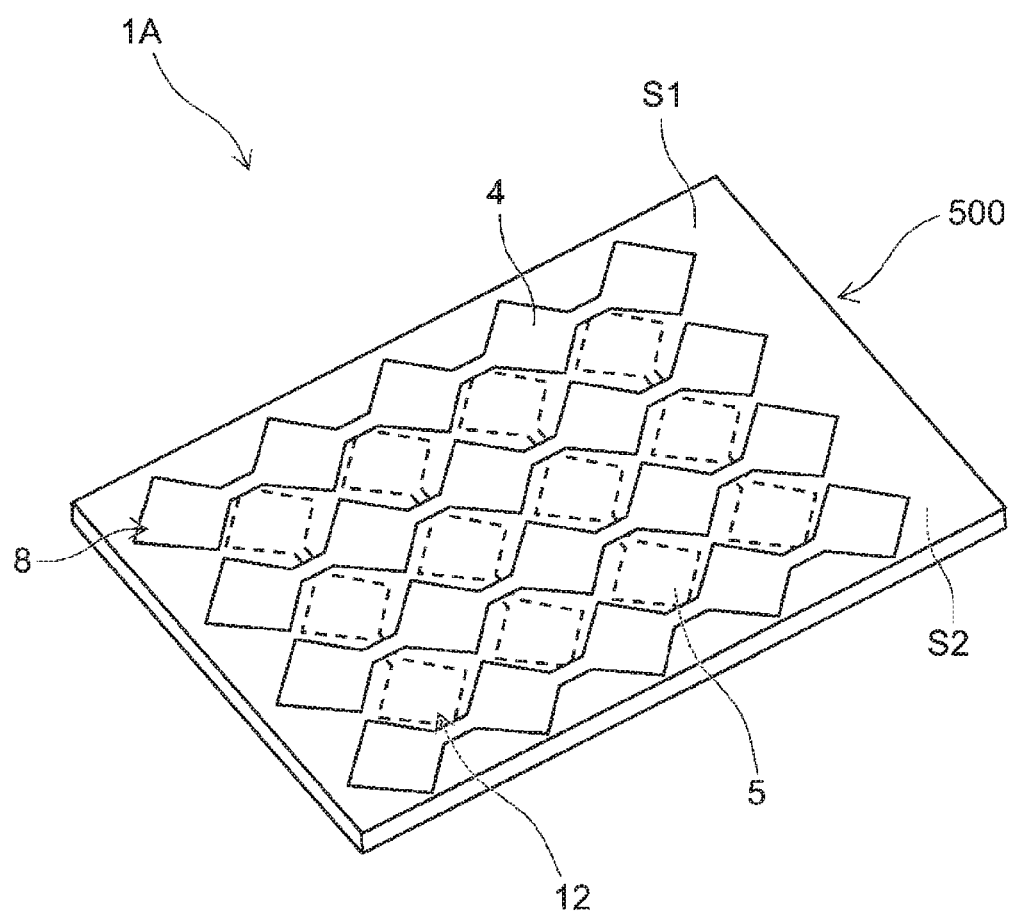
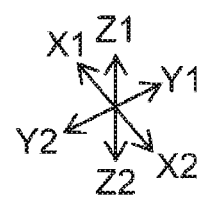

TRANSPARENT ELECTRODE MEMBER, MULTILAYER TRANSPARENT ELECTRODE MEMBER, AND CAPACITIVE SENSOR

CLAIM OF PRIORITY

This application is a Continuation of International Application No. PCT/JP2019/010788 filed on Mar. 15, 2019, which claims benefit of Japanese Patent Application No. 2018-055390 filed on Mar. 22, 2018. The entire contents of each application noted above are hereby incorporated by reference.

BACKGROUND OF THE INVENTION

1. Field of the Invention

The present invention relates to a transparent electrode member, a multilayer transparent electrode member that includes a plurality of the transparent electrode members, and a capacitive sensor that uses the transparent electrode member.

2. Description of the Related Art

A capacitive sensor includes a transparent electrode member that includes a transparent electrode to detect the position of a portion with which an operation body comes into contact without decreasing the visibility of an image that is displayed on a screen. A metal oxide material such as indium tin oxide (ITO) is typically used for the transparent electrode member.

In recent years, there has been an increasing need to increase the flexibility of a capacitive sensor (to increase resistance to bending) in order to increase the design of a device (for example, a smart phone) that includes the capacitive sensor. To fulfill the need, a proposed transparent electrode member is composed of matrix resin in which conductive nanowires such as silver nanowires disperse, instead of a metal oxide material that has been used.

In the case where the transparent electrode member that is thus composed includes a pattern portion at which a transparent electrode is disposed and a non-pattern portion (an insulating portion) at which no transparent electrode is disposed, the pattern portion and the non-pattern portion are visually divided. As the difference between the reflectance of the pattern portion and the reflectance of the non-pattern portion increases, a visual difference between the pattern portion and the non-pattern portion becomes clearer. In this case, there is a problem in that the visibility of the appearance of a display element that displays an image decreases.

To overcome the problem of decrease in the visibility of the appearance, that is, from the perspective of improvement in invisibility of the transparent electrode member, International Publication No. WO2015/019805 discloses a translucent, conductive member in which a conductive layer that includes an overcoat layer in which silver nanowires are embedded is formed on a surface of a translucent base, the conductive layer is divided into a conductive region and a nonconductive region that has a surface resistivity higher than that of the conductive region, at least some of the silver nanowires that are embedded in the overcoat layer are iodized in the nonconductive region, and silver iodide is not exposed from a surface of the overcoat layer in the nonconductive region, or the amount of the silver iodide that is exposed from the surface of the overcoat layer in the nonconductive region is smaller than the amount of the silver nanowires that are exposed from the surface of the overcoat layer in the conductive region.

Japanese Unexamined Patent Application Publication No. 2010-157400 discloses a conductive nanofiber sheet that includes a base sheet, a conductive pattern layer that is formed on the base sheet, that includes conductive nanofibers, that can be conductive via the conductive nanofibers, and that includes minute pinholes that are sized such that the minute pinholes cannot be visually recognized, and an insulating pattern layer that is formed on a portion of the base sheet at which the conductive pattern layer is not formed, that includes the conductive nanofibers, and that is insulated from the conductive pattern layer. The insulating pattern layer of the conductive nanofiber sheet disclosed in Japanese Unexamined Patent Application Publication No. 2010-157400 has narrow, small grooves having a width that cannot be visually recognized, is insulated from the conductive pattern layer due to the narrow, small grooves, and is formed into a shape of islands. Also, Japanese Unexamined Patent Application Publication No. 2013-152578 discloses a transparent, conductive element that includes a base that has a surface, and transparent conductive portions and transparent insulating portions that are alternately arranged in a planer manner on the surface and discloses that the transparent insulating portions are transparent conductive layers composed of island portions, and that the average boundary line length of the transparent conductive portions and the transparent insulating portions is 20 mm/mm$^2$ or less.

SUMMARY OF THE INVENTION

In the transparent electrode member that includes the conductive pattern layer that includes the minute pinholes and the insulating pattern layer that is isolated from the conductive pattern layer as described above, the invisibility of a pattern cannot be sufficiently achieved. That is, from the perspective of the area of the insulating pattern layer and the minute pinholes, the invisibility of the pattern cannot be sufficiently improved.

The present invention provides a transparent electrode member that enables the invisibility of the pattern of transparent electrodes to be improved, a multilayer transparent electrode member that includes a plurality of the transparent electrode members, and a capacitive sensor that includes the transparent electrode member.

A transparent electrode member according to an aspect of the present invention includes a translucent base, translucent, transparent electrodes disposed on a first surface corresponding to a surface of the base, and an insulating layer disposed in an insulating region located in at least a part of a region around a region in which the transparent electrodes are disposed when viewed in a direction of a normal to the first surface. Each transparent electrode has a dispersion layer including a matrix composed of an insulating material and conductive nanowires dispersing in the matrix. Each transparent electrode has a conductive region composed of a conductive portion and an optical adjustment region containing an optical adjustment portion when viewed in the direction of the normal to the first surface. The conductive portion has conductivity higher than that of the optical adjustment portion. A dispersion density of the conductive nanowires in the dispersion layer at the optical adjustment portion is lower than that at the conductive portion. The optical adjustment region has partial regions located at lattice points of a lattice along the first surface when viewed in the direction of the normal to the first surface. The insulating layer does not overlap the partial regions and is disposed on a line connecting some of the lattice points to each other when viewed in the direction of the normal to the first surface.

Regarding a rectangular region defined in a first method such that four adjacent lattice points of the lattice points correspond to corners thereof, or a rectangular region defined in a second method such that four adjacent lattice points of the lattice points are located around a single centered lattice point and correspond to corners thereof, or both, a rectangular region in which a part other than the conductive portion is composed of the partial regions over the entire part is defined as a first rectangular region, a rectangular region in which at least the insulating layer is contained is defined as a second rectangular region, and a relationship between an area Sa of the part other than the conductive portion in the first rectangular region and an area Sb of a part other than the conductive portion in the second rectangular region satisfies Sa/Sb=1±0.3.

In the transparent electrode member with this structure, the partial regions of the optical adjustment region are located at the lattice points of the lattice along the first surface, the insulating layer does not overlap the partial regions and is disposed on the line connecting some of the lattice points to each other, and the direction in which the partial regions are arranged and the direction in which the insulating layer extends consequently match the direction in which the lattice points are arranged. In the case of this arrangement, a relationship between the area Sa of the part other than the conductive portion in the first rectangular region in which the part other than the conductive portion is composed of the partial regions over the entire part and the area Sb of the part other than the conductive portion in the second rectangular region including at least the insulating layer satisfies Sa/Sb=1±0.3. The relationship in the arrangement of the partial regions and the insulating layer and the relationship between the areas Sa and Sb as described above are thus satisfied, and the insulating layer is consequently disposed with the same regularity regarding an appearance as that with which the partial regions are arranged, in a group of the partial regions that are regularly arranged. As a result, the partial regions and the insulating layer are difficult to visually distinguish, and the invisibility can be improved.

In the case of the rectangular region defined in the first method, Sa/Sb is preferably no less than 0.75 and no more than 1.15, more preferably no less than 0.78 and no more than 1.0 in some cases. In the case of the rectangular region defined in the second method, Sa/Sb is preferably no less than 0.8 and no more than 1.2, more preferably no less than 0.9 and no more than 1.1. Sa/Sb can be adjusted by, for example, spacing (pitch) between the lattice points, the area of the partial regions, and the minimum value (width) of the insulating layer in a direction intersecting an extension direction.

In the transparent electrode member described above, a minimum value of a length of the insulating layer in a direction intersecting an extension direction is preferably 10 μm or more when viewed in the direction of the normal to the first surface to improve the invisibility.

In the transparent electrode member described above, the partial regions are preferably separated from each other by 30 μm or more in some cases. A separation distance is equal to the widths of parts of the conductive region that are located between the optical adjustment regions that are discretely arranged and is equal to the widths of the conduction paths in the transparent electrode. The conductivity of the transparent electrode is stably inhibited from excessively decreasing with the separation distance being 30 μm or more.

In the transparent electrode member described above, the area ratio (also referred to below as an "adjustment ratio") of the optical adjustment regions in each transparent electrode is preferably 40% or less from the perspective that the dielectric breakdown resistance of the transparent electrode member is increased in some cases.

In the transparent electrode member described above, the transparent electrodes may include first transparent electrodes arranged side by side in a first direction corresponding to one of in-plane directions of the first surface and electrically connected to each other, and second transparent electrodes arranged side by side in a second direction different from the first direction, in which the transparent electrodes are arranged side by side, of the in-plane directions of the first surface and electrically connected to each other, two of the first transparent electrodes adjacent to each other in the first direction may be electrically connected to each other by using a first transparent wire located between the two of the first transparent electrodes and composed of the conductive region, and two of the second transparent electrodes adjacent to each other in the second direction may be electrically connected to each other by using a second transparent wire, and the first transparent wire and the second transparent wire may partly overlap with an insulator interposed therebetween in the direction of the normal to the first surface.

In the case where the second transparent wire is composed of a material having a resistance higher than that of the second transparent electrodes in the transparent electrode member described above, possibility that the dielectric breakdown occurs in the second transparent wire is lower than that in the first transparent wire, which is preferable.

In the case where the second transparent wire has portions stacked on the second transparent electrodes, and portions of the second transparent electrodes in contact with the second transparent wire are composed of the conductive region in the transparent electrode member described above, possibility that the dielectric breakdown occurs near the boundaries between the second transparent electrodes and the second transparent wire is reduced, which is preferable.

In the transparent electrode member described above, the base may have a sheet shape. In this case, the first surface may be one of two main surfaces of the base, and on a second surface corresponding to the other surface of the two the main surfaces, the second transparent electrodes may be arranged side by side in the second direction different from the first direction of in-plane directions of the main surfaces and may be electrically connected to each other.

According to another aspect of the present invention, a multilayer transparent electrode member that includes two of the transparent electrode members that are described above and that are stacked in the direction of the normal to the first surface is provided. The first transparent electrodes of the two of the transparent electrode members are arranged such that the first directions of the two of the transparent electrode members differ from each other.

According to another aspect of the present invention, a capacitive sensor that includes the transparent electrode member described above and a detector configured to detect a change in capacitance between an operation body such as a finger of an operator and the transparent electrodes is provided. This capacitive sensor includes the transparent electrodes having high invisibility, enables the visibility of an image that is observed by a user through the capacitive sensor to be increased, and enables display uniformity to be increased.

The present invention provides a transparent electrode member that enables the invisibility of the pattern of transparent electrodes to be improved.

BRIEF DESCRIPTION OF THE DRAWINGS

FIG. 44 is a plan view of an example of the transparent electrode member in the case where the diameter of circular partial regions is changed;

FIG. 45 is a plan view of an example of the transparent electrode member in the case where the diameter of the circular partial regions is changed;

FIG. 47 is a plan view of an example of the transparent electrode member in the case where the diameter of the circular partial regions is changed;

FIG. 48 is a plan view of an example of the transparent electrode member in the case where the diameter of the circular partial regions is changed;

FIG. 49 is a plan view of an example of the transparent electrode member in the case where the diameter of the circular partial regions is changed;

FIG. 50 is a plan view of an example of the transparent electrode member in the case where the diameter of the circular partial regions is changed;

FIG. 51 is a plan view of an example of a transparent electrode member in a reference example;

FIG. 55 illustrates the structure of a capacitive sensor according to another embodiment of the present invention.

DESCRIPTION OF THE PREFERRED EMBODIMENTS

Figure 1:
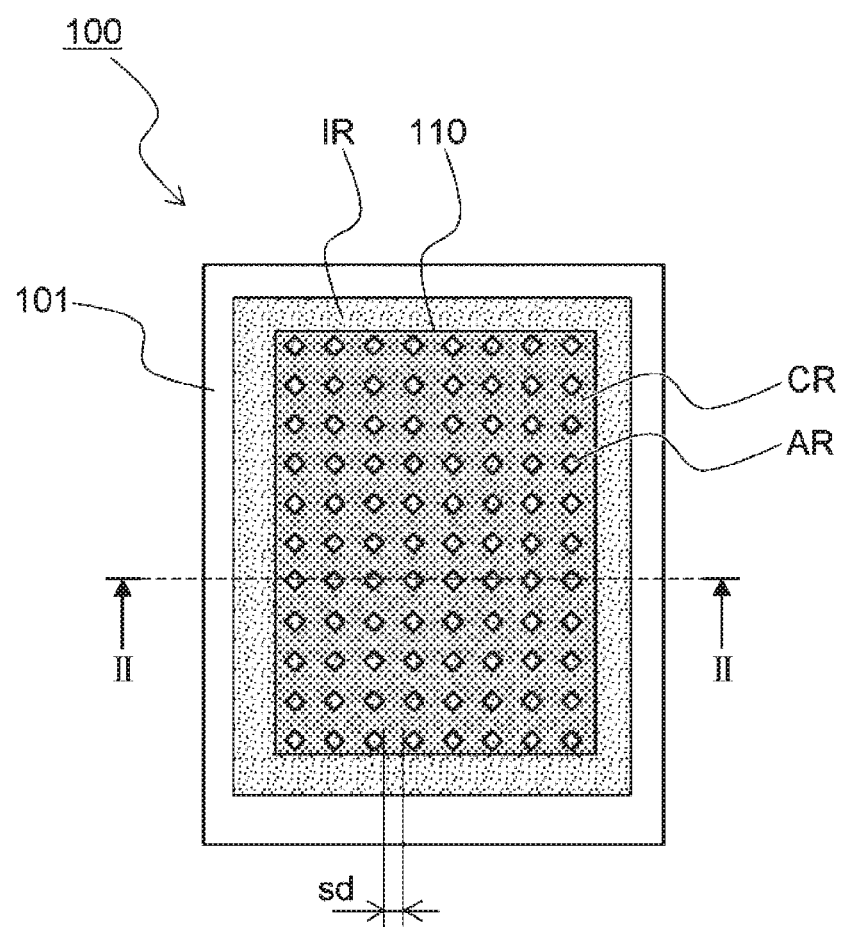
FIG. 1 is a plan view conceptually illustrating the structure of a transparent electrode member according to an embodiment of the present invention.

Embodiments of the present invention will hereinafter be described with reference to the drawings. In the drawings, like components are designated by like reference signs, and a detailed description thereof is appropriately omitted.

Figure 2:
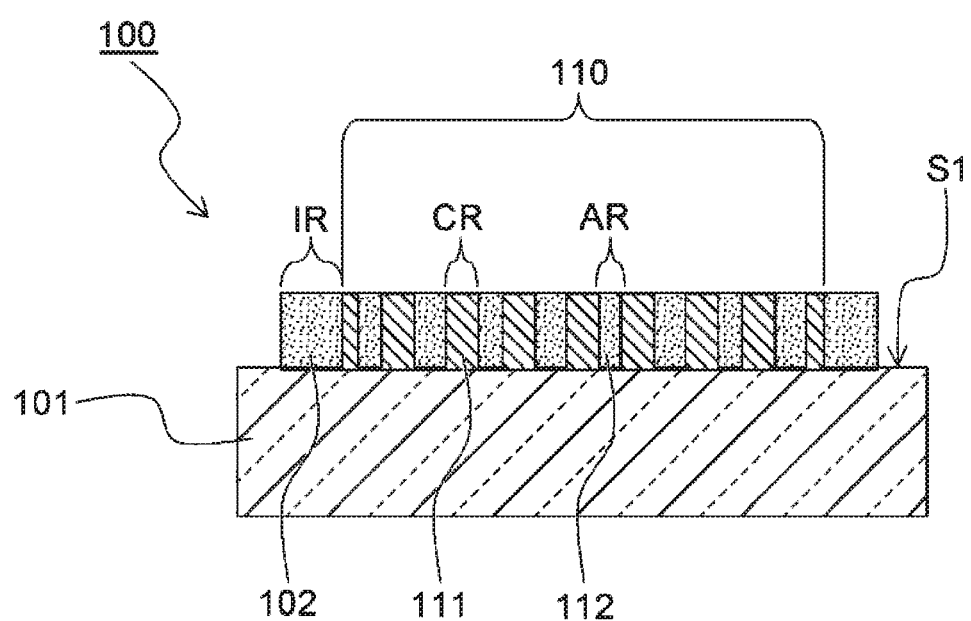
FIG. 2 is a sectional view taken along line II-II in FIG. 1.
Figure 3:
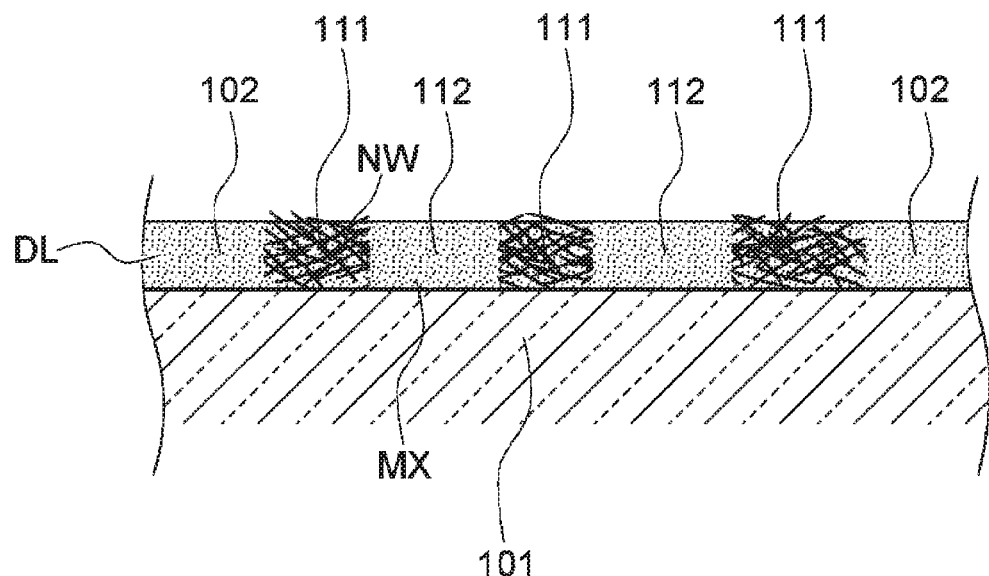
FIG. 3 is a partial, sectional view conceptually illustrating a specific example of the structure of a transparent electrode of the transparent electrode member according to an embodiment of the present invention.
Figure 4:
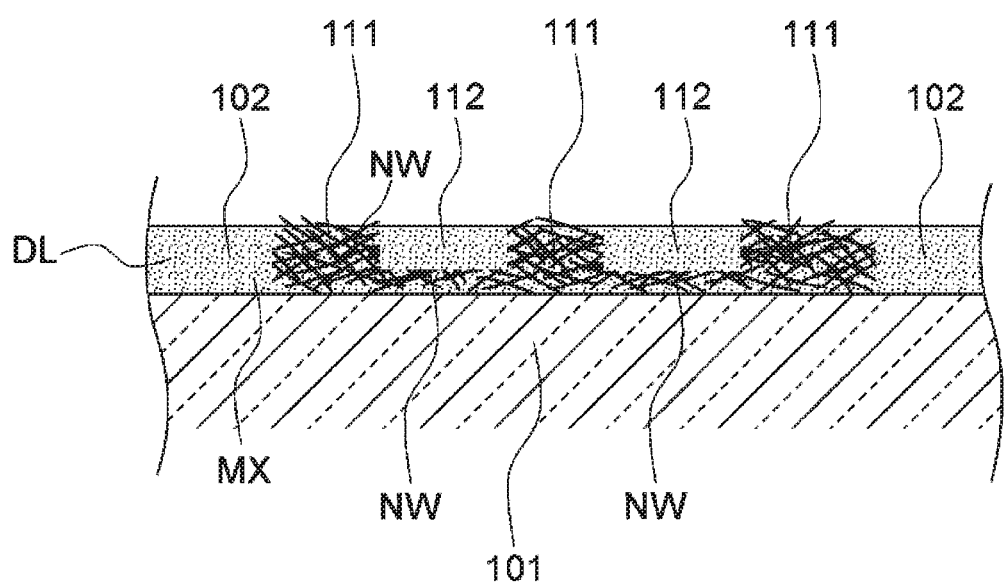
FIG. 4 is a partial, sectional view conceptually illustrating another specific example of the structure of the transparent electrode of the transparent electrode member according to an embodiment of the present invention.

FIG. 1 is a plan view conceptually illustrating the structure of a transparent electrode member according to an embodiment of the present invention. FIG. 2 is a sectional view taken along line II-II in FIG. 1. FIG. 3 is a partial, sectional view conceptually illustrating a specific example of the structure of a transparent electrode of the transparent electrode member according to an embodiment of the present invention. FIG. 4 is a partial, sectional view conceptually illustrating another specific example of the structure of the transparent electrode of the transparent electrode member according to an embodiment of the present invention.

As illustrated in FIG. 1 and FIG. 2, a transparent electrode member 100 according to an embodiment of the present invention includes a translucent base 101. In the specification, "transparent" and "translucency" indicate a state in which visible light transmittance is 50% or more (preferably, 80% or more). In addition, a haze value is preferably 6% or less. In the specification, "light shielding" and "light shielding properties" indicate a state in which the visible light transmittance is less than 50% (preferably, less than 20%). The base 101 is formed by using a film-like transparent base composed of, for example, polyethylene terephthalate (PET) or a glass base.

The transparent electrode member 100 includes a translucent, transparent electrode 110 and an insulating layer 102 that are disposed on a first surface S1 corresponding to a surface of the base 101. The insulating layer 102 is disposed in an insulating region IR located in at least a part of a region around a region in which the transparent electrode 110 is disposed when viewed in the direction of the normal to the first surface S1.

As illustrated in FIG. 3 and FIG. 4, the transparent electrode 110 has a dispersion layer DL that includes a matrix MX composed of an insulating material and conductive nanowires NW that disperse in the matrix MX. Specific examples of the insulating material of which the matrix MX is composed include polyester resin, acrylic resin, and polyurethane resin. At least one selected from the group consisting of a gold nanowire, a silver nanowire, and a copper nanowire is used as each conductive nanowire NW. The dispersibility of the conductive nanowires NW is ensured by the matrix MX. At least some of the conductive nanowires NW are in contact with each other, and conductivity in an in-plane direction of the transparent electrode 110 is consequently maintained.

As illustrated in FIG. 1 and FIG. 2, the transparent electrode 110 has a region (conductive region) CR composed of a conductive portion 111 and regions (optical adjustment regions) AR that contain optical adjustment portions 112 when viewed in the direction of the normal to the first surface S1. The conductive portion 111 has conductivity higher than that of the optical adjustment portions 112. The dispersion density of the conductive nanowires NW in the dispersion layer DL at each optical adjustment portion 112 is lower than that at the conductive portion 111.

In this structure, the conductive nanowires NW disperse in the matrix MX and are coupled with each other in the dispersion layer DL of the transparent electrode 110, and the conductivity can be consequently higher than that in the case of another transparent, conductive material, particularly, an oxide-based conductive material. The conductive nanowires NW themselves, however, are not translucent, and the reflectance of the transparent electrode 110 tends to be increase because the dispersion density of the conductive nanowires NW in the dispersion layer DL is high. That is, as for the transparent electrode 110 that has the dispersion layer DL, the dispersion density of the conductive nanowires NW affects both of the conductivity and the reflectance, and there is a trade-off between increase in the conductivity and decrease in the reflectance. In view of this, the transparent electrode 110 has the conductive region CR that has relatively high conductivity and the optical adjustment regions AR that have relatively low reflectance. This enables the reflectance to be decreased with the conductivity of the transparent electrode 110 being maintained and enables the invisibility of the transparent electrode 110 to be improved.

Optical properties (for example, a refractive index) other than the reflectance do not greatly differ from those in the case where a transparent electrode has through-holes as disclosed in Japanese Unexamined Patent Application Publication No. 2010-157400 and Japanese Unexamined Patent Application Publication No. 2013-152578, and the reflectance of the optical adjustment regions AR can be lower than the reflectance of the conductive region CR. Accordingly, for example, in the case where an image is visually recognized through the transparent electrode member 100, the display uniformity of the image can be increased. Appropriate control of the structure of the optical adjustment regions AR enables the conductivity of the optical adjustment regions AR to be higher than that of through-holes in the case where the through-holes are formed in the transparent electrode 110. In this case, the conductivity of the entire transparent electrode 110 can be increased, and the area ratio of the optical adjustment regions AR in the transparent electrode 110 can be increased. Accordingly, providing the optical adjustment regions AR enables the conductivity of the transparent electrode 110 to be greatly increased and enables the invisibility to be greatly improved as compared with the case where the through-holes are formed.

The reflectance of the insulating region IR is preferably lower than the reflectance of the conductive region CR. In this case, the difference in the reflectance between the insulating region IR and the transparent electrode 110, which has the optical adjustment regions AR and hence has a decreased reflectance as a whole, is smaller than that in the case where the optical adjustment portions 112 are not provided. Accordingly, the boundary between the transparent electrode 110 and the insulating region IR is difficult to visually recognize, and the invisibility of the transparent electrode 110 can be improved.

The insulating layer 102 that is disposed in the insulating region IR preferably includes a matrix MX corresponding to one of components of the dispersion layer DL. In this case, since the common matrices MX are contained, the optical properties (for example, the refractive index) of the optical adjustment portions 112 other than the reflectance are similar to the optical properties of the insulating layer 102. For this reason, for example, in the case where an image is visually recognized through the transparent electrode member 100, the display uniformity of the image is likely to be increased, and the invisibility of the transparent electrode 110 can be more stably improved.

In the transparent electrode member 100, the dispersion density of the conductive nanowires NW in the dispersion layer DL at each optical adjustment portion 112 may be decreased to such an extent that insulation properties are exhibited. FIG. 3 illustrates a specific example of this structure (a first structure) where there are substantially no conductive nanowires NW in the dispersion layer DL at each optical adjustment portion 112, and the dispersion layer DL is composed of the matrix MX. In this case, there are substantially no conductive nanowires NW, which are materials to increase the reflectance, and the reflectance of the optical adjustment portions 112 is consequently particularly low. As illustrated in FIG. 3, the insulating layer 102 that is disposed in the insulating region IR of the transparent electrode member 100 is composed of the matrix MX as in the dispersion layer DL at each optical adjustment portion 112. In this case, in the transparent electrode member 100, members that are disposed in low reflectance regions (the insulating region IR and the optical adjustment regions AR) that are located around the conductive region CR are composed of common materials (the matrices MX). With this structure, the reflectance of the entire transparent electrode 110 is particularly low, and the invisibility of the transparent electrode 110 is more stably improved.

In FIG. 3, there are substantially no conductive nanowires NW in the insulating layer 102 or in the optical adjustment portions 112, and each of these is composed of the matrix MX but is not limited thereto. Provided that the insulating layer 102 and the optical adjustment portions 112 have appropriately decreased conductivity, are nonconductive, and fulfill an insulating function, conductive nanowires NW or a substance based on these may still disperse in the matrices MX.

In the transparent electrode member 100, the optical adjustment portions 112 may have conductivity higher than that of the insulating layer 102. FIG. 4 illustrates a specific example of this structure (a second structure) where the dispersion density of conductive nanowires NW in the dispersion layer DL at a portion of each optical adjustment portion 112 distal from the base 101 (a portion facing a user) is low, and the dispersion density of conductive nanowires NW at a portion thereof (a portion facing the base 101) proximal to the base 101 is high. Among the conductive nanowires NW that disperse in the dispersion layer DL, exposed conductive nanowires NW are easiest to visually recognize. In the case where the dispersion layer DL at each optical adjustment portion 112 has the structure illustrated in FIG. 4, the visibility of the optical adjustment portions 112 can be appropriately decreased. Moreover, because of the conductive nanowires NW in the portion proximal to the base 101, a certain extent of the conductivity can be maintained although the conductivity is lower than that in the dispersion layer DL at the conductive portion 111.

Accordingly, in the case where the dispersion layer DL at each optical adjustment portion 112 has the structure illustrated in FIG. 4, the conductivity of the entire transparent electrode 110 can be increased. In this case, the difference between the dispersion density of the conductive nanowires NW in the dispersion layer DL at each optical adjustment portion 112 and the dispersion density of the conductive nanowires NW in the dispersion layer DL at the conductive portion 111 is relatively small, and a pattern that is formed by each optical adjustment portion 112 and the conductive portion 111 in the transparent electrode 110 is difficult to visually recognize.

In FIG. 4, the dispersion density of the conductive nanowires NW varies in the direction of the normal to the first surface S1 as for the optical adjustment portions 112, which are not limited thereto. Provided that the insulating layer 102 and the optical adjustment portions 112 have appropriately decreased conductivity, are nonconductive, and fulfill an insulating function, conductive nanowires NW or a substance based on these may still disperse in the matrices MX.

As illustrated in FIG. 1, in the transparent electrode member 100, the optical adjustment regions AR are located within the conductive region CR. In the case of this structure, the optical adjustment regions AR are not in direct contact with the insulating region IR. For this reason, the conductive region CR enables conduction paths to be appropriately formed in the transparent electrode 110, and the conductivity of the transparent electrode 110 is inhibited from decreasing. In some cases where the optical adjustment regions AR have a part in direct contact with the insulating region IR, the conduction paths that are formed in the transparent electrode 110 meander. In this case, the conductivity of the transparent electrode 110 decreases. Also, in some cases where the optical adjustment regions AR have a part in direct contact with the insulating region IR, the invisibility decreases as described later.

In the transparent electrode member 100, the area ratio (the adjustment ratio) of the optical adjustment regions AR is not limited. In some cases, the adjustment ratio is preferably 40% or less as described later. The conductivity of the optical adjustment portions 112 tends to relatively decrease as a result of a trade-off of decrease in the reflectance. The transparent electrode member 100 according to an embodiment of the present invention, however, can ensure the conductivity required for the transparent electrode 110 even in some cases where the adjustment ratio is increased to about 40%, and the invisibility of the transparent electrode 110 is improved.

In the transparent electrode 110 according to an embodiment of the present invention, the optical adjustment regions AR include partial regions that are discretely located within the conductive region CR. In the case where the conductive region CR and the optical adjustment regions AR having relatively different translucency have respective large patterns, there is a concern that the visibility of each pattern increases depending on the shape of the pattern. In the case where the optical adjustment portions 112, which have relatively low conductivity, are located so as to gather in the transparent electrode 110, there is a possibility that a conduction path that meanders in the transparent electrode 110 is formed. In this case, the conductivity of the transparent electrode 110 decreases.

Accordingly, as a result of discretely arranging the partial regions (that is, the optical adjustment regions AR) composed of the optical adjustment portions 112 having relatively low conductivity within the conductive region CR as described above, a pattern that is easy to visually recognize is inhibited from being formed in the transparent electrode 110, and the conductivity is inhibited from substantially decreasing. In some cases where a plurality of the transparent electrodes 110 is disposed with the insulating regions IR interposed therebetween as described later, the reflectance of the insulating regions IR that are located between the plurality of the transparent electrodes 110 differs from the reflectance of the conductive portions 111 of the transparent electrodes 110, and this increases the visibility of the insulating regions IR. Even in these cases, since the optical adjustment regions AR are discretely arranged within the conductive regions CR of the transparent electrodes 110, the invisibility of the transparent electrodes 110 at least parts of which are surrounded by the insulating regions can be increased.

In some cases, the partial regions that are included in the optical adjustment regions AR are preferably separated from each other by 30 μm or more. A separation distance sd is equal to the widths of parts of the conductive region CR that is located between the optical adjustment portions 112 that are discretely arranged and is equal to the widths of the conduction paths in the transparent electrode 110. Accordingly, the conductivity of the transparent electrode 110 is stably inhibited from decreasing with the separation distance sd being 30 μm or more.

In the case where the optical adjustment regions AR are discretely arranged, the shape of each partial region (each optical adjustment region AR) is circular, and the diameter of a circle may be no less than 10 μm and no more than 100 μm. From the perspective that the invisibility of the transparent electrode 110 is more stably improved, the shape of each partial region (each optical adjustment region AR) described above is preferably uniform in the transparent electrode 110. In the case where the shape of each partial region (each optical adjustment region AR) is circular, and the diameter thereof is in the above range, it is easy for the separation distance between each partial region (each optical adjustment region AR) to be 30 μm or more with the adjustment ratio being 40% or less.

The shape of each partial region (each optical adjustment region AR) described above may not be circular but may be quadrilateral. In this case, the length of the longest diagonal of the diagonals of a quadrilateral is preferably no less than 10 μm and no more than 100 μm for the same reason as described above.

As illustrated in FIG. 1, in the case where the partial regions (the optical adjustment regions AR) are arranged over the entire transparent electrode 110, the reflectance of the entire transparent electrode 110 is unlikely to vary, and the invisibility of the transparent electrode 110 is likely to improve, which is preferable.

Figure 5:
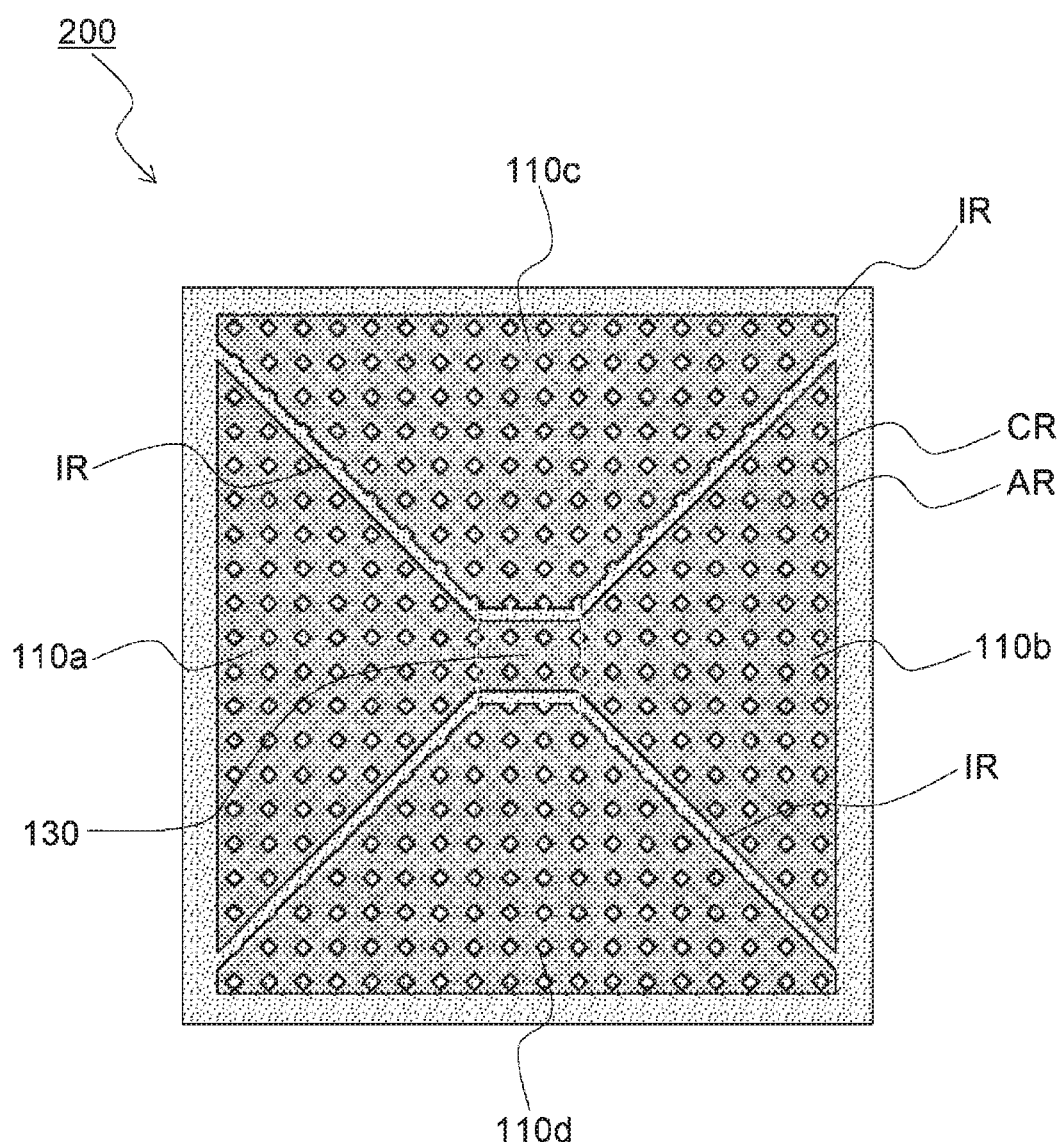
FIG. 5 is a plan view conceptually illustrating the structure of an example of a transparent electrode member that includes transparent electrodes.

FIG. 5 is a plan view conceptually illustrating the structure of an example of a transparent electrode member that includes transparent electrodes. A transparent electrode member 200 illustrated in FIG. 5 includes transparent electrodes 110a to 110d. The insulating regions IR are located in at least a part of regions around the transparent electrodes 110a to 110d, and both of the transparent electrode 110a and the transparent electrode 110b, the transparent electrode 110c, and the transparent electrode 110d are electrically isolated from each other. Specifically, one of the insulating regions IR is located between both of the transparent electrode 110a and transparent electrode 110b and the transparent electrode 110c, and another insulating region IR is located between both of the transparent electrode 110a and the transparent electrode 110b and the transparent electrode 110d. A transparent wire 130 composed of a translucent material is located between the transparent electrode 110a and the transparent electrode 110b and electrically connects the transparent electrode 110a and the transparent electrode 110b to each other. In the transparent electrode member 200, the transparent wire 130 is formed by using a dispersion layer DL as in the transparent electrode 110a and the transparent electrode 110b and has a conductive region CR and optical adjustment regions AR.

Figure 6:
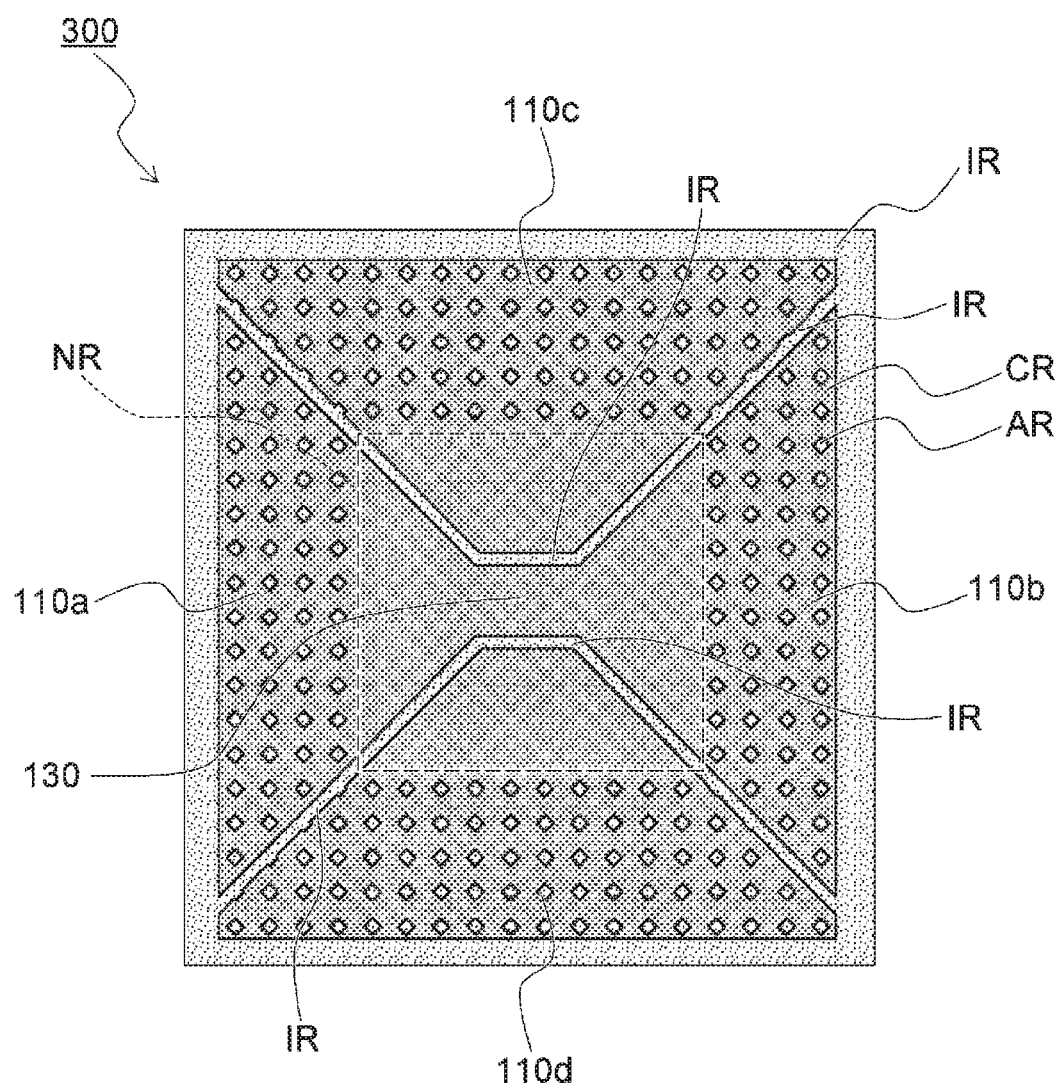
FIG. 6 is a plan view conceptually illustrating the structure of an example of a transparent electrode member according to an embodiment of the present invention corresponding to another example of the transparent electrode member that includes the transparent electrodes.

As for the transparent electrode member 200, the first surface S1 has regions composed of the transparent electrodes 110a to 110d and regions composed of the insulating regions IR and the transparent wire 130. Also, in this case, the translucency of the transparent electrodes 110a to 110d is appropriately increased, and a pattern based on these regions is difficult to visually recognize. As illustrated in FIG. 6, even when the transparent wire 130 has no optical adjustment regions AR, the visibility can be less affected if the area of the transparent wire 130 is appropriately small. Specifically, the length (width) of the transparent wire 130 in the direction of a short axis is preferably shorter than the lengths of the transparent electrodes (the transparent electrode 110a and the transparent electrode 110b) connected thereto in this direction.

FIG. 6 is a plan view conceptually illustrating the structure of an example of a transparent electrode member according to an embodiment of the present invention corresponding to another example of the transparent electrode member that includes the transparent electrodes. As illustrated in FIG. 6, the transparent electrodes 110a to 110d of a transparent electrode member 300 have a non-adjustment region NR in which no optical adjustment portions 112 are disposed in a region that is located around the transparent wire 130. The insulating regions IR are likely to be relatively dense in the region around a region in which the transparent wire 130 is disposed. Since the insulating layers 102 that are located in the insulating regions IR are composed of the matrices MX, the reflectance of the insulating layers 102 is lower than the reflectance of the conductive portions 111. For this reason, even when portions of the transparent electrodes 110a to 110d that are located in the region around the transparent wire 130 are not the optical adjustment portions 112, and the reflectance of the transparent electrodes 110a to 110d in the region is not actively decreased, the reflectance of the region is lower than that of the other regions. Accordingly, the non-adjustment region NR may be contained in the region around the transparent wire 130. The optical adjustment portions 112 have relatively low conductivity. There is a tendency that electric charge is likely to concentrate in the region around the transparent wire 130 during use. For this reason, the non-adjustment region NR is provided, and possibility that the occurrence of a failure such as cutting of the conductive nanowires NW by melting due to the concentration of the electric charge can be consequently reduced.

A method of manufacturing a transparent electrode member according to an embodiment of the present invention is not limited. In some cases where a manufacturing method described below is used, a transparent electrode member according to an embodiment of the present invention can be efficiently manufactured, and a high-quality transparent electrode member can be manufactured.

An example of a method of manufacturing a transparent electrode member according to an embodiment of the present invention is a method of manufacturing the transparent electrode member 100 having the first structure described above.

Figure 7:
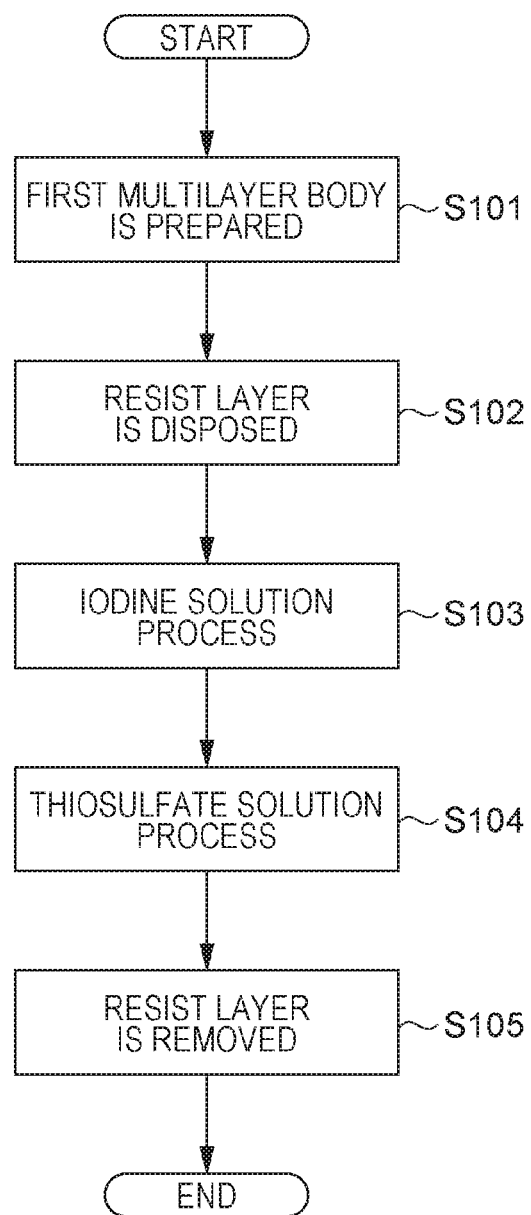
FIG. 7 is the flowchart of a method of manufacturing a transparent electrode member having a first structure.
Figure 8:
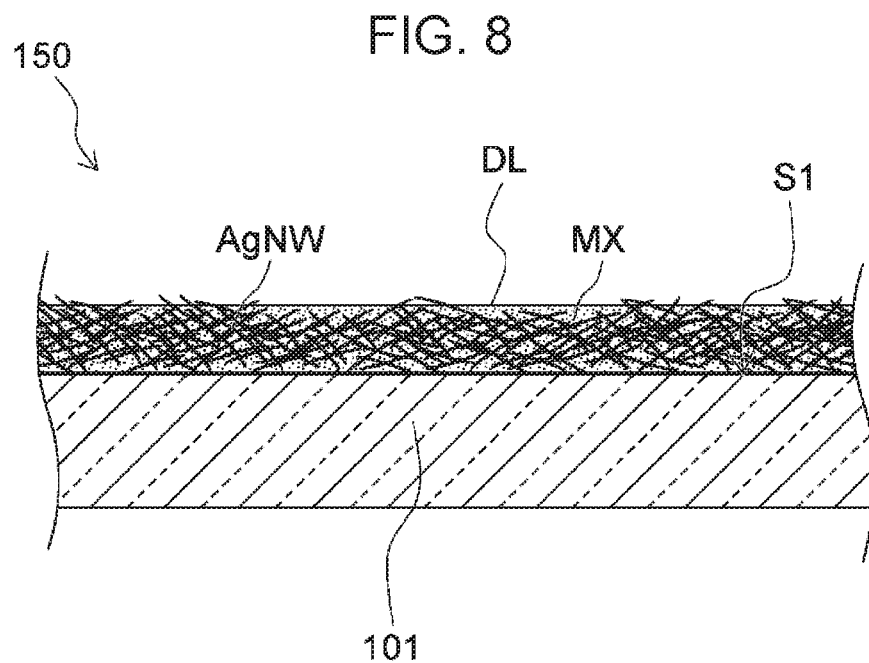
FIG. 8 is a sectional view conceptually illustrating a state in which a first multilayer body is prepared.
Figure 9:
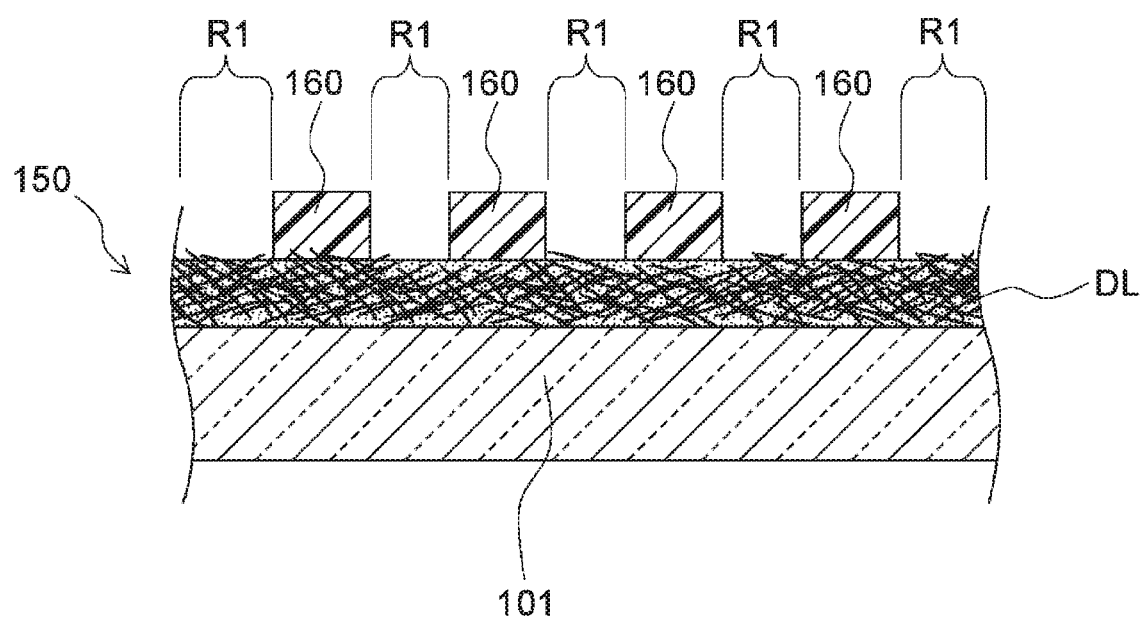
FIG. 9 is a sectional view conceptually illustrating a state in which a resist layer is disposed on the first multilayer body.
Figure 10:
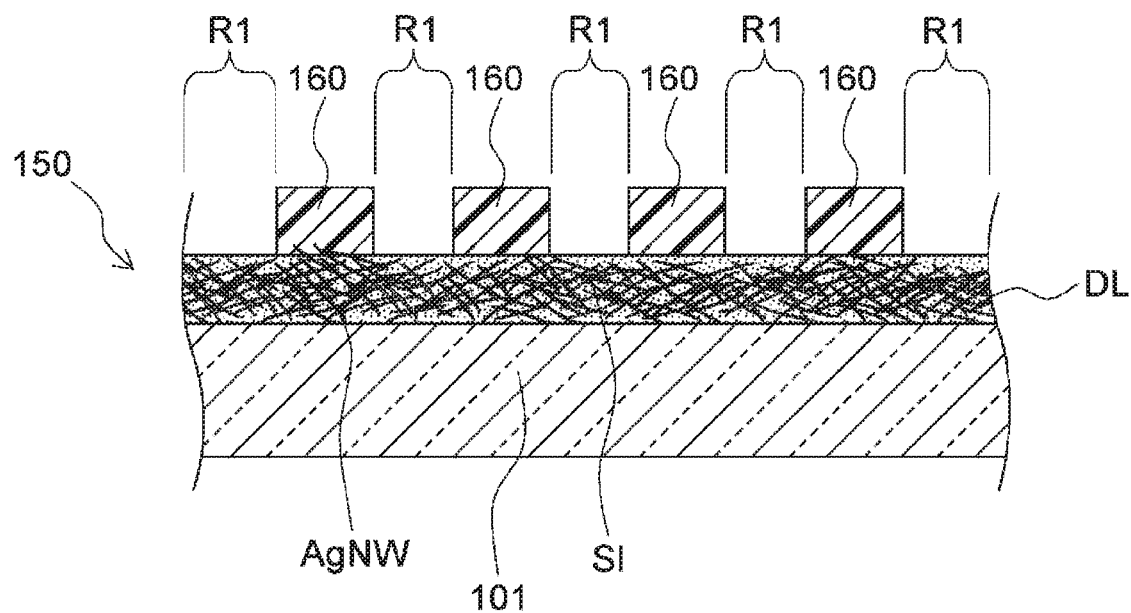
FIG. 10 is a sectional view conceptually illustrating a state in which a process is performed by using an iodine solution.
Figure 11:
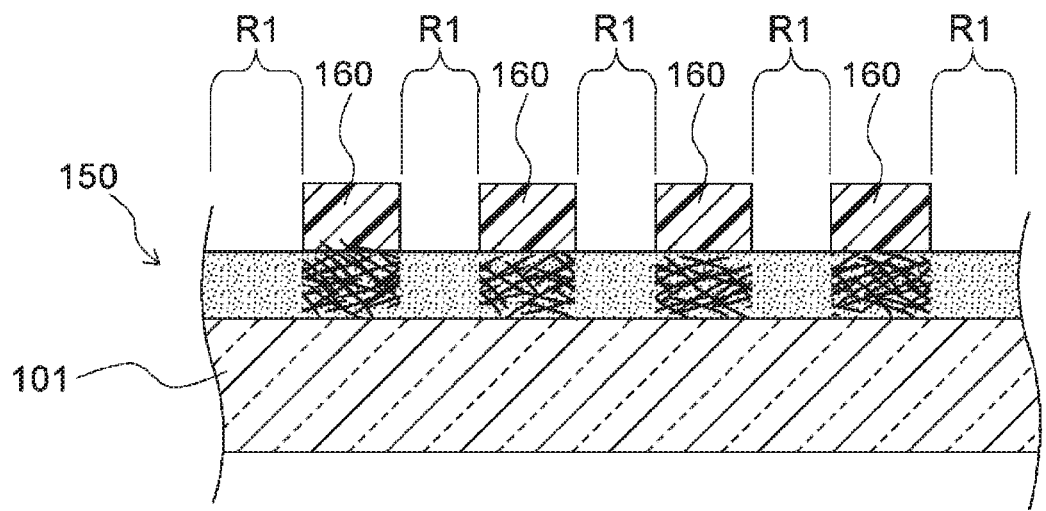
FIG. 11 is a sectional view conceptually illustrating a state in which a process is performed by using a thiosulfate solution.
Figure 12:
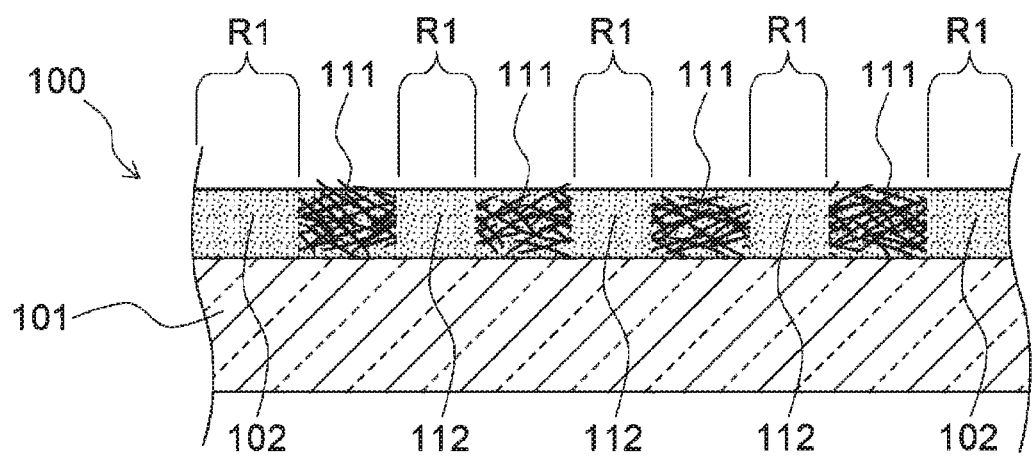
FIG. 12 is a sectional view conceptually illustrating a state in which the resist layer is removed.

FIG. 7 is the flowchart of the method of manufacturing the transparent electrode member having the first structure. FIG. 8 is a sectional view conceptually illustrating a state in which a first multilayer body is prepared. FIG. 9 is a sectional view conceptually illustrating a state in which a resist layer is disposed on the first multilayer body. FIG. 10 is a sectional view conceptually illustrating a state in which a process is performed by using an iodine solution. FIG. 11 is a sectional view conceptually illustrating a state in which a process is performed by using a thiosulfate solution. FIG. 12 is a sectional view conceptually illustrating a state in which the resist layer is removed.

As illustrated in FIG. 8, a first multilayer body 150 that has a layer of a matrix MX in which silver nanowires AgNW, which are a kind of the conductive nanowires NW, disperse that is stacked, as the dispersion layer DL, on the first surface S1 of the base 101 is first prepared (S101). The dispersion density of the silver nanowires AgNW in the dispersion layer DL over the entire region is equal to the dispersion density of the silver nanowires AgNW of the conductive portion 111 of the transparent electrode member 100 that is finally obtained.

Subsequently, a portion of the dispersion layer DL of the first multilayer body 150 is covered by a resist layer 160 (S102). A positive or negative photoresist or film resist is formed on the dispersion layer DL. The photoresist is formed by one of various methods such as a spin coating method and a roll coating method such that a film thickness becomes about 1 μm to 5 μm. In the case where the film resist is used, the film thickness is about 20 μm. The photoresist is party exposed to light by using a mask and an exposure device. In a subsequent process of development, a conductive layer exposed to the light is developed by using an alkaline solution such as TMAH such that the resist layer 160 partly remains as illustrated in FIG. 9.

Subsequently, first regions R1 of the dispersion layer DL that are not covered by the resist layer 160 are processed by using an iodine solution (S103). Through this process, as illustrated in FIG. 10, at least some of the silver nanowires AgNW in the first regions R1 are iodized and become silver iodide SI, and portions of the dispersion layer DL that are located in the first regions R1 have insulation properties.

The iodine solution that is used in this process is iodine iodized salt solution, an example of which is iodine potassium iodide solution. In the iodine potassium iodide solution, iodine is dissolved in a potassium iodide solution. A solution that contains 0.05 to 1.0 mass % iodine and 0.1 to 5.0 mass % potassium iodide is used.

The first multilayer body 150 that has the resist layer 160 is immersed in the iodine potassium iodide solution for about 0.5 to 10 minutes, the solution consequently soaks into the dispersion layer DL from the regions that are not covered by the resist layer 160, and at least some of the silver nanowires AgNW are iodized and transformed into silver iodide SI.

In the first regions R1, the silver nanowires AgNW are iodized, and the sheet resistivity of the dispersion layer DL in the regions consequently increases, and an electrically insulating function can be substantially fulfilled in this state. However, when the process is performed by using the iodine potassium iodide solution, the silver nanowires AgNW in the dispersion layer DL in the first regions R1 are iodized and become cloudy or a whitened metal compound (containing the silver iodide SI) is generated.

In view of this, the first regions R1 are processed by using a thiosulfate solution (S104). Through this process, as illustrated in FIG. 11, at least a part of the silver iodide SI is removed from the first regions R1. A sodium thiosulfate solution having a concentration of 1.0 to 25 mass % is used as the thiosulfate solution. The first multilayer body 150 that is covered by the resist layer 160 is immersed in the sodium thiosulfate solution for about 10 to 60 seconds to remove the metal compound such as silver iodide SI that is contained in the dispersion layer DL in the first regions R1. As a result, the translucency of the portions of the dispersion layer DL that are located in the first regions R1 increases. In some cases, the silver iodide SI that is exposed from the surface of the dispersion layer DL returns to silver by being exposed to oxygen for a long time. When the silver iodide SI thus returns to silver, the reflectance of the optical adjustment portions 112 becomes equal to the reflectance of the conductive portion 111, and the optical adjustment function of the optical adjustment regions AR in which the optical adjustment portions 112 are located declines. If the silver nanowires AgNW that become cloudy or whitened when being are iodized as described above, the obtained silver iodide SI is conspicuous in comparison with the silver nanowires AgNW. Accordingly, the process described above is preferably performed to remove the metal compound such as silver iodide SI that is located near the surfaces of the portions of the dispersion layer DL that are located in the first regions R1.

Finally, the resist layer 160 is removed by using a resist stripper solution (S105). As a result, as illustrated in FIG. 12, the transparent electrode member 100 that includes the insulating layer 102 and the optical adjustment portions 112 having the insulation properties in the first regions R1 and that includes the conductive portion 111 in the region that used to be covered by the resist layer 160 is obtained.

The use of this manufacturing method enables the insulating layer 102 and the optical adjustment portions 112 to be manufactured by onetime resist working. Accordingly, the transparent electrode member 100 can be efficiently manufactured. In the transparent electrode member 100 having the first structure, the optical properties of the insulating layer 102 are the same as those of the optical adjustment portions 112. For this reason, a pattern that is formed by the transparent electrode 110 and the insulating region IR is difficult to visually recognize. Accordingly, the transparent electrode member 100 that is manufactured by the manufacturing method described above has particularly high invisibility in some cases.

Figure 36A:
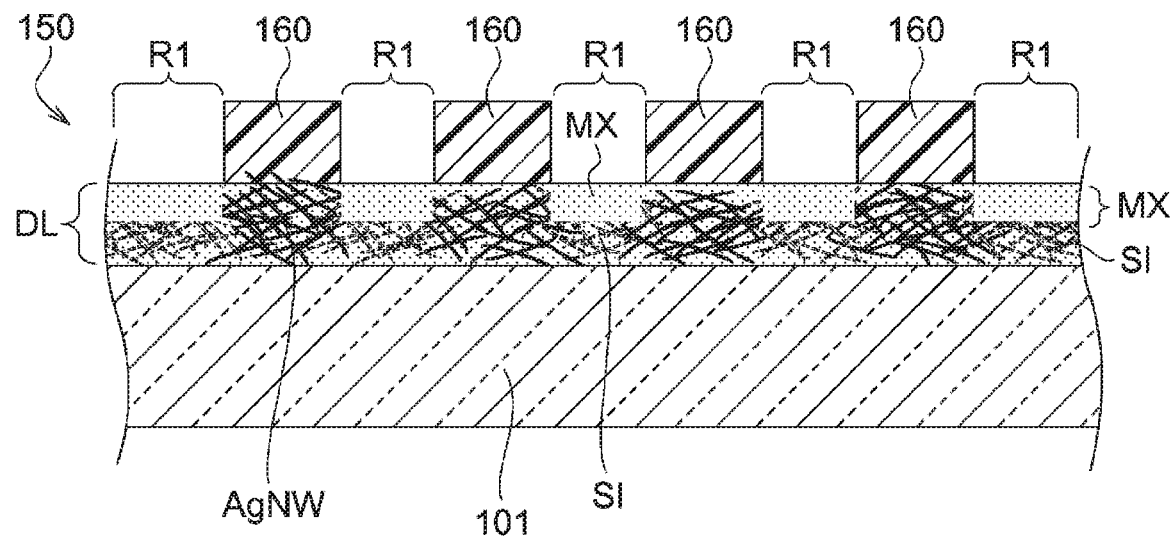
FIG. 36A illustrates a state in which a process is performed by using a thiosulfate solution according to a modification to the method of manufacturing the transparent electrode member having the first structure.
Figure 36B:
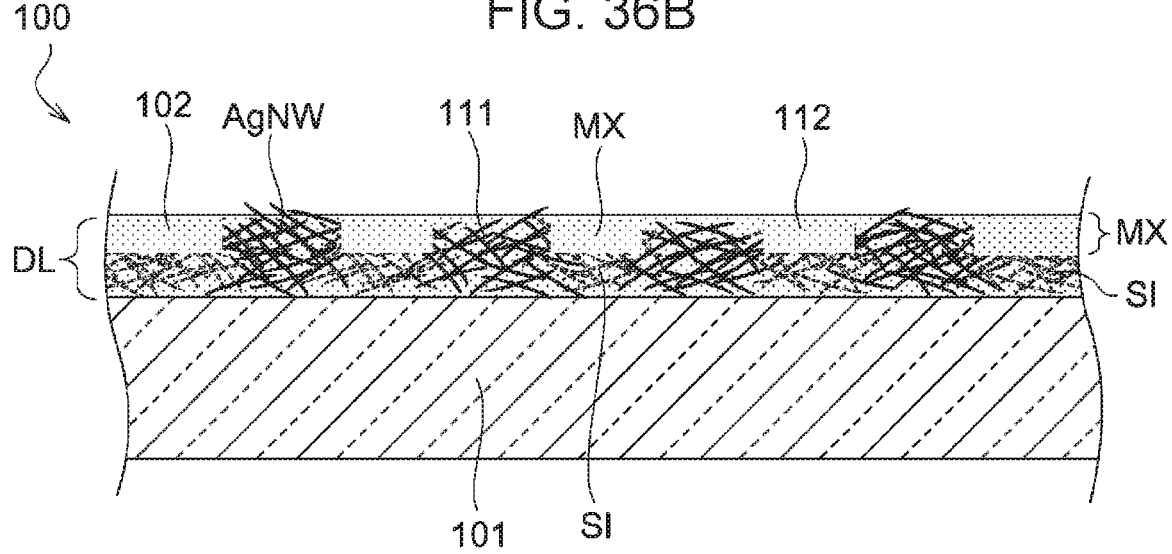
FIG. 36B is a sectional view conceptually illustrating a state in which the resist layer is removed to obtain the transparent electrode member.

FIG. 36A illustrates a state in which a process is performed by using a thiosulfate solution according to a modification to the method of manufacturing the transparent electrode member having the first structure. FIG. 36B is a sectional view conceptually illustrating a state in which the resist layer is removed to obtain the transparent electrode member. In a thiosulfate solution process (S104) subsequent to an iodine solution process (S103), as illustrated in FIG. 36A, the metal compound such as silver iodide SI in portions distal from the base 101, that is, near the surface of the dispersion layer DL among the portions of the dispersion layer DL that are located in the first regions R1 is preferably removed. The metal compound such as silver iodide SI that is near the surface can be removed by relatively decreasing the time of the process using the thiosulfate solution (for example, for 5 to 30 seconds). Subsequently, the resist layer 160 is removed (S105), and as illustrated in FIG. 36B, each optical adjustment portion 112 consequently has a structure in which the metal compound such as silver iodide SI near the surface of the dispersion layer DL is removed, the dispersion layer DL is substantially composed of the matrix MX, and the metal compound such as silver iodide SI in portions proximal to the base 101 remains.

The metal compound such as silver iodide SI near the surface of the dispersion layer DL (in the portions distal from the base 101) is thus removed, the metal compound such as silver iodide SI in the portions proximal to the base 101 thus remains, and the optical adjustment portions 112 and the conductive portion 111 are consequently difficult to visually recognize. Accordingly, the invisibility of the transparent electrode member 100 is improved. For the insulating layer 102, the same manufacturing method as that for the optical adjustment portions 112 is performed to obtain the same structure, which is preferable from the perspective that a manufacturing process is simplified. This is also preferable from the perspective that the insulating layer 102 becomes difficult to visually recognize from the conductive portion 111 (the invisibility is improved).

Another example of a method of manufacturing a transparent electrode member according to an embodiment of the present invention is a method of manufacturing the transparent electrode member 100 having the second structure described above.

Figure 13:
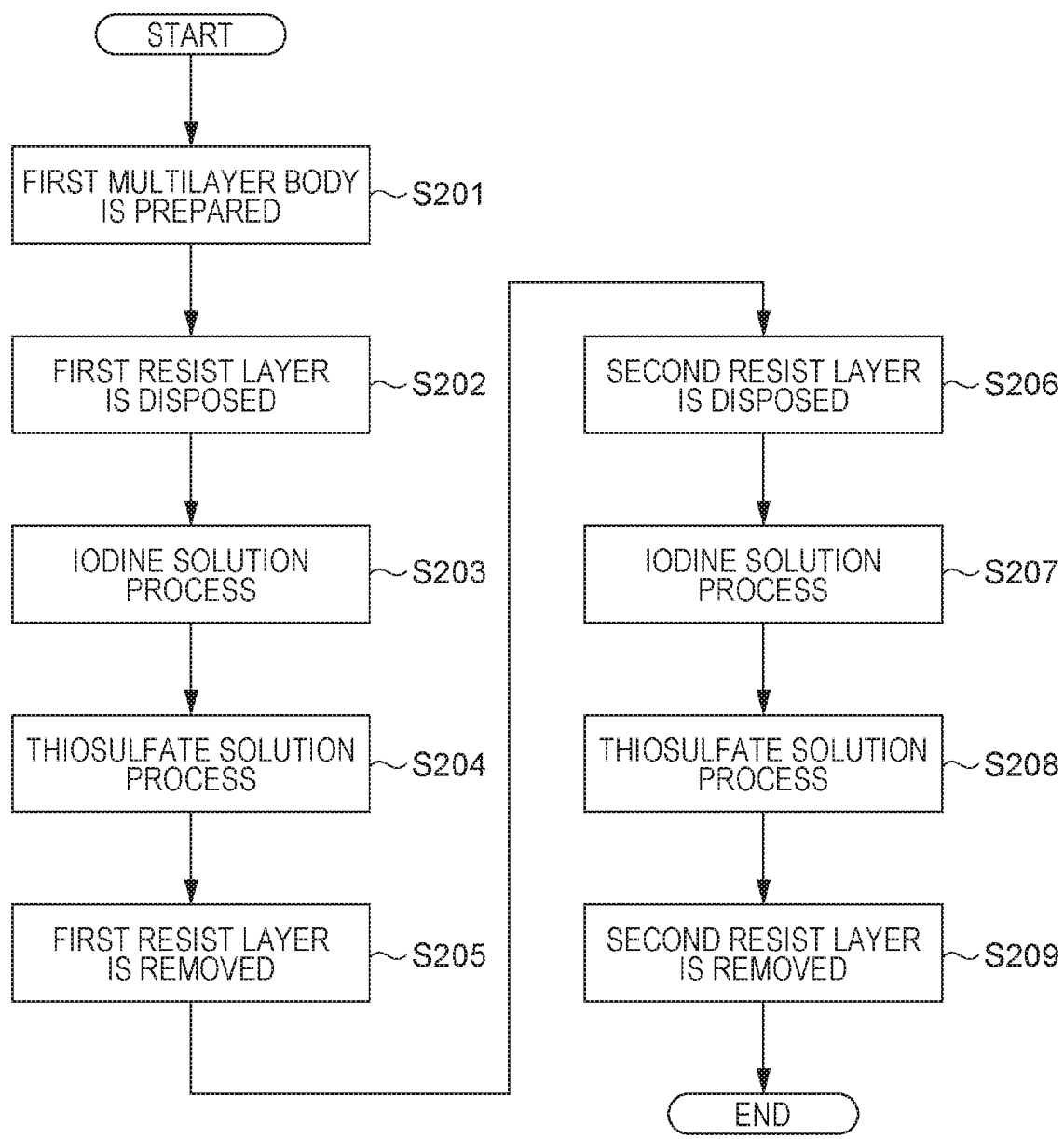
FIG. 13 is the flowchart of a method of manufacturing a transparent electrode member having a second structure.
Figure 14:
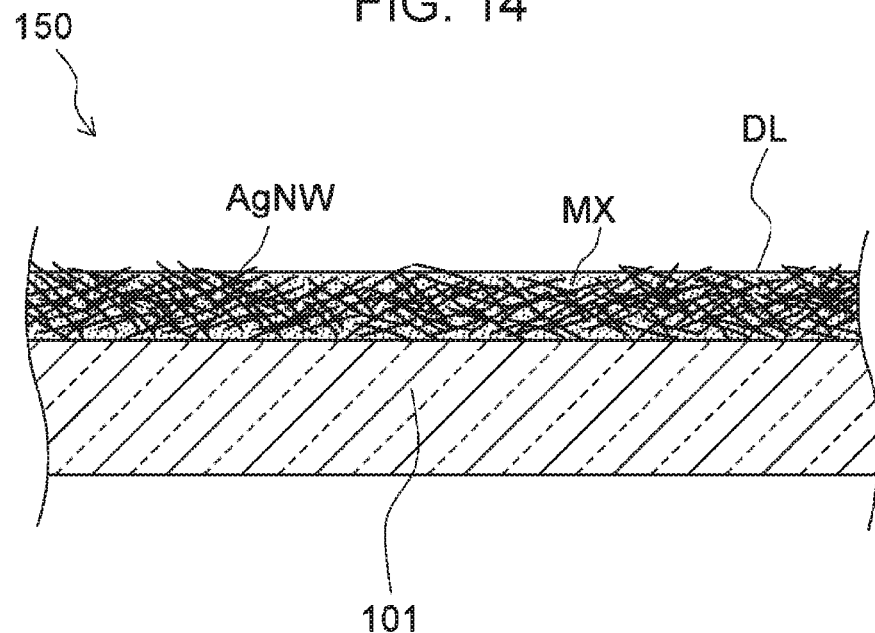
FIG. 14 is a sectional view conceptually illustrating a state in which the first multilayer body is prepared.
Figure 15:
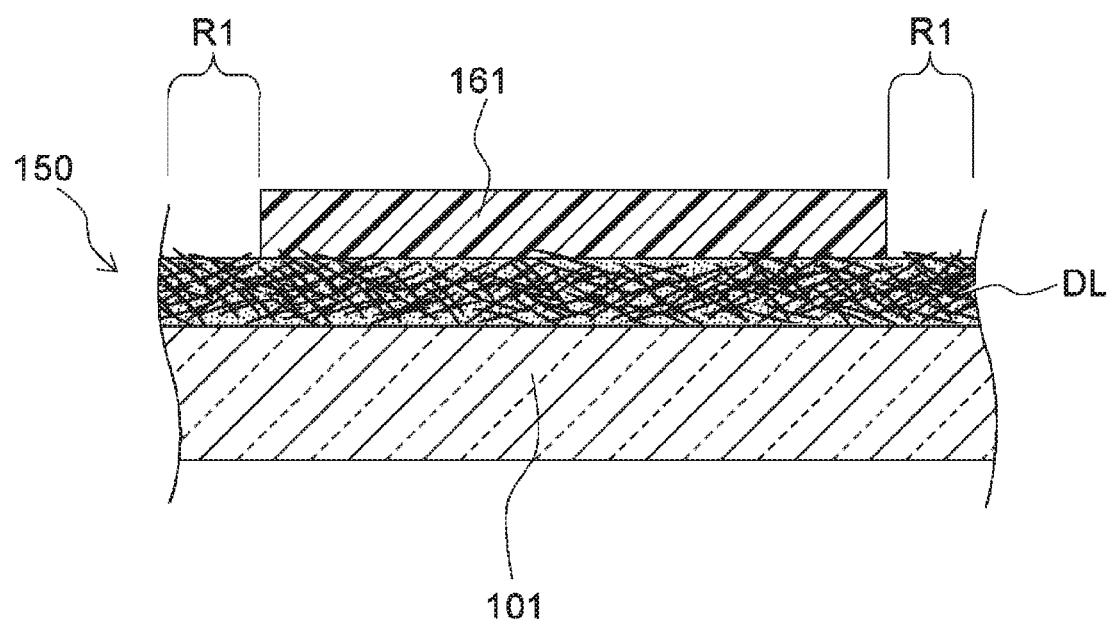
FIG. 15 is a sectional view conceptually illustrating a state in which a first resist layer is disposed on the first multilayer body.
Figure 16:
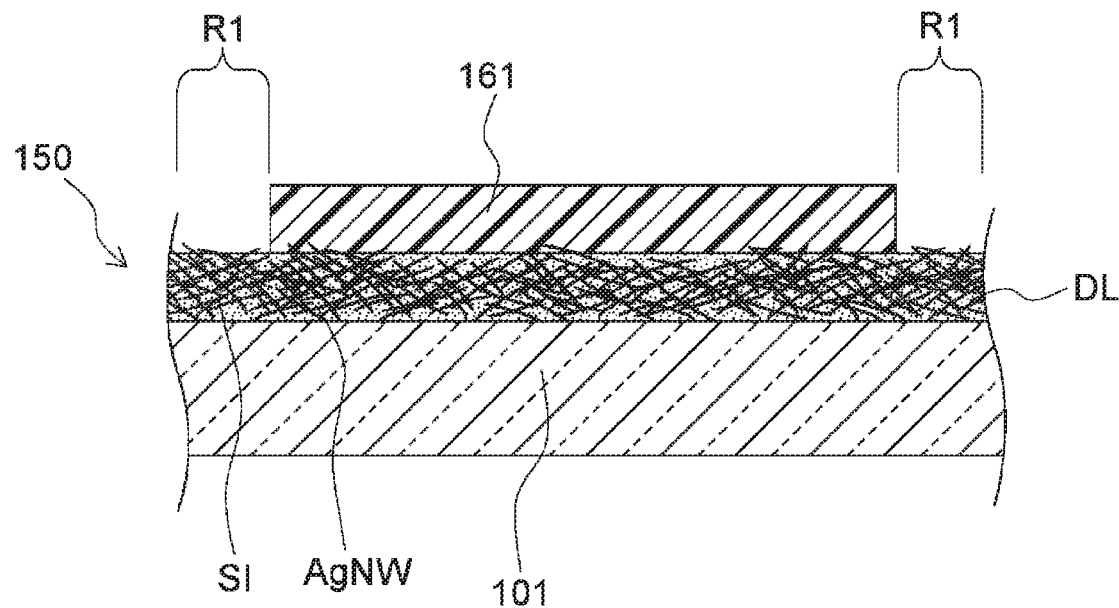
FIG. 16 is a sectional view conceptually illustrating a state in which a process is performed by using an iodine solution.
Figure 17:
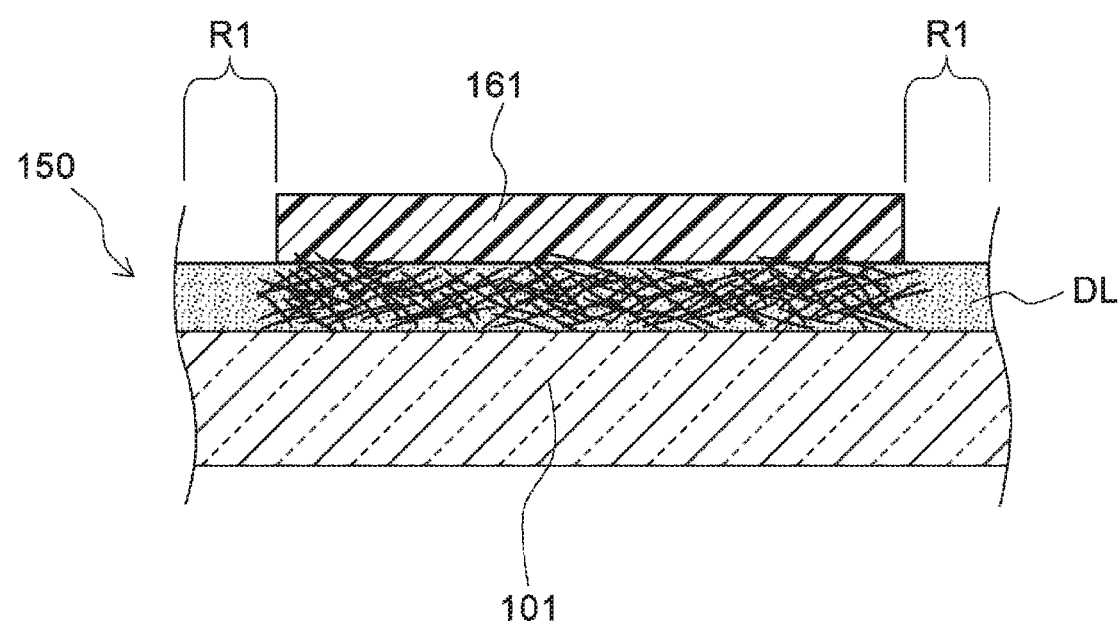
FIG. 17 is a sectional view conceptually illustrating a state in which a process is performed by using a thiosulfate solution.
Figure 18:
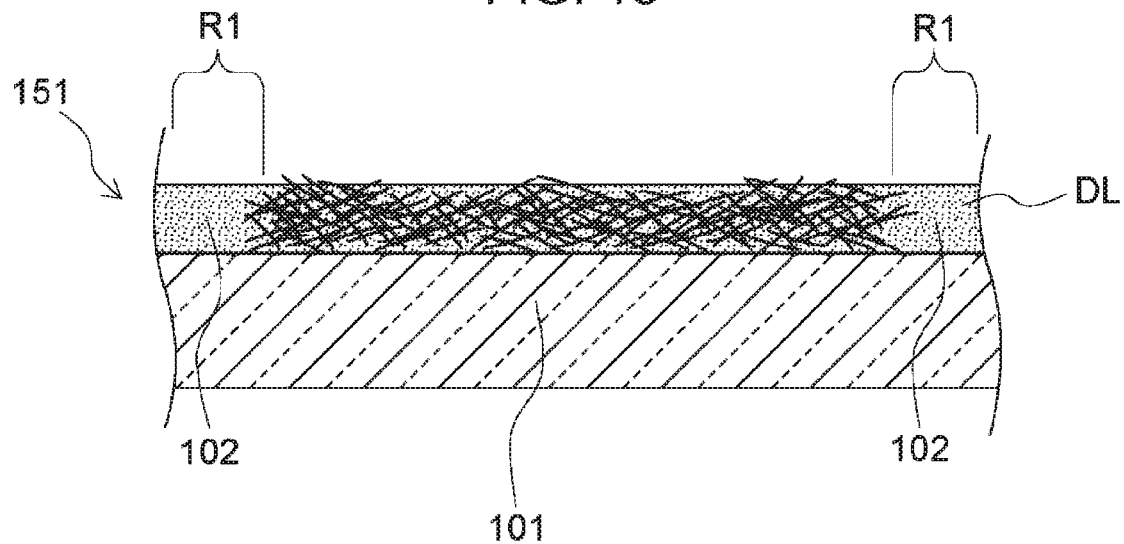
FIG. 18 is a sectional view conceptually illustrating a state in which the first resist layer is removed.
Figure 19:
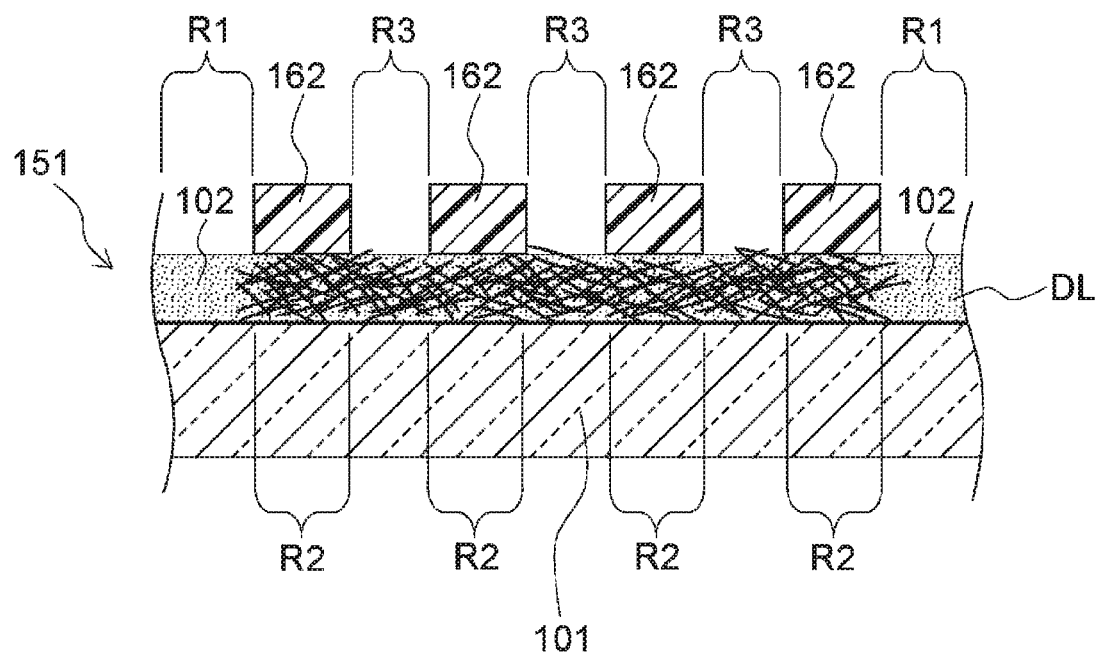
FIG. 19 is a sectional view conceptually illustrating a state in which a second resist layer is disposed on the first multilayer body.
Figure 20:
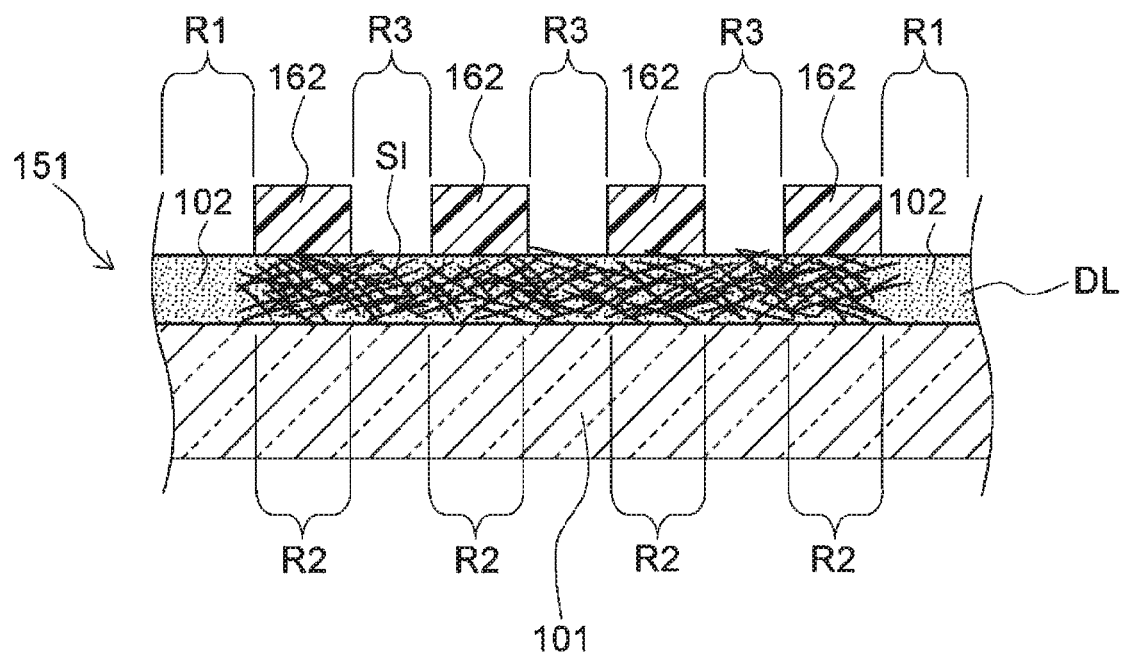
FIG. 20 is a sectional view conceptually illustrating a state in which a process is performed by using an iodine solution.
Figure 21:
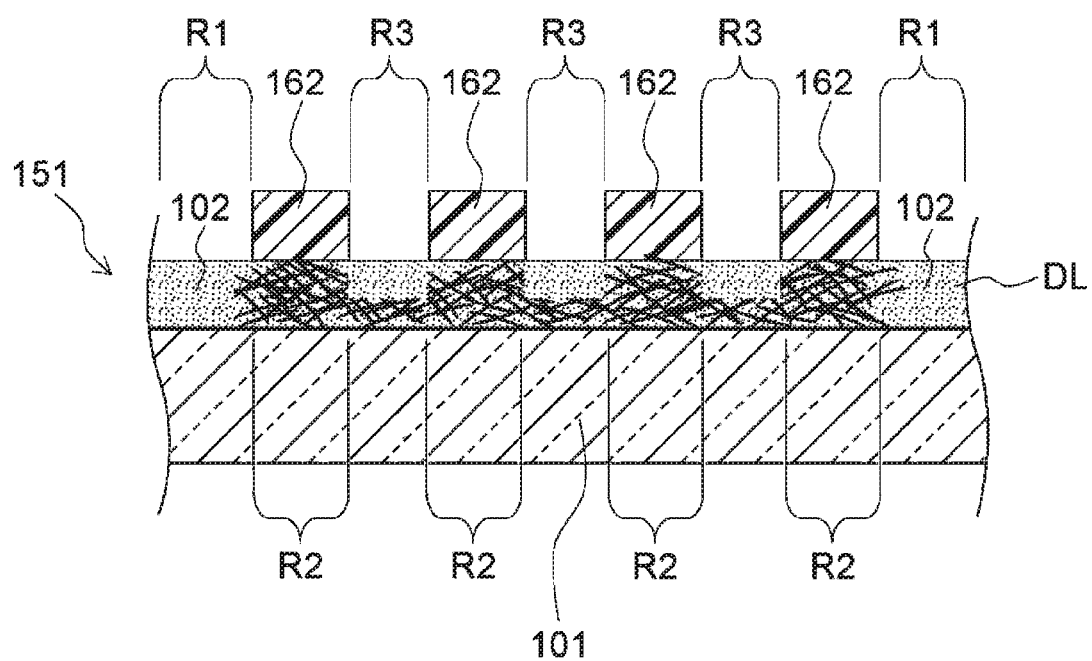
FIG. 21 is a sectional view conceptually illustrating a state in which a process is performed by using a thiosulfate solution.
Figure 22:
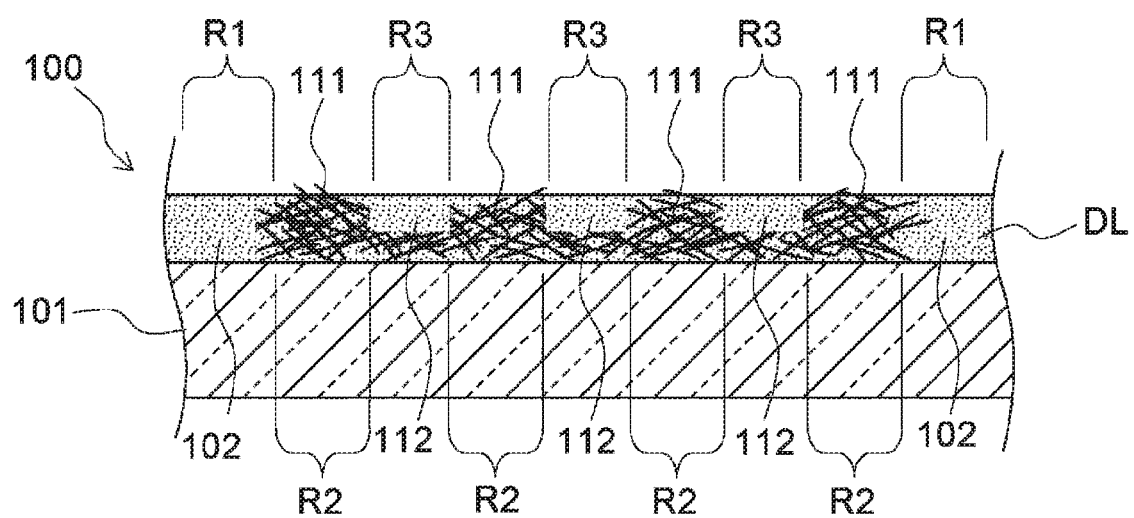
FIG. 22 is a sectional view conceptually illustrating a state in which the second resist layer is removed.

FIG. 13 is the flowchart of the method of manufacturing the transparent electrode member having the second structure. FIG. 14 is a sectional view conceptually illustrating a state in which the first multilayer body is prepared. FIG. 15 is a sectional view conceptually illustrating a state in which a first resist layer is disposed on the first multilayer body. FIG. 16 is a sectional view conceptually illustrating a state in which a process is performed by using an iodine solution. FIG. 17 is a sectional view conceptually illustrating a state in which a process is performed by using a thiosulfate solution. FIG. 18 is a sectional view conceptually illustrating a state in which the first resist layer is removed. FIG. 19 is a sectional view conceptually illustrating a state in which a second resist layer is disposed on the first multilayer body. FIG. 20 is a sectional view conceptually illustrating a state in which a process is performed by using an iodine solution. FIG. 21 is a sectional view conceptually illustrating a state in which a process is performed by using a thiosulfate solution. FIG. 22 is a sectional view conceptually illustrating a state in which the second resist layer is removed.

As illustrated in FIG. 14, the first multilayer body 150 that has a layer of a matrix MX in which silver nanowires AgNW, which are a kind of the conductive nanowires NW, disperse that is stacked, as the dispersion layer DL, on the first surface S1 of the base 101 is first prepared (S201). The dispersion density of the silver nanowires AgNW in the dispersion layer DL over the entire region is equal to the dispersion density of the silver nanowires AgNW of the conductive portion 111 of the transparent electrode member 100 that is finally obtained.

Subsequently, as illustrated in FIG. 15, a portion of the dispersion layer DL of the first multilayer body 150 is covered by a first resist layer 161 (S202). The detail of the first resist layer 161 and a second resist layer 162 mentioned later is common to that of the resist layer 160 and a description thereof is omitted.

Subsequently, a first region R1 of the dispersion layer DL that is not covered by the first resist layer 161 is processed by using an iodine solution (S203). The detail of this process is the same as that in the method of manufacturing the transparent electrode member 100 having the first structure, and a description thereof is omitted. Through this process, as illustrated in FIG. 16, at least some of the silver nanowires AgNW in the first region R1 are iodized and become silver iodide SI, and a portion of the dispersion layer DL that is located in the first region R1 has insulation properties.

The first region R1 is processed by using a thiosulfate solution (S204). The detail of this process is the same as that in the method of manufacturing the transparent electrode member 100 having the first structure, and a description thereof is omitted. Through this process, as illustrated in FIG. 17, at least a part of the silver iodide SI is removed from the first region R1. As a result, the translucency of the portion of the dispersion layer DL that is located in the first region R1 increases.

The first resist layer 161 is removed by using a resist stripper solution (S205). As a result, an intermediate member 151 that includes the insulating layer 102 in the first region R1 is obtained.

Subsequently, the intermediate member 151 is used as a starting member to manufacture the transparent electrode member 100. As illustrated in FIG. 19, a second region R2 corresponding to a part of a region of the dispersion layer DL that used to be covered by the first resist layer 161 is covered by a second resist layer 162 (S206).

Subsequently, third regions R3 that used to be covered by the first resist layer 161 but are not covered by the second resist layer 162 are processed by using an iodine solution (S207). At this time, the first region R1 is also processed by the iodine solution. However, silver nanowires AgNW have been appropriately removed from the portion of the dispersion layer DL that is located in this region, and the process using the iodine solution does not affect the first region R1. Through this process, as illustrated in FIG. 20, at least some of the silver nanowires AgNW that are located in the third regions R3 are iodized and become silver iodide SI, and the conductivity of third regions R3 is decreased to conductivity lower than the conductivity of the second region R2.

Subsequently, the third regions R3 are processed by using a thiosulfate solution (S208). Through this process, as illustrated in FIG. 21, at least a part of the silver iodide SI is removed from the third regions R3. As a result, the translucency of portions of the dispersion layer DL that are located in the third regions R3 increases.

Finally, the second resist layer 162 is removed (S209). As a result, as illustrated in FIG. 22, the transparent electrode member 100 that includes the insulating layer 102 in the first region R1, that includes the conductive portion 111 in the second region R2, and that includes the optical adjustment portions 112 having conductivity higher than that of the insulating layer 102 and lower than that of the conductive portion 111 in the third regions R3 is obtained.

The use of this manufacturing method enables the optical adjustment portions 112 having a certain degree of conductivity to be manufactured. Accordingly, the transparent electrode member 100 that includes the transparent electrode 110 having high conductivity can be manufactured. The silver nanowires AgNW that are located in portions of the dispersion layer DL distal from the base 101 can be preferentially removed by appropriately performing the manufacturing method described above. The silver nanowires AgNW in these portions of the dispersion layer DL most affect the visibility, and the optical adjustment portions 112 having low reflectance and high conductivity can be formed. In some cases where the optical adjustment portions 112 are formed, the transparent electrode member 100 having further increased conductivity and further improved invisibility can be obtained.

Figure 37A:
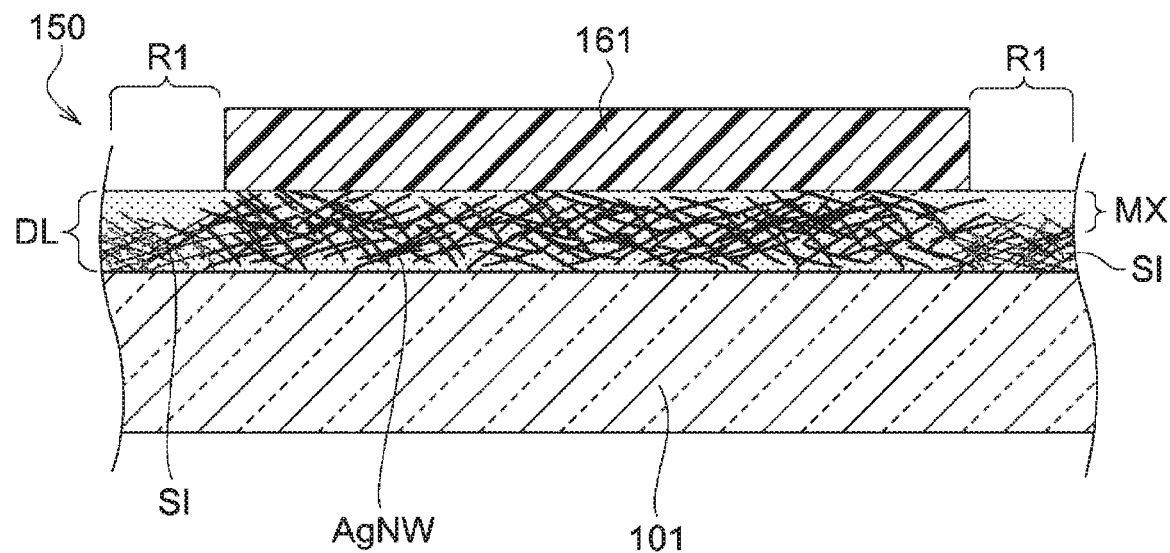
FIG. 37A illustrates a state in which a process of forming an insulating layer is performed by using a thiosulfate solution according to a modification to the method of manufacturing the transparent electrode member having the second structure.
Figure 37B:
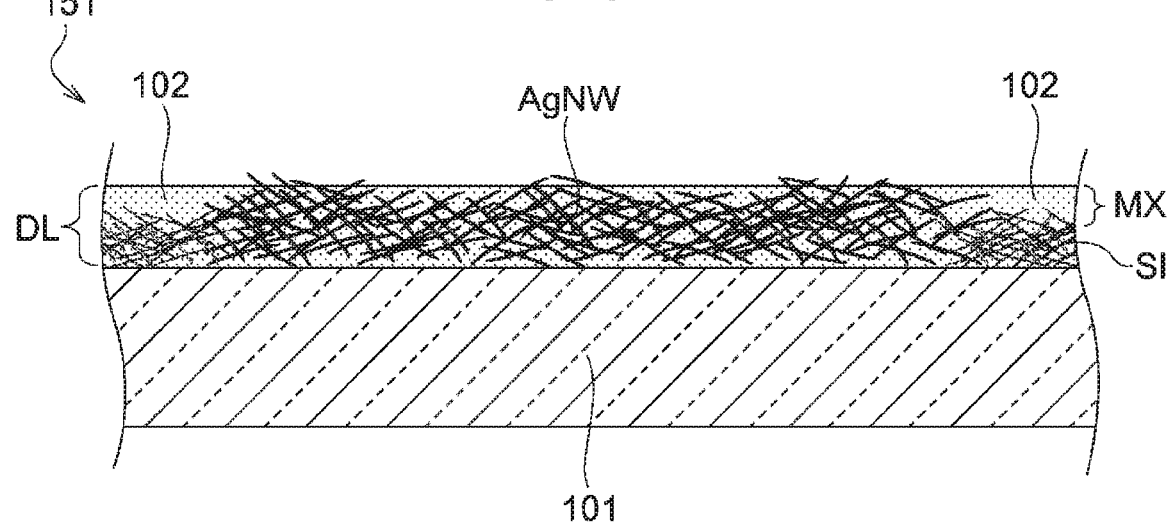
FIG. 37B is a sectional view conceptually illustrating a state in which the first resist layer is removed, and an intermediate member is obtained.
Figure 38A:
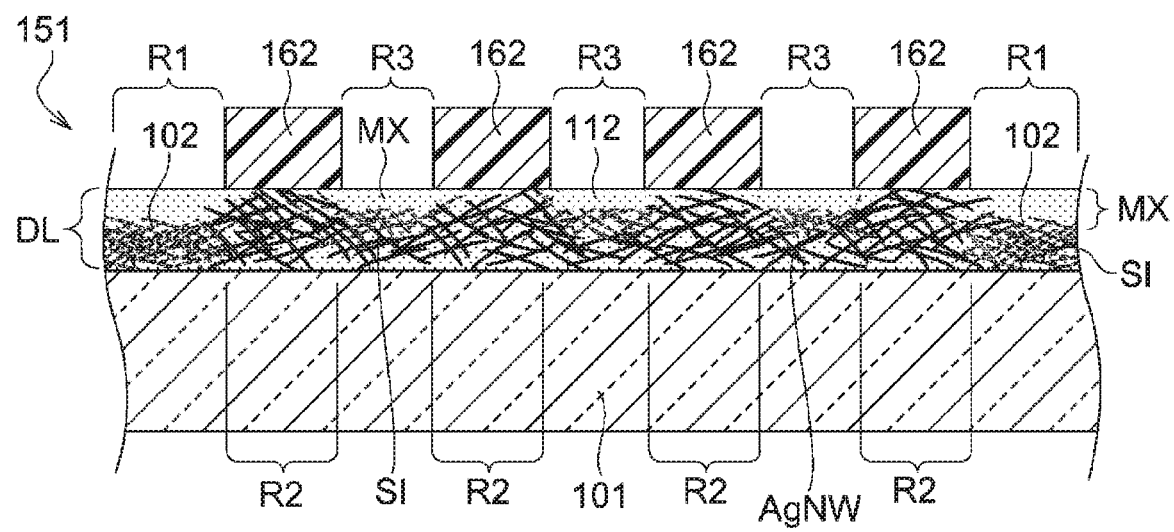
FIG. 38A illustrates a state in which a process of forming the optical adjustment portions is performed by using a thiosulfate solution according to a modification to the method of manufacturing the transparent electrode member having the second structure.
Figure 38B:
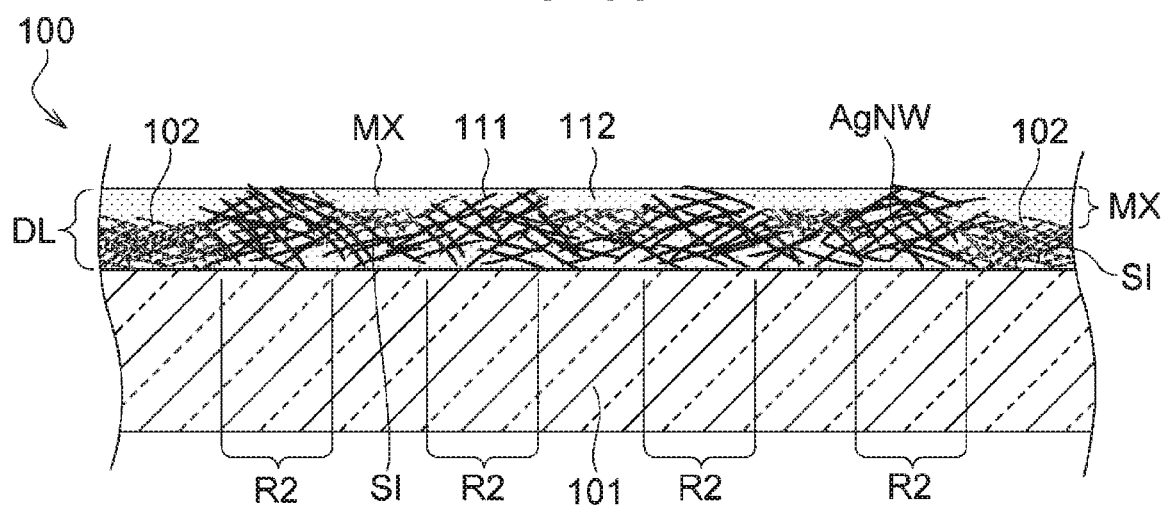
FIG. 38B is a sectional view conceptually illustrating a state in which the second resist layer is removed, and the transparent electrode member is obtained.

From the perspective that the invisibility of the transparent electrode member 100 is further improved, as illustrated in FIG. 37A, FIG. 37B, FIG. 38A, and FIG. 38B, each of the insulating layer 102 and the optical adjustment portions 112 is preferably such that a portion near the surface (in the portion distal from the base 101) substantially becomes the matrix MX by removing the metal compound such as silver iodide SI, and a portion near a lower layer thereof (in the portion proximal to the base 101) contains the metal compound such as silver iodide SI that disperse in the matrix MX. FIG. 37A illustrates a state in which a process of forming an insulating layer is performed by using a thiosulfate solution according to a modification to the method of manufacturing the transparent electrode member having the second structure. FIG. 37B is a sectional view conceptually illustrating a state in which the first resist layer is removed, and the intermediate member is obtained. FIG. 38A illustrates a state in which a process of forming the optical adjustment portions is performed by using a thiosulfate solution according to a modification to the method of manufacturing the transparent electrode member having the second structure. FIG. 38B is a sectional view conceptually illustrating a state in which the second resist layer is removed, and the transparent electrode member is obtained.

After the iodine solution process of forming the insulating layer 102 (S203) ends, of the metal compound such as silver iodide SI (see FIG. 16) that is located in the first region R1, only the metal compound located near the surface is removed, for example, by decreasing the time of the process using the thiosulfate solution (S204), as illustrated in FIG. 37A. Subsequently, the first resist layer 161 is removed (S205), and the intermediate member 151 that includes the insulating layer 102 in which the region composed of the matrix MX is located near the surface, and the region of the dispersing metal compound such as silver iodide SI is located near a lower layer thereof (in the portion proximate to the base 101) can be consequently obtained as illustrated in FIG. 37B unlike FIG. 18.

A step S206 is taken for the intermediate member 151. After the iodine solution process (S207) of forming the optical adjustment portions 112 is performed, of the metal compound such as silver iodide SI (see FIG. 20) that is located in the third regions R3, only the metal compound located near the surface is removed, for example, by decreasing the time of the process using the thiosulfate solution (S208), as illustrated in FIG. 38A. Finally, the second resist layer 162 is removed (S209), and the optical adjustment portions 112 in which the region composed of the matrix MX is located near the surface, the region of the dispersing metal compound such as silver iodide SI is located near a lower layer thereof (in the portion proximate to the base 101), and the region of the dispersing silver nanowires AgNW is located near a lower layer thereof can be consequently obtained as illustrated in FIG. 38B unlike FIG. 22. In the transparent electrode member 100 having this structure, the insulating layer 102, the optical adjustment portions 112, and the conductive portion 111 are particularly difficult to visually recognize. Accordingly, the invisibility of the transparent electrode member 100 is further improved.

The transparent electrode member 100 according to an embodiment of the present invention described above can be preferably used as a component of a position sensor such as a capacitive sensor. A capacitive sensor that includes the transparent electrode member 100 will now be described.

Figure 23:
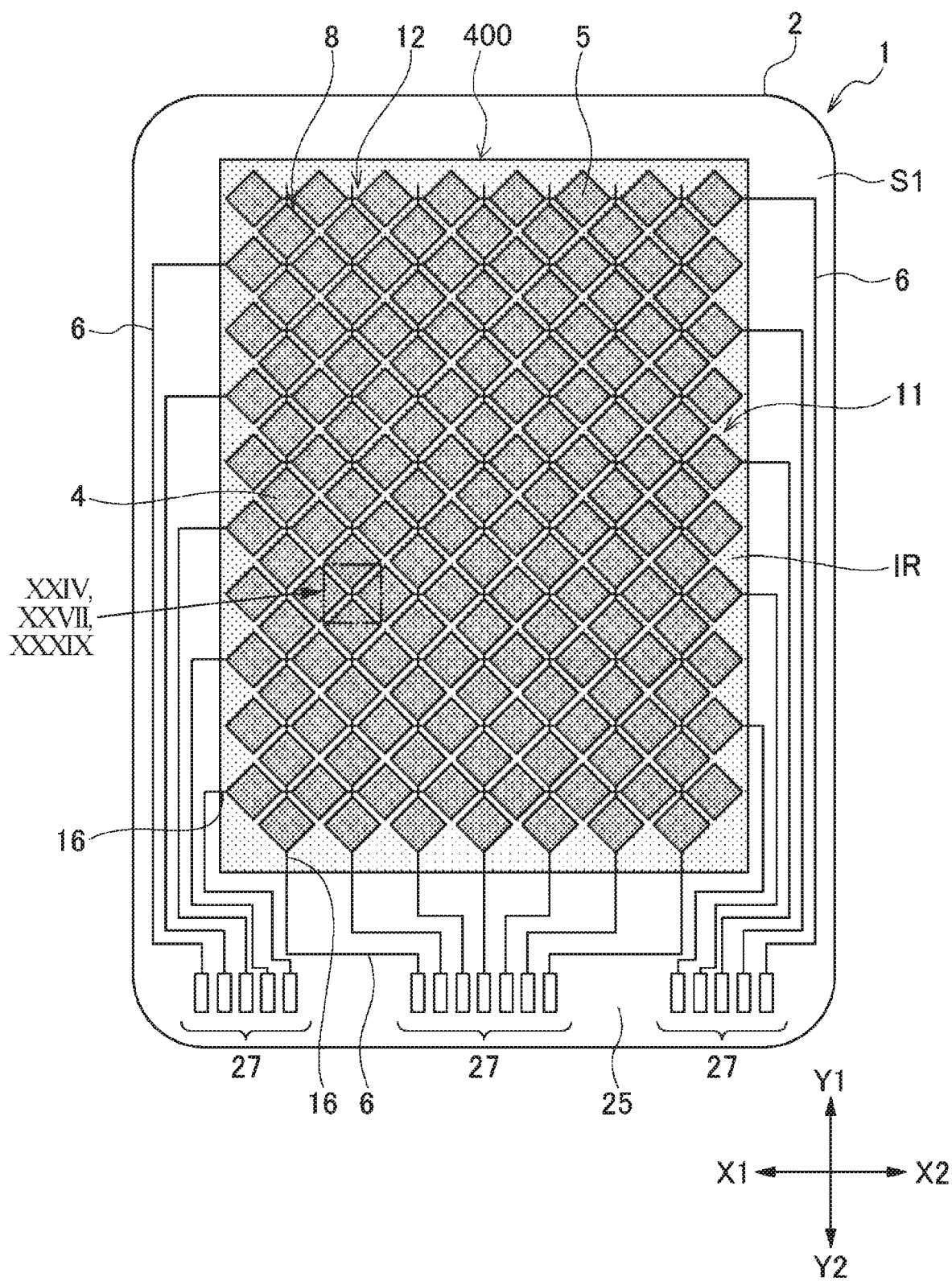
FIG. 23 is a plan view of a capacitive sensor according to the present embodiment.
Figure 24:
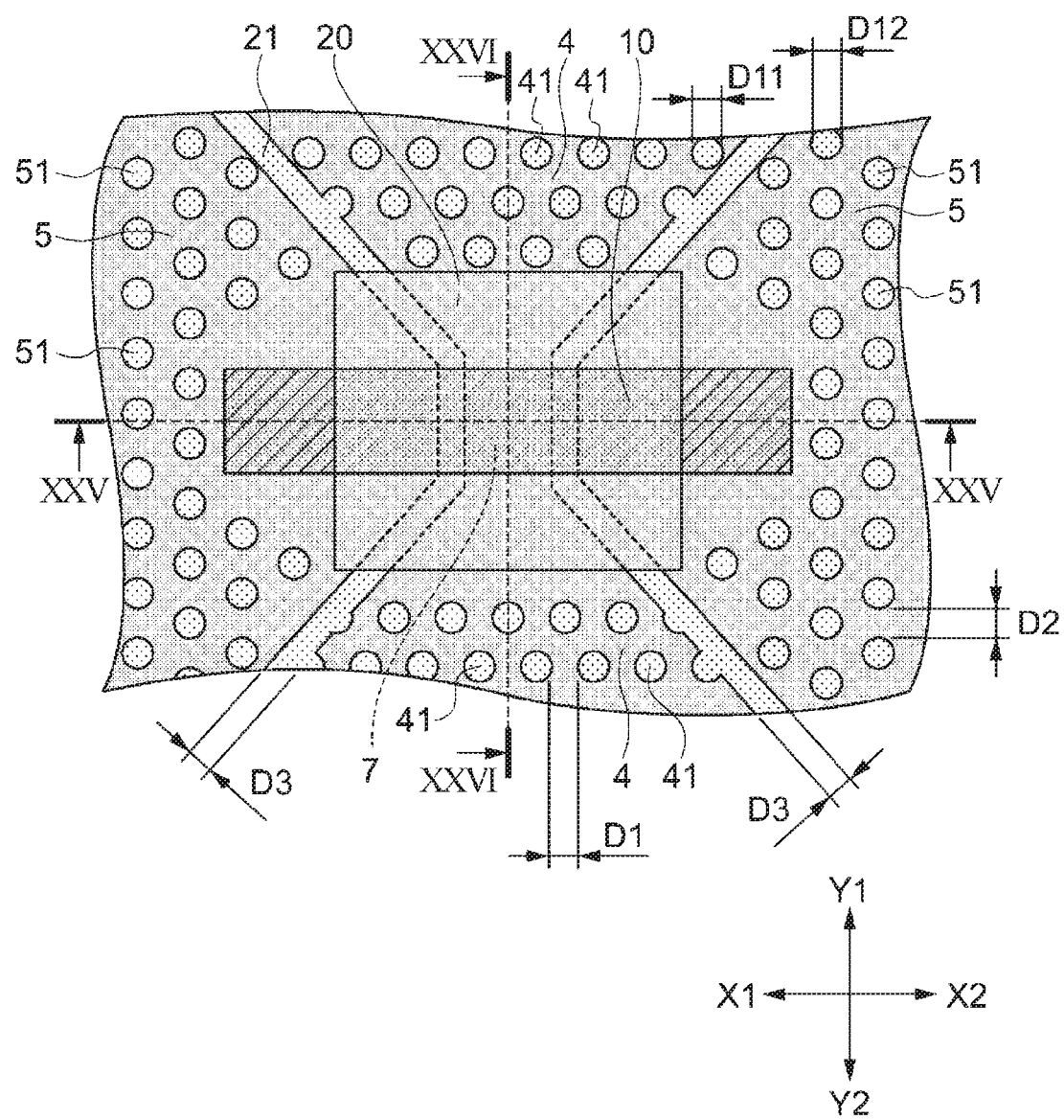
FIG. 24 is an enlarged plan view of a region XXIV illustrated in FIG. 23.
Figure 25:
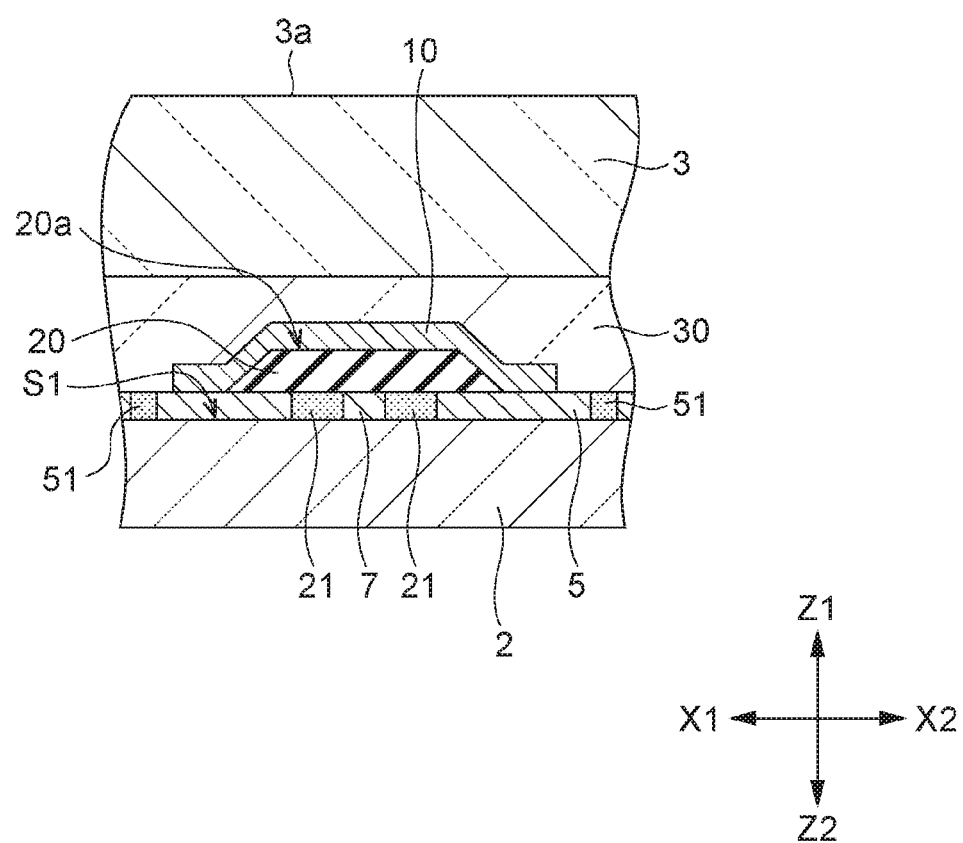
FIG. 25 is a sectional view taken along line XXV-XXV illustrated in FIG. 24.
Figure 26:
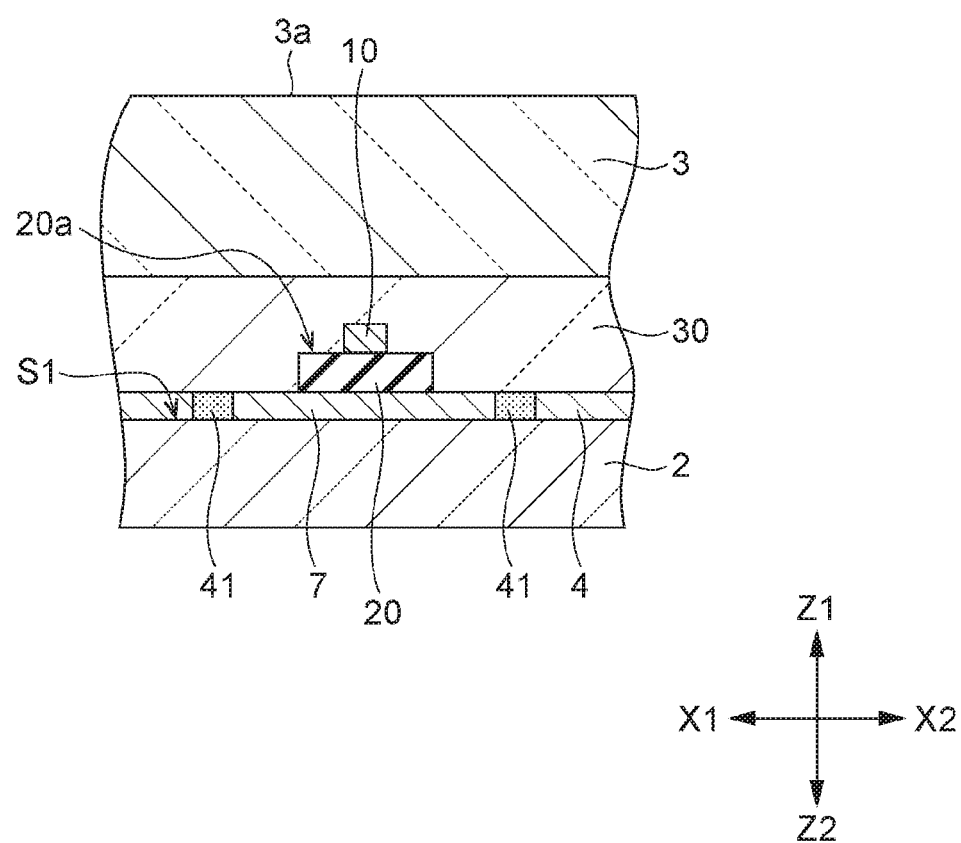
FIG. 26 is a sectional view taken along line XXVI-XXVI illustrated in FIG. 24.

FIG. 23 is a plan view of a capacitive sensor according to the present embodiment. FIG. 24 is an enlarged plan view of a region XXIV illustrated in FIG. 23. FIG. 25 is a sectional view taken along line XXV-XXV illustrated in FIG. 24. FIG. 26 is a sectional view taken along line XXVI-XXVI illustrated in FIG. 24. Since a transparent electrode is transparent, originally, the transparent electrode cannot be visually recognized. In FIG. 23 and FIG. 24, however, the external form of each transparent electrode is illustrated to make it easy to understand.

As illustrated in FIG. 23 to FIG. 26, a capacitive sensor 1 according to the present embodiment includes a base 2, first transparent electrodes 4, second transparent electrodes 5, bridge wiring portions 10 of which second transparent electrodes are composed, a panel 3, and a detector and a control unit (both are not illustrated). The panel 3 is disposed opposite the base 2 when viewed from the bridge wiring portions 10. An optical clear adhesive (OCA) layer 30 is disposed between the base 2 and the panel 3. Insulating portions 20 composed of insulators are disposed between the base 2 and the bridge wiring portions 10. As illustrated in FIG. 25, portions of the optical clear adhesive layer 30 on which the bridge wiring portions 10 are disposed are interposed between the bridge wiring portions 10 and the panel 3.

The base 2 is translucent and is formed by using a film-like transparent base composed of, for example, polyethylene terephthalate (PET) or a glass base. The first transparent electrodes 4 and the second transparent electrodes 5 are disposed on the first surface S1 corresponding to one of main surfaces of the base 2. The detail thereof will be described later. As illustrated in FIG. 25, the panel 3 is disposed opposite the base 2 when viewed from the bridge wiring portions 10 and is translucent. An operation body such as a finger of an operator comes into contact with or approaches a surface of the panel 3 to operate the transparent electrode member. The material of the panel 3 is not particularly limited. A glass base or a plastic base is preferably used as the material of the panel 3. The panel 3 is joined to the base 2 by using the optical clear adhesive layer 30 that is disposed between the base 2 and the panel 3. The optical clear adhesive layer 30 is composed of an acrylic adhesive or a double-sided adhesive tape.

As illustrated in FIG. 23, the capacitive sensor 1 has a detection region 11 and a non-detection region 25 when viewed in a direction (a Z1-Z2 direction; see FIG. 25 and FIG. 26) parallel to the normal of the surface of the panel 3. The detection region 11 can be operated by the operation body such as a finger. The non-detection region 25 is located along the outer circumference of the detection region 11 and has a frame shape. The non-detection region 25 is shielded from light by a decoration layer, not illustrated, light (for example, natural light) from a surface of the capacitive sensor 1 near the panel 3 toward a surface thereof near the base 2 and light (for example, light from a backlight of a display device that is used in combination with the capacitive sensor 1) from the surface near the base 2 toward the surface near the panel 3 is unlikely to pass through the non-detection region 25.

As illustrated in FIG. 23, the capacitive sensor 1 includes a transparent electrode member 400 that includes first electrode coupling bodies 8 and second electrode coupling bodies 12 that are disposed on the main surface (the first surface S1) of the base 2. The first electrode coupling bodies 8 are disposed in the detection region 11 and include the first transparent electrodes 4. As illustrated in FIG. 25 and FIG. 26, the first transparent electrodes 4 are disposed on the first surface S1 of the base 2 that is one of the main surfaces the normal of which is parallel to the Z1-Z2 direction and that faces in the direction Z1. The first transparent electrodes 4 are coupled with each other in a Y1-Y2 direction (a first direction) with elongated coupling members 7 interposed therebetween. The first electrode coupling bodies 8 that include the first transparent electrodes 4 that are coupled with each other in the Y1-Y2 direction are arranged at an interval in an X1-X2 direction. The coupling members 7 of which first transparent wires are composed are integrally formed with the first transparent electrodes 4. The coupling members 7 electrically connect two adjacent first transparent electrodes 4 to each other. The insulating regions IR are located around the first electrode coupling bodies 8 and the second electrode coupling bodies 12.

The first transparent electrodes 4 and the coupling members 7 are translucent and are composed of a material that contains conductive nanowires. The use of the material that contains the conductive nanowires enables the first transparent electrodes 4 to have high translucency and decreased electric resistance. The use of the material that contains the conductive nanowires also enables the performance of deformation of the capacitive sensor 1 to be improved.

As illustrated in FIG. 24 and FIG. 26, the first transparent electrodes 4 have first optical adjustment regions 41. The first optical adjustment regions 41 are separated from each other in the first transparent electrodes 4 and are located neither in the non-adjustment regions NR that are located around the coupling members 7 on the first transparent electrodes 4 nor in the coupling members 7 that are connected to the first transparent electrodes 4. A distance (a first distance) D1 between adjacent first optical adjustment regions 41 is constant and is 30 μm or more. In an example illustrated in FIG. 24, the shape of each first optical adjustment region 41 is circular. The diameter D11 of a circle of each first optical adjustment region 41 is no less than 10 μm and no more than 100 μm. The dimensions of the first optical adjustment regions 41 will be described in detail later.

The second electrode coupling bodies 12 are disposed in the detection region 11 and include the second transparent electrodes 5. As illustrated in FIG. 25 and FIG. 26, the second transparent electrodes 5 are disposed on the first surface S1 of the base 2. The second transparent electrodes 5 are thus disposed on the same surface (the first surface S1 of the base 2) as the first transparent electrodes 4. The second transparent electrodes 5 are coupled with each other in the X1-X2 direction (a second direction) with the elongated bridge wiring portions 10 interposed therebetween. As illustrated in FIG. 23, the second electrode coupling bodies 12 that include the second transparent electrodes 5 that are coupled with each other in the X1-X2 direction are arranged at an interval in the Y1-Y2 direction. The bridge wiring portions 10 are formed as different bodies from the second transparent electrodes 5. The X1-X2 direction intersects the Y1-Y2 direction. For example, the X1-X2 direction is perpendicular to the Y1-Y2 direction.

The second transparent electrodes 5 are translucent and are composed of a material that contains conductive nanowires. The description of the conductive nanowires is the same as the above description related to the material of the first transparent electrodes 4.

As illustrated in FIG. 24 and FIG. 25, the second transparent electrodes 5 have second optical adjustment regions 51. The second optical adjustment regions 51 are separated from each other in the second transparent electrodes 5 and are located neither in regions overlapping the bridge wiring portions 10 nor in the non-adjustment regions NR. A distance (a second distance) D2 between adjacent second optical adjustment regions 51 is constant and is 30 μm or more. In an example illustrated in FIG. 24, the shape of each second optical adjustment region 51 is circular. The diameter D12 of a circle of each second optical adjustment region 51 is no less than 10 μm and no more than 100 μm. The dimensions of the first second optical adjustment regions 51 will be described in detail later together with the dimensions of the first optical adjustment regions 41.

The bridge wiring portions 10 are composed of a material that contains a translucent, conductive oxide material. At least one selected from the group consisting of ITO (Indium Tin Oxide), IZO (Indium Zinc Oxide), GZO (Gallium-doped Zinc Oxide), AZO (Aluminum-doped Zinc Oxide), and FTO (Fluorine-doped Tin Oxide) is used as the translucent, conductive oxide material.

Each bridge wiring portion 10 may have a first layer that contains an oxide material such as ITO and a second layer composed of a transparent metal having resistance lower than that of the first layer. The bridge wiring portion 10 may further include a third layer that contains an oxide material such as ITO. In the case where the bridge wiring portion 10 have a multilayer structure of the first layer and the second layer or a multilayer structure of the first layer, the second layer, and the third layer, etching selectivity among each bridge wiring portion 10, the first transparent electrodes 4, and the second transparent electrodes 5 is preferably provided.

As illustrated in FIG. 24 to FIG. 26, the insulating portions 20 are disposed on surfaces of the coupling members 7 that connect the first transparent electrodes 4 to each other. As illustrated in FIG. 25, each insulating portion 20 are filled in spaces between the coupling members 7 and the second transparent electrodes 5 and are put on surfaces of the second transparent electrodes 5. Examples of the insulating portions 20 include novolak resin (resist).

As illustrated in FIG. 25 and FIG. 26, the bridge wiring portions 10 extend along surfaces 20a of the insulating portions 20 between the surfaces of the second transparent electrodes 5 that are located on both sides of the insulating portions 20 in the X1-X2 direction. The bridge wiring portions 10 electrically connect two adjacent second transparent electrodes 5 to each other.

As illustrated in FIG. 25 and FIG. 26, the insulating portions 20 are disposed on the surfaces of the coupling members 7 that connect the first transparent electrodes 4 to each other, and the bridge wiring portions 10 that connect the second transparent electrodes 5 to each other are disposed on the surfaces of the insulating portions 20. The insulating portions 20 are thus interposed between the coupling members 7 and the bridge wiring portions 10, and the first transparent electrodes 4 and the second transparent electrodes 5 are electrically isolated from each other. According to the present embodiment, the first transparent electrodes 4 and the second transparent electrodes 5 are disposed on the same surface (the first surface S1 of the base 2), and the thickness of the capacitive sensor 1 can be consequently decreased.

As illustrated in FIG. 24, the first transparent electrodes 4 and the second transparent electrodes 5 are arranged side by side on the first surface S1 of the base 2 and are adjacent to each other. The first transparent electrodes 4 and the second transparent electrodes 5 correspond to the transparent electrodes 110a to 110d in FIG. 6. Insulating layers 21 are disposed between the first transparent electrodes 4 and the second transparent electrodes 5. The insulating layers 21 correspond to the insulating regions IR in FIG. 6 and FIG. 23. Consequently, the first transparent electrodes 4 and the second transparent electrodes 5 are electrically isolated from each other. For example, the width D3 of each insulating layer 21 roughly ranges from 10 μm to 20 μm. The width D3 of each insulating layer 21 will be described in detail later.

The coupling member 7 illustrated in FIG. 24 to FIG. 26 is integrally formed with the first transparent electrodes 4 and extends in the Y1-Y2 direction. The bridge wiring portion 10 illustrated in FIG. 24 to FIG. 26 is formed as the different body from the second transparent electrodes 5 on the surface 20a of the insulating portion 20 that covers the coupling member 7 and extends in the X1-X2 direction. However, the arrangement of the coupling member 7 and the bridge wiring portion 10 are not limited thereto. For example, the coupling member 7 may be integrally formed with the second transparent electrodes 5 and may extend in the X1-X2 direction. In this case, the coupling member 7 electrically connects the two adjacent second transparent electrodes 5 to each other. The bridge wiring portion 10 may be formed as a different body from the first transparent electrodes 4 on the surface 20a of the insulating portion 20 that covers the coupling member 7 and may extend in the Y1-Y2 direction. In this case, the bridge wiring portion 10 electrically connects the two adjacent first transparent electrodes 4 to each other. In the capacitive sensor 1 according to the present embodiment described by way of example, the bridge wiring portion 10 is formed as the different body from the second transparent electrodes 5 on the surface 20a of the insulating portion 20 that covers the coupling member 7 and extends in the X1-X2 direction.

As illustrated in FIG. 23, wiring portions 6 that extend from the first electrode coupling bodies 8 and the second electrode coupling bodies 12 are formed in the non-detection region 25. The first electrode coupling bodies 8 and the second electrode coupling bodies 12 are electrically connected to the respective wiring portions 6 with connection wires 16 interposed therebetween. The wiring portions 6 are connected to external connection portions 27 that are electrically connected to a flexible printed circuit board, not illustrated. That is, the wiring portions 6 electrically connect the first electrode coupling bodies 8 and the external connection portions 27 to each other and electrically connect the second electrode coupling bodies 12 and the external connection portions 27 to each other. The external connection portions 27 are electrically connected to the flexible printed circuit board, not illustrated, by using, for example, a material that contains conductive paste, or metal such as Cu, a Cu alloy, a CuNi alloy, Ni, Ag, or Au.

A printed wiring board (not illustrated) that is connected to the flexible printed circuit board includes a detector (not illustrated) that detects a change in capacitance between the operation body and transparent electrodes (mainly, the first transparent electrodes 4 and the second transparent electrodes 5) and a control unit that calculates the position of the operation body, based on a signal from the detector. Integrated circuits are used for the detector and the control unit although the detail thereof is not described.

The wiring portions 6 are composed of a material that contains metal such as Cu, a Cu alloy, a CuNi alloy, Ni, Ag, or Au. The connection wires 16 are composed of a transparent, conductive material such as ITO or a metal nanowire and extend from the detection region 11 to the non-detection region 25. The wiring portions 6 are stacked on the connection wires 16 in the non-detection region 25 and are electrically connected to the connection wires 16. A dispersion layer DL that includes the same metal nanowires (specific examples of which include silver nanowires) as the first transparent electrodes 4 and the second transparent electrodes 5 may continuously extend to the non-detection region 25 to form the connection wires 16, and the connection wires 16 and metal layers of which the wiring portions 6 are composed may be stacked in the non-detection region 25 to form multilayer wiring structures.

The wiring portions 6 are disposed on the first surface S1 of the base 2 in the non-detection region 25. The external connection portions 27 are disposed on the first surface S1 of the base 2 in the non-detection region 25 as in the wiring portions 6.

In FIG. 23, the wiring portions 6 and the external connection portions 27 are illustrated so as to be visually recognized to make them easy to understand. In practice, however, the decoration layer (not illustrated) that has the light shielding properties is disposed in the non-detection region 25. For this reason, the wiring portions 6 and the external connection portions 27 are concealed by the decoration layer when the capacitive sensor 1 is viewed from the surface of the panel 3 and are not visually recognized. The material of which the decoration layer is composed is freely determined provided that the decoration layer has the light shielding properties. The decoration layer may have insulation properties.

In the capacitive sensor 1 according to the present embodiment, as illustrated in FIG. 25, capacitance exists between a finger and the first transparent electrode 4 close to the finger and between the finger and the second transparent electrode 5 close to the finger, for example, while the finger as an example of the operation body is in contact with a surface 3a of the panel 3. The capacitive sensor 1 detects a change in the capacitance at this time by using the detector and can calculate the position of contact with the finger, based on the change in the capacitance by using the control unit. That is, the capacitive sensor 1 detects the X coordinate of the position of the finger, based on the change in the capacitance between the finger and the first electrode coupling bodies 8, and detects the Y coordinate of the position of the finger, based on the change in the capacitance between the finger and the second electrode coupling bodies 12 (self-capacitance detection type).

The capacitive sensor 1 may be of a mutual capacitance detection type. That is, the capacitive sensor 1 may apply a drive voltage to a line of the first electrode coupling bodies 8 to detect the change in the capacitance between the finger and a line of the other second electrode coupling bodies 12 or to a line of the second electrode coupling bodies 12 to detect the change in the capacitance between the finger and a line of the other first electrode coupling bodies 8. In this case, the capacitive sensor 1 detects the X coordinate of the position of the finger by using electrodes and detects the Y coordinate of the position of the finger by using the other electrodes.

When the difference between the reflectance of the conductive regions that contain the conductive nanowires and the reflectance of the insulating portions having gaps increases, the difference between the conductive regions and the insulating portions becomes visually clearer. Consequently, the first transparent electrodes and the second transparent electrodes are easy to visually recognize as a pattern. In the case where the capacitive sensor includes an antireflection layer or a reflection reduction layer, the difference between the reflectance of the conductive regions and the reflectance of the insulating portions can be decreased, but it is necessary to add a facility for forming the antireflection layer or the reflection reduction layer, and the number of processes of manufacturing the capacitive sensor increases.

In the capacitive sensor 1 according to the present embodiment, however, the first transparent electrodes 4 have the first optical adjustment regions 41 that are separated from each other. The second transparent electrodes 5 have the second optical adjustment regions 51 that are separated from each other. For this reason, the first transparent electrodes 4 and the second transparent electrodes 5 have the conductive regions that contain the conductive nanowires and the regions (optical adjustment regions) that include the first optical adjustment regions 41 and the second optical adjustment regions 51. For this reason, the first transparent electrodes 4 and the second transparent electrodes 5 have boundaries (internal boundaries) between the conductive regions and the optical adjustment regions. There are also boundaries (external boundaries) between the first transparent electrodes 4 and the insulating layers 21 and boundaries (external boundaries) between the second transparent electrodes and the insulating layers 21. Since the non-adjustment regions NR described above are composed of parts of the conductive regions, the non-adjustment regions NR include no internal regions (the boundaries between the conductive regions and the optical adjustment regions) but include only the external regions (the boundaries between the first transparent electrodes 4 or the second transparent electrodes 5 and the insulating layers 21).

For this reason, even in the case where both of the internal boundaries and the external boundaries are visually recognized in a plan view of the capacitive sensor 1, it is inhibited that only the external boundaries are emphasized. For this reason, the first transparent electrodes 4 and the second transparent electrodes 5 are difficult to visually recognize as a pattern. This enables the invisibility of the pattern of the first transparent electrodes 4 and the second transparent electrodes 5 to be improved.

The first optical adjustment regions 41 are located in regions other than the non-adjustment regions NR on the first transparent electrodes 4. The second optical adjustment regions 51 are located in regions other than the non-adjustment regions NR on the second transparent electrodes 5. In this case, providing the first optical adjustment regions 41 and the second optical adjustment regions 51 enables the electric resistance of the first transparent electrodes 4 and the second transparent electrodes 5 to be inhibited from excessively decreasing. In addition, the first optical adjustment regions 41 and the second optical adjustment regions 51 are concentrated, and the first transparent electrodes 4 and the second transparent electrodes 5 are inhibited from being easy to visually recognize as a pattern.

The first distance between the adjacent first optical adjustment regions 41 is constant. The second distance between the adjacent second optical adjustment regions 51 is constant. That is, the first optical adjustment regions 41 are uniformly arranged in the regions other than the non-adjustment regions NR on the first transparent electrodes 4. The second optical adjustment regions 51 are uniformly arranged in the regions other than the non-adjustment regions NR on the second transparent electrodes 5.

At least one selected from the group consisting of a gold nanowire, a silver nanowire, and a copper nanowire is used as each conductive nanowire that is contained in the materials of the first transparent electrodes 4 and the second transparent electrodes 5. This enables the electric resistance of the first transparent electrodes 4 that have the first optical adjustment regions 41 and the second transparent electrodes 5 that have the second optical adjustment regions 51 to be decreased to low resistance, unlike the case where an oxide material such as ITO is used as the materials of the first transparent electrodes 4 and the second transparent electrodes 5.

Figure 27:
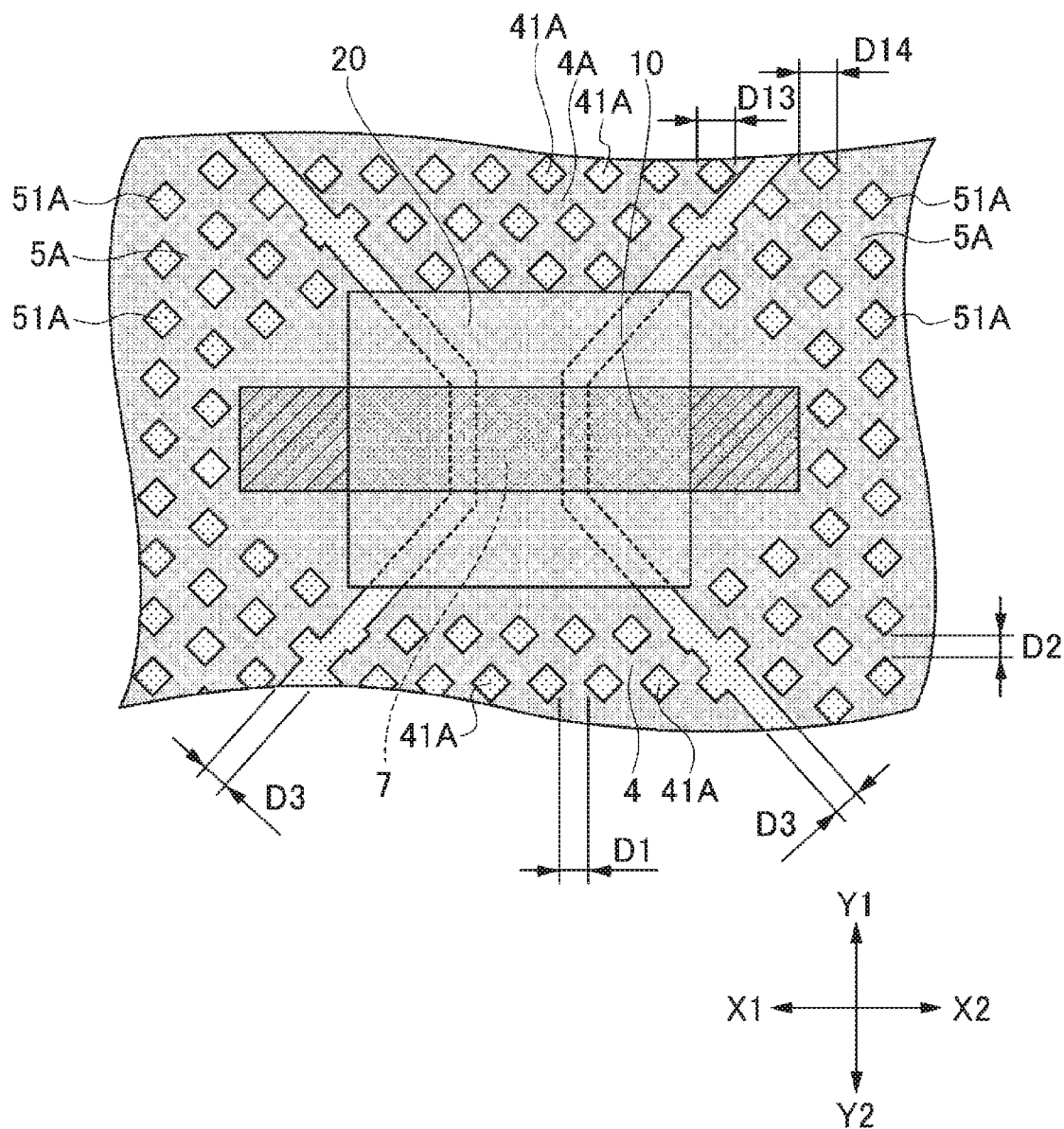
FIG. 27 is a plan view of first transparent electrodes and second transparent electrodes according to a modification to the capacitive sensor according to the present embodiment.

FIG. 27 is a plan view of a modification (a first modification) to the first transparent electrodes and the second transparent electrodes according to the present embodiment. FIG. 27 corresponds to the enlarged plan view of the region XXVII illustrated in FIG. 23.

First transparent electrodes 4A according to the present modification have first optical adjustment regions 41A. The shape of each first optical adjustment region 41A is quadrilateral. The length D13 of the longest diagonal of the diagonals of each quadrilateral first optical adjustment region 41A is no less than 10 μm and no more than 100 μm. The dimensions of the first optical adjustment regions 41A will be described in detail later. The other structures of the first transparent electrodes 4A are the same as those of the first transparent electrodes 4 described above in association with FIG. 23 to FIG. 26.

Second transparent electrodes 5A according to the present modification have second optical adjustment regions 51A. The shape of each second optical adjustment region 51A is quadrilateral. The length D14 of the longest diagonal of the diagonals of each quadrilateral second optical adjustment region 51A is no less than 10 μm and no more than 100 μm. The dimensions of the second optical adjustment regions 51A will be described in detail later together with the dimensions of the first optical adjustment regions 41A. The other structures of the second transparent electrodes 5A are the same as those of the second transparent electrodes 5 described above in association with FIG. 23 to FIG. 26.

As described according to the present modification by way of example, the shapes of the first optical adjustment regions and the second optical adjustment regions are not limited to a circular shape but may be a quadrilateral shape. According to the knowledge acquired by the present inventor, the optical properties such as the reflectance of the first transparent electrodes 4A and the reflectance of the second transparent electrodes 5A in this case are the same as the optical properties such as the reflectance of the first transparent electrodes 4 and the reflectance of the second transparent electrodes 5 described above in association with FIG. 23 to FIG. 26. For this reason, even in the case where both of the internal boundaries and the external boundaries are visually recognized in a plan view of the capacitive sensor 1, it is inhibited that only the external boundaries are emphasized. For this reason, the first transparent electrodes 4A and the second transparent electrodes 5A are difficult to visually recognize as a pattern. This enables the invisibility of the pattern of the first transparent electrodes 4A and the second transparent electrodes 5A to be improved.

Figure 28:
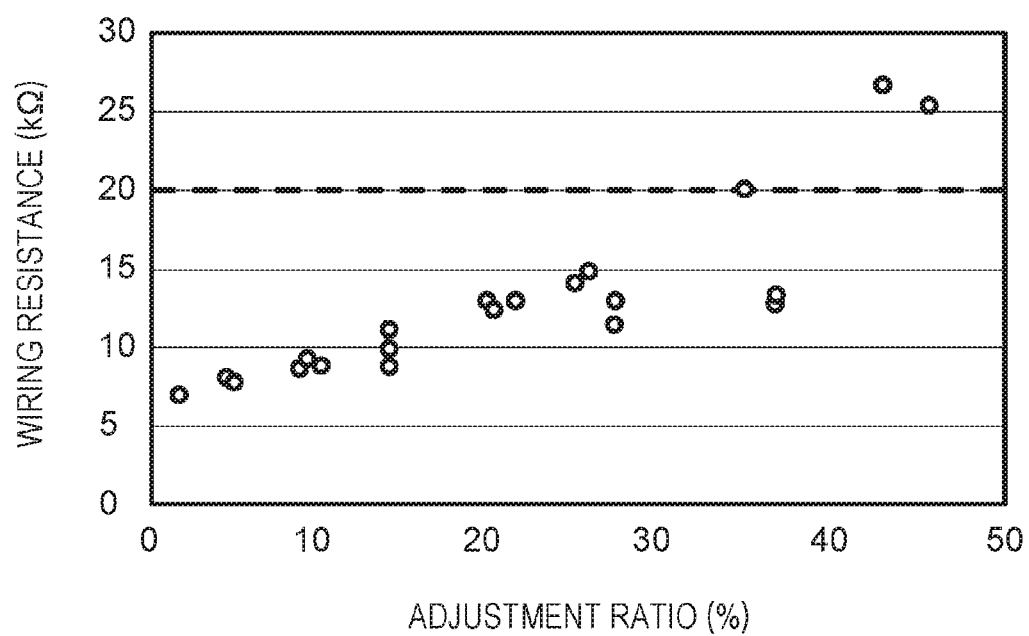
FIG. 28 is a graph illustrating an example of a relationship between an adjustment ratio and wiring resistance.

FIG. 28 is a graph illustrating an example of a relationship between the adjustment ratio and wiring resistance. The horizontal axis of the graph illustrated in FIG. 28 represents the adjustment ratio (%). The vertical axis of the graph illustrated in FIG. 28 represents the wiring resistance (kΩ). In the present specification, the "adjustment ratio" means the area of an optical adjustment region per unit area.

In the graph illustrated in FIG. 28, when the adjustment ratio is relatively high, the wiring resistance is relatively high. According to the knowledge acquired by the present inventor, in the case where a screen size roughly ranges from 4 inches to 6 inches, for example, in the case of a mobile terminal such as a smart phone, the wiring resistance is preferably 20 kΩ or less to ensure the performance of the capacitive sensor 1. In FIG. 28, a dashed line represents 20 kΩ In this case, as seen from the graph illustrated in FIG. 28, the adjustment ratio of the first optical adjustment regions 41 of the first transparent electrodes 4 and the adjustment ratio of the second optical adjustment regions 51 of the second transparent electrodes 5 are preferably 40% or less.

In the case where the adjustment ratio of the first optical adjustment regions 41 and the adjustment ratio of the second optical adjustment regions 51 are 40% or less, the invisibility of the pattern of the first transparent electrodes 4 and the second transparent electrodes 5 is improved, the electric resistance of the first transparent electrode 4 and the electric resistance of the second transparent electrode 5 can be inhibited from increasing, and the performance of the capacitive sensor 1 can be ensured.

In the case where the screen size of a terminal that is equipped with the capacitive sensor 1 according to the present embodiment is about 4 inches or less, the wiring resistance is preferably 30 kΩ or less to ensure the performance of the capacitive sensor 1. In this case, as seen from the graph illustrated in FIG. 28, the adjustment ratio of the first optical adjustment regions 41 of the first transparent electrodes 4 and the adjustment ratio of the second optical adjustment regions 51 of the second transparent electrodes 5 are preferably 45% or less.

Figure 29:
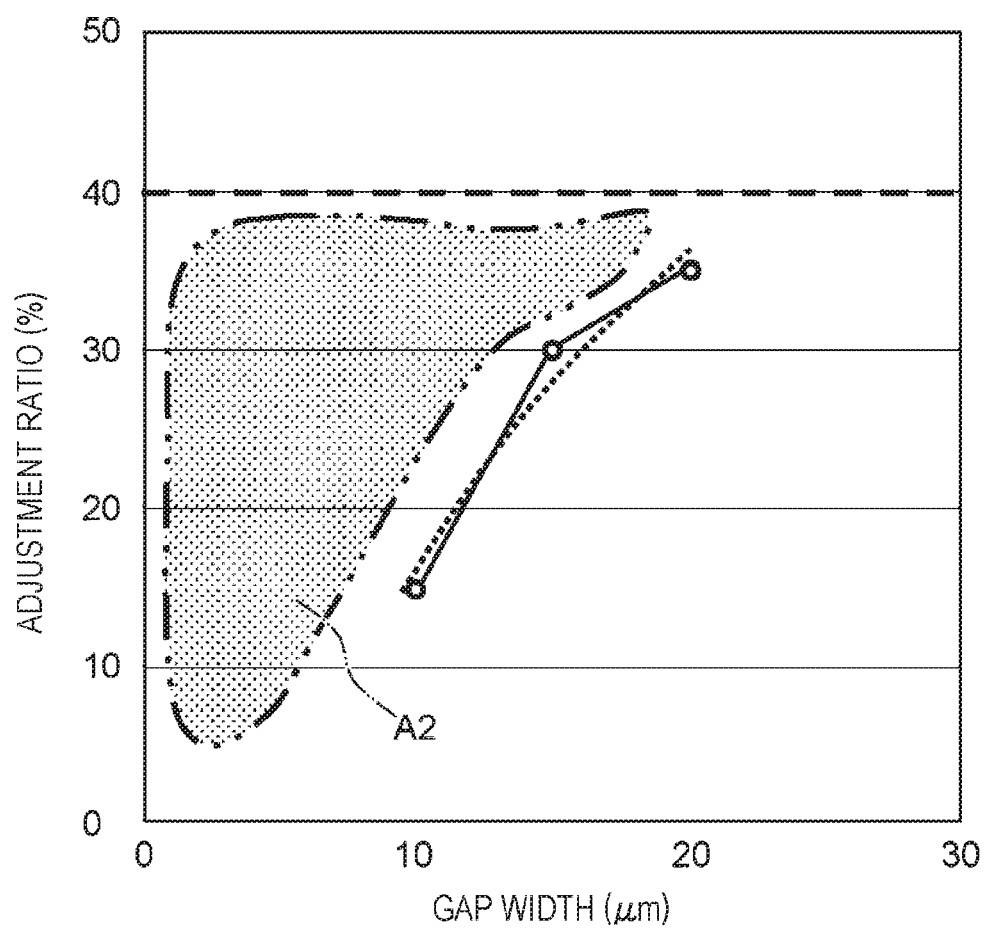
FIG. 29 is a graph illustrating an example of a relationship between a gap width and the adjustment ratio.

FIG. 29 is a graph illustrating an example of a relationship between a gap width and the adjustment ratio.

The horizontal axis of the graph illustrated in FIG. 29 represents the gap width (μm). The vertical axis of the graph illustrated in FIG. 29 represents the adjustment ratio (%). The gap width illustrated in FIG. 29 corresponds to the width D3 of each insulating layer 21 described above in association with FIG. 24.

The present inventor examined the invisibility of the pattern of the first transparent electrodes 4 and the second transparent electrodes 5 in the case where the gap width D3 and the adjustment ratio are changed. In this examination, the present inventor visually determined the invisibility. The conditions of visual determination are as follows.

That is, in a sample that was used in this examination, a transparent electrode including optical adjustment portions was disposed on a sensor film, and a glass substrate adhered to the sensor film with an optical clear adhesive layer interposed therebetween. A light source from which light was radiated to the sample was a three-wavelength daylight-color fluorescent lamp. The illuminance of the light source was 1300 lux (lx). A distance (inspection distance) between the sample and the point of sight was 30 cm. An angle between a straight line (normal) perpendicular to a surface of the sensor film or the glass substrate and the line of sight was no less than 0 degrees and no more than 45 degrees. A black plate was disposed on the opposite side (the back surface of the sample) of the sample from the point of sight.

An example of the results of the examination is illustrated in FIG. 29. That is, in the case where the gap width D3 is 10 μm, the invisibility of the pattern of the first transparent electrodes 4 and the second transparent electrodes 5 is ensured with the adjustment ratio being 15% or more. In the case where the gap width D3 is 15 μm, the invisibility of the pattern of the first transparent electrodes 4 and the second transparent electrodes 5 is ensured with the adjustment ratio being 30% or more. In the case where the gap width D3 is 20 μm, the invisibility of the pattern of the first transparent electrodes 4 and the second transparent electrodes 5 is ensured with the adjustment ratio being 35% or more. That is, when the gap width D3 is relatively great, the adjustment ratio needs to be relatively large in order to ensure the invisibility of the pattern of the first transparent electrodes 4 and the second transparent electrodes 5.

As described above in association with FIG. 28, the adjustment ratio of the first optical adjustment regions 41 and the adjustment ratio of the second optical adjustment regions 51 are preferably 40% or less. As seen from the graph illustrated in FIG. 29, in consideration of the invisibility of the pattern of the first transparent electrodes 4 and the second transparent electrodes 5 and the permissible limit of the wiring resistance, the gap width D3 is preferably no less than 10 μm and no more than 20 μm. That is, in a region A2 illustrated in FIG. 29, the invisibility of the pattern of the first transparent electrodes 4 and the second transparent electrodes 5 and the permissible limit of the wiring resistance are satisfied. As illustrated in FIG. 29, it is seen that there is a correlation between both of the invisibility of the pattern of the first transparent electrodes 4 and the invisibility of the second transparent electrodes 5 and both of the adjustment ratio of the first optical adjustment regions 41 and the adjustment ratio of the second optical adjustment regions 51.

Figure 30:
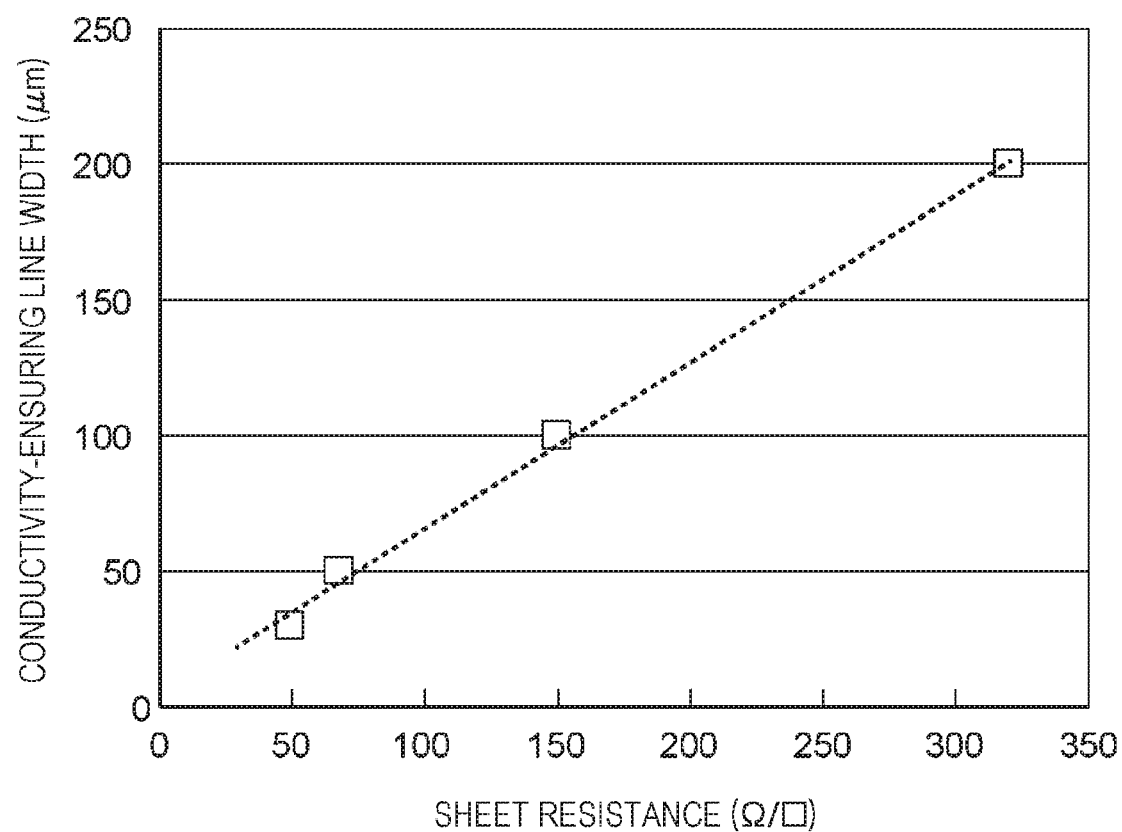
FIG. 30 is a graph illustrating an example of a relationship between sheet resistance and a conductivity-enduring line width.

FIG. 30 is a graph illustrating an example of a relationship between sheet resistance and a conductivity-enduring line width. The horizontal axis of the graph illustrated in FIG. 30 represents the sheet resistance (Ω/□). The vertical axis of the graph illustrated in FIG. 30 represents the conductivity-enduring line width (m). The conductivity-enduring line width means the width of a conductor that is needed to ensure the conductivity and to prevent the conductor from being disconnected. As illustrated in FIG. 30, when the sheet resistance is relatively high, the width (the conductivity-enduring line width) of the conductor that is needed to ensure the conductivity and to prevent the conductor from being disconnected needs to be relatively great.

A dashed line in the graph illustrated in FIG. 30 represents a relationship between the sheet resistance and the conductivity-enduring line width regarding a transparent electrode composed of a material that contains silver nanowires.

According to the knowledge acquired by the present inventor, the lower limit of the sheet resistance of the transparent electrode composed of the material that contains the silver nanowires roughly ranges from 30 to 50Ω/□. Accordingly, as seen from the graph illustrated in FIG. 30, the conductivity-enduring line width regarding the transparent electrode composed of the material that contains the silver nanowires is preferably 30 μm or more.

Consequently, in the conductive regions of the first transparent electrodes 4 that have the first optical adjustment regions 41, a width of 30 μm or more is preferably ensured. For this reason, as described above in association with FIG. 24, a distance D1 between the adjacent first optical adjustment regions 41 is preferably 30 μm or more. The same is true for the second transparent electrodes 5. That is, a distance D2 between the adjacent second optical adjustment regions 51 is preferably 30 μm or more.

In this case, the first transparent electrodes 4 and the second transparent electrodes can be inhibited from being disconnected as a result of the conductive regions being narrow, even with the first transparent electrodes 4 that include the conductive nanowires having the first optical adjustment regions 41 and with the second transparent electrodes 5 that include the conductive nanowires having the second optical adjustment regions 51.

Figure 31:
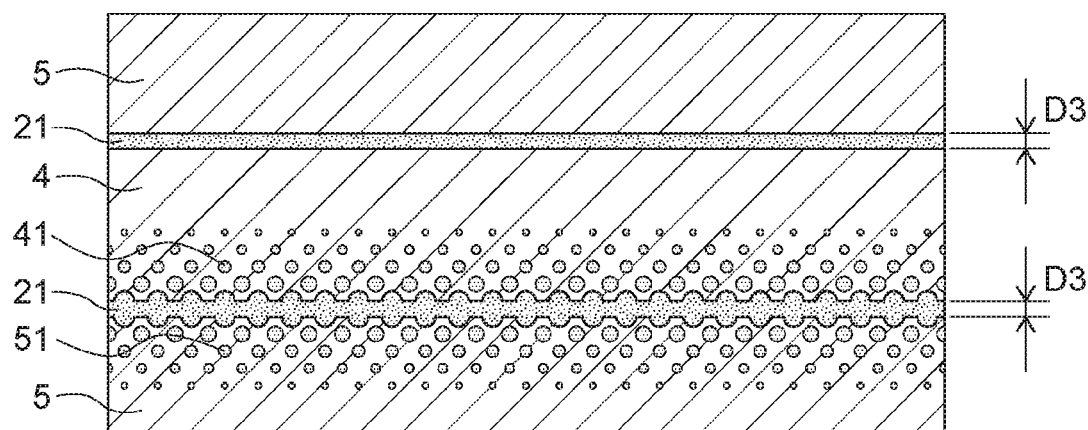
FIG. 31 is a plan view illustrating visibility with optical adjustment portions being disposed near an insulating layer according to the present embodiment.

FIG. 31 is a plan view illustrating visibility with optical adjustment portions being disposed only near an insulating layer 21 according to the present embodiment. In FIG. 31, for convenience of description, two insulating layers 21 between a first transparent electrode 4 and second transparent electrodes 5 are arranged up and down and illustrated. The first transparent electrode 4 is disposed between the two insulating layers 21. The second transparent electrodes 5 are disposed on sides of the two insulating layers 21. The arrangement of the transparent electrodes illustrated in FIG. 31 is arrangement for convenience of description. For this reason, for example, a second transparent electrode 5 may be disposed between the two insulating layers 21, and first transparent electrodes 4 may be disposed on sides of the two insulating layers 21.

The width D3 of the upper insulating layer 21 is equal to the width D3 of the lower insulating layer 21. First optical adjustment regions 41 and second optical adjustment regions 51 are not located near the upper insulating layer 21 of the two insulating layers 21 illustrated in FIG. 31. The first optical adjustment regions 41 and the second optical adjustment regions 51 are located near the lower insulating layer 21 of the two insulating layers 21 illustrated in FIG. 31.

It has been found that in the case where the first optical adjustment regions 41 and the second optical adjustment regions 51 are located only near the insulating layer 21 as illustrated in FIG. 31, the insulating layer 21 is emphasized due to the presence of the first optical adjustment regions 41 and the second optical adjustment regions 51 as compared with the case where the first optical adjustment regions 41 and the second optical adjustment regions 51 are not located near the insulating layer 21. Specifically, some of the first optical adjustment regions 41 and some of the second optical adjustment regions 51, which are originally circular, are semicircular and continuous with the insulating layer 21 having a stripe shape, and a local area is increased by a region composed of the insulating layer 21, the first optical adjustment regions 41, and the second optical adjustment regions 51. As a result, the pattern of the insulating layer 21 that is located between the first transparent electrode 4 and one of the second transparent electrodes is rather emphasized. This tendency becomes pronounced in the case where the optical adjustment regions (the first optical adjustment regions 41 and the second optical adjustment regions 51) are located only near the insulating layer 21, and regions of the transparent electrodes (the first transparent electrodes 4 and the second transparent electrodes 5) distal from the insulating layer 21 include no optical adjustment regions as illustrated in FIG. 31.

Therefore, it is preferable that the first optical adjustment regions 41 be not concentrated near any one of the insulating layers 21 but be uniformly arranged in regions of the first transparent electrodes 4 other than the non-adjustment regions NR. In addition, it is preferable that the second optical adjustment regions 51 be not concentrated near any one of the insulating layers 21 but be uniformly arranged in regions of the second transparent electrodes 5 other than the non-adjustment regions NR. This will be described by using another expression: it is preferable that an optical adjustment region in which an optical adjustment portion is located be located within a conductive region in which a conductive portion is located, and an insulating region in which an insulating layer is located be not in direct contact with the optical adjustment region, and it is preferable that the optical adjustment region be located within a region of a transparent electrode other than a non-adjustment region NR.

Figure 32:
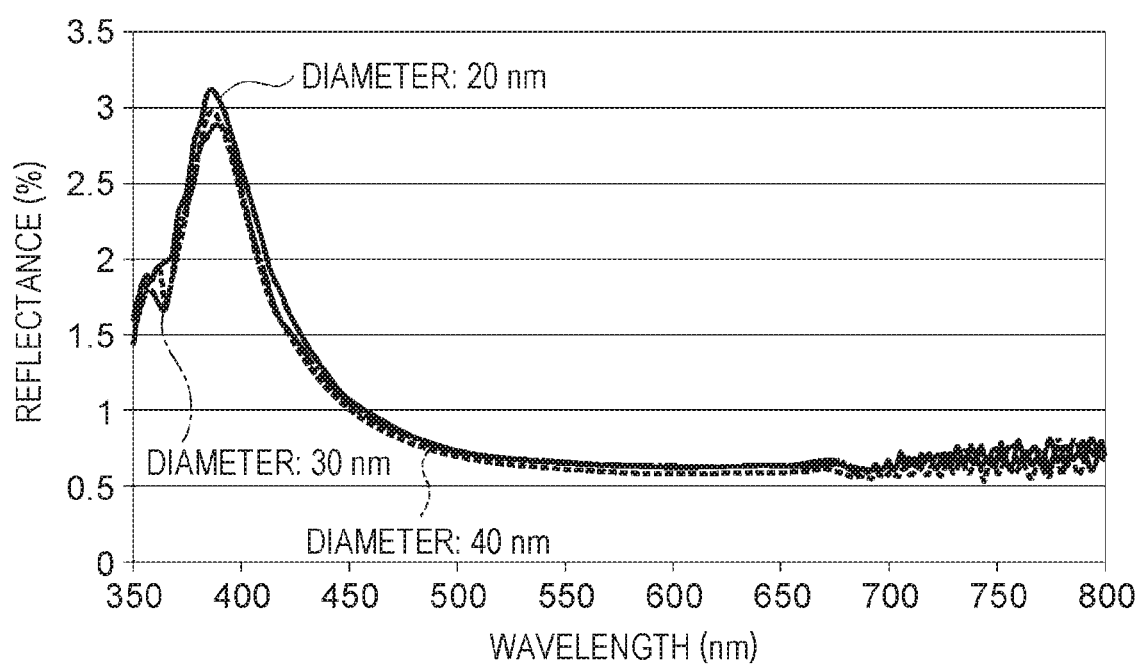
FIG. 32 is a graph illustrating an example of a relationship between reflectance and a wavelength when the diameters of optical adjustment portions are changed.
Figure 33:
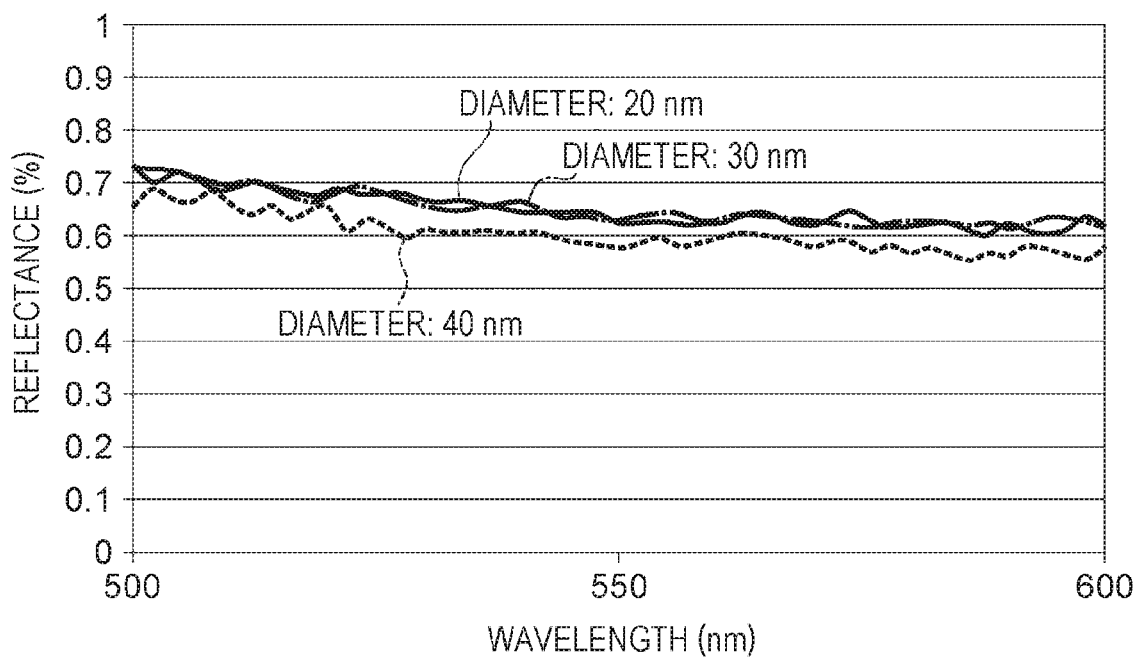
FIG. 33 is a graph illustrating an enlarged portion of the graph illustrated in FIG. 32.

FIG. 32 is a graph illustrating an example of a relationship between the reflectance and a wavelength when the diameters of optical adjustment portions are changed. FIG. 33 is a graph illustrating an enlarged portion of the graph illustrated in FIG. 32. FIG. 33 is the graph illustrating the enlarged portion the wavelength of which is no less than 500 µm and no more than 600 µm in the graph illustrated in FIG. 32.

The present inventor examined a relationship between the reflectance and the wavelength of light in the case where the diameters of rounded (circular) optical adjustment portions were changed. In this examination, the present inventor measured the reflectance of a transparent electrode by using an UV-visible spectrophotometer. A measuring method was expansion reflection. The wavelength for measurement was no less than 250 nm and no more than 800 nm. In a sample that was used, the transparent electrode including the optical adjustment portions was disposed on a sensor film, and a cover material adhered to the sensor film with an optical clear adhesive layer interposed therebetween. The cover material was EAGLE XG (registered trademark) having a thickness of 0.5 mm, manufactured by Corning Incorporated.

An example of the results of the examination is illustrated in FIG. 32 and FIG. 33. That is, when the diameters of the optical adjustment portions are relatively large, the reflectance of the transparent electrodes is relatively low. As seen from the graphs illustrated in FIG. 32 and FIG. 33, the diameter D11 (see FIG. 24) of each first optical adjustment region 41 and the diameter D12 (see FIG. 24) of each second optical adjustment region 51 are preferably 10 µm or more, more preferably 20 µm or more.

According to the knowledge acquired by the present inventor, in the case where the diameters of the optical adjustment portions of the transparent electrodes are more than 100 µm, it is visually confirmed that the invisibility of the pattern of the first transparent electrodes 4 and the second transparent electrodes 5 decreases. The conditions of visual determination are described above in association with FIG. 29. Consequently, the diameter D11 of each first optical adjustment region 41 and the diameter D12 of each second optical adjustment region 51 are preferably 100 µm or less, more preferably 90 µm or less.

In this case, the reflectance of the first transparent electrodes 4 and the second transparent electrodes 5 is inhibited from increasing as a result of the diameter D11 of each first optical adjustment region 41 and the diameter D12 of each second optical adjustment region 51 being too small, and the invisibility of the pattern of the first transparent electrodes 4 and the second transparent electrodes 5 can be ensued. In addition, the internal boundaries are inhibited from being easy to see as a result of the diameter D11 of each first optical adjustment region 41 and the diameter D12 of each second optical adjustment region being too large, and the invisibility of the pattern of the first transparent electrodes 4 and the second transparent electrodes 5 can be ensured.

Figure 34:
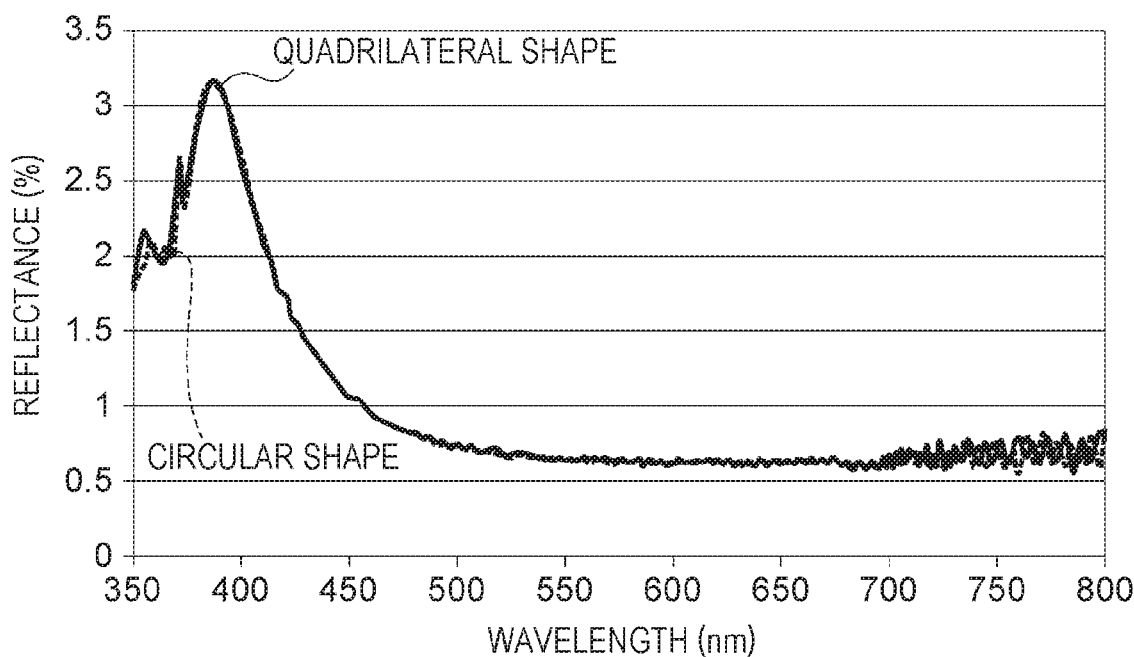
FIG. 34 is a graph illustrating an example of a relationship between the reflectance and the wavelength when the shapes of the optical adjustment portions are changed.
Figure 35:
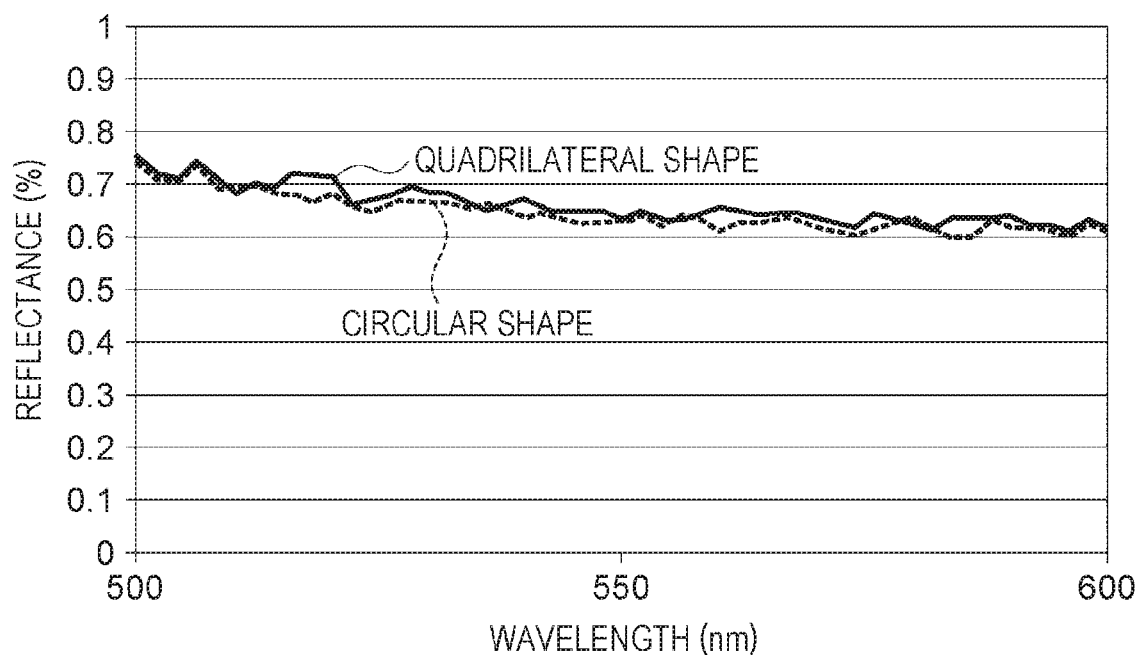
FIG. 35 is a graph illustrating an enlarged portion of the graph illustrated in FIG. 34.

FIG. 34 is a graph illustrating an example of a relationship between the reflectance and the wavelength when the shapes of the optical adjustment portions are changed. FIG. 35 is a graph illustrating an enlarged portion of the graph illustrated in FIG. 34. FIG. 35 is the graph illustrating the enlarged portion the wavelength of which is no less than 500 µm and no more than 600 µm in the graph illustrated in FIG. 34.

The present inventor examined a relationship between the reflectance and the wavelength of light in the case where the shapes of the optical adjustment portions were rounded shapes (circular shapes) and in the case where the shapes were quadrilateral shapes. A method of measuring the reflectance is described above in association with FIG. 32 and FIG. 33.

An example of the results of the examination is illustrated in FIG. 34 and FIG. 35. That is, the reflectance in the case where the shapes of the optical adjustment portions are rounded shapes is substantially equal to the reflectance in the case where the shapes of the optical adjustment portions are quadrilateral shapes. Consequently, the shapes of the first optical adjustment regions and the second optical adjustment regions are not limited to a circular shape but may be a quadrilateral shape as described above in association with FIG. 27. As in the range of the diameters described above in association with FIG. 32 and FIG. 33, the length D13 (see FIG. 27) of the longest diagonal of the diagonals of each quadrilateral first optical adjustment region 41A and the length D14 (see FIG. 27) of the longest diagonal of the diagonals of each quadrilateral second optical adjustment region 51A are preferably 10 µm or more, more preferably 20 µm or more. The length D13 of the diagonal and the length D14 of the diagonal are preferably 100 µm or less, more preferably 90 µm or less.

In this case, the reflectance of the first transparent electrodes 4A and the second transparent electrodes 5A is inhibited from increasing as a result of the length D13 of the diagonal of each first optical adjustment region 41A and the length D14 of the diagonal of each second optical adjustment region 51A being too short, and the invisibility of the pattern of the first transparent electrodes 4A and the second transparent electrodes 5A can be ensued. In addition, the internal boundaries are inhibited from being easy to see as a result of the length D13 of the diagonal of each first optical adjustment region 41A and the length D14 of the diagonal of each second optical adjustment region 51A being too large, and the invisibility of the pattern of the first transparent electrodes 4A and the second transparent electrodes 5A can be ensured.

Figure 39:
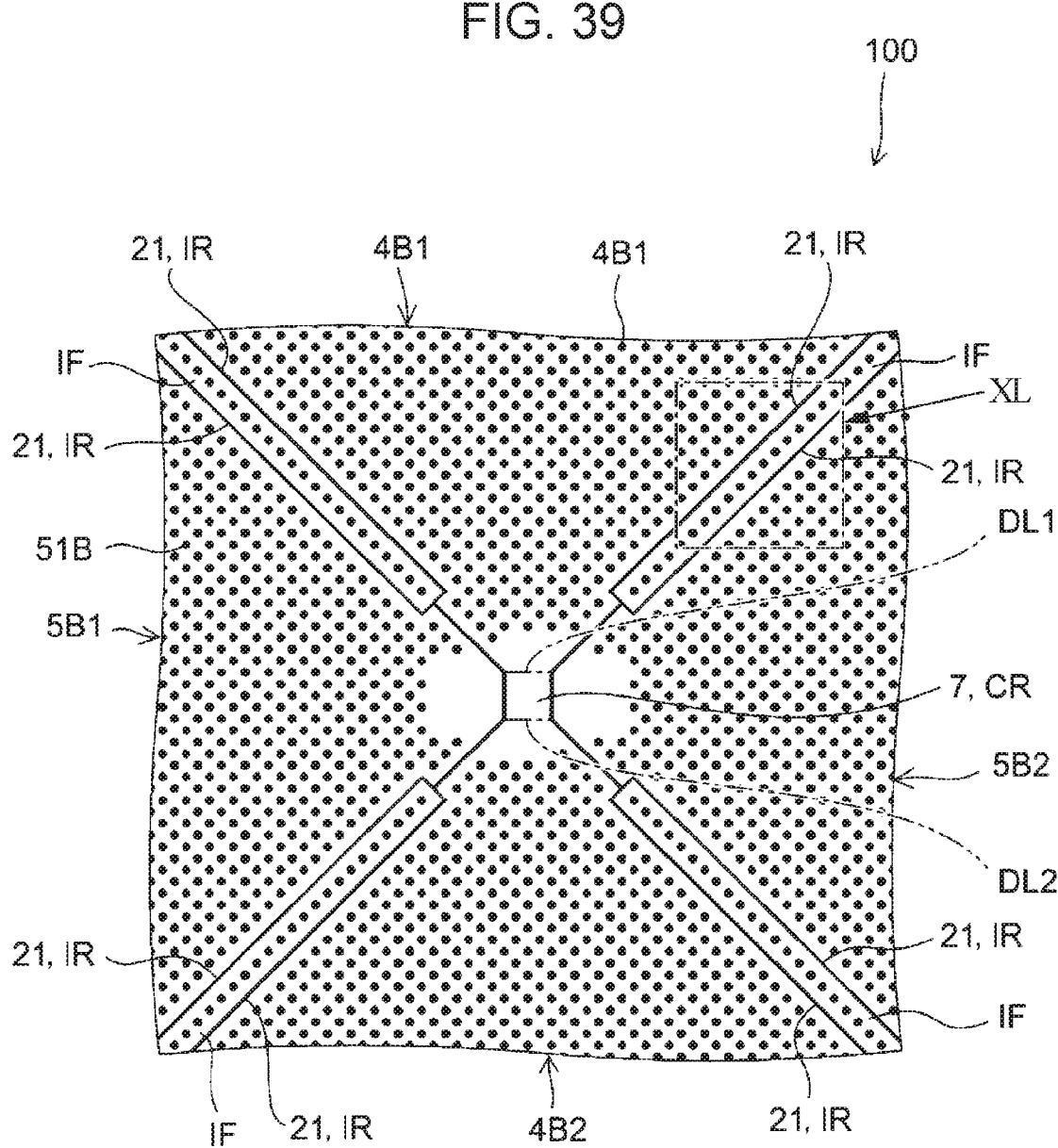
FIG. 39 is a plan view of a part of a detection region of the transparent electrode member according to the present embodiment.

FIG. 39 is a plan view of a part of the detection region of the transparent electrode member according to the present embodiment. FIG. 39 is the enlarged plan view of a region corresponding to the region XXXIX illustrated in FIG. 23. FIG. 39 illustrates two first transparent electrodes arranged in the Y1-Y2 direction, one of which is a first transparent electrode 4B1 at a position corresponding to Y1 in the Y1-Y2 direction, and the other of which is a first transparent electrode 4B2 at a position corresponding to Y2 in the Y1-Y2 direction.

Figure 40:
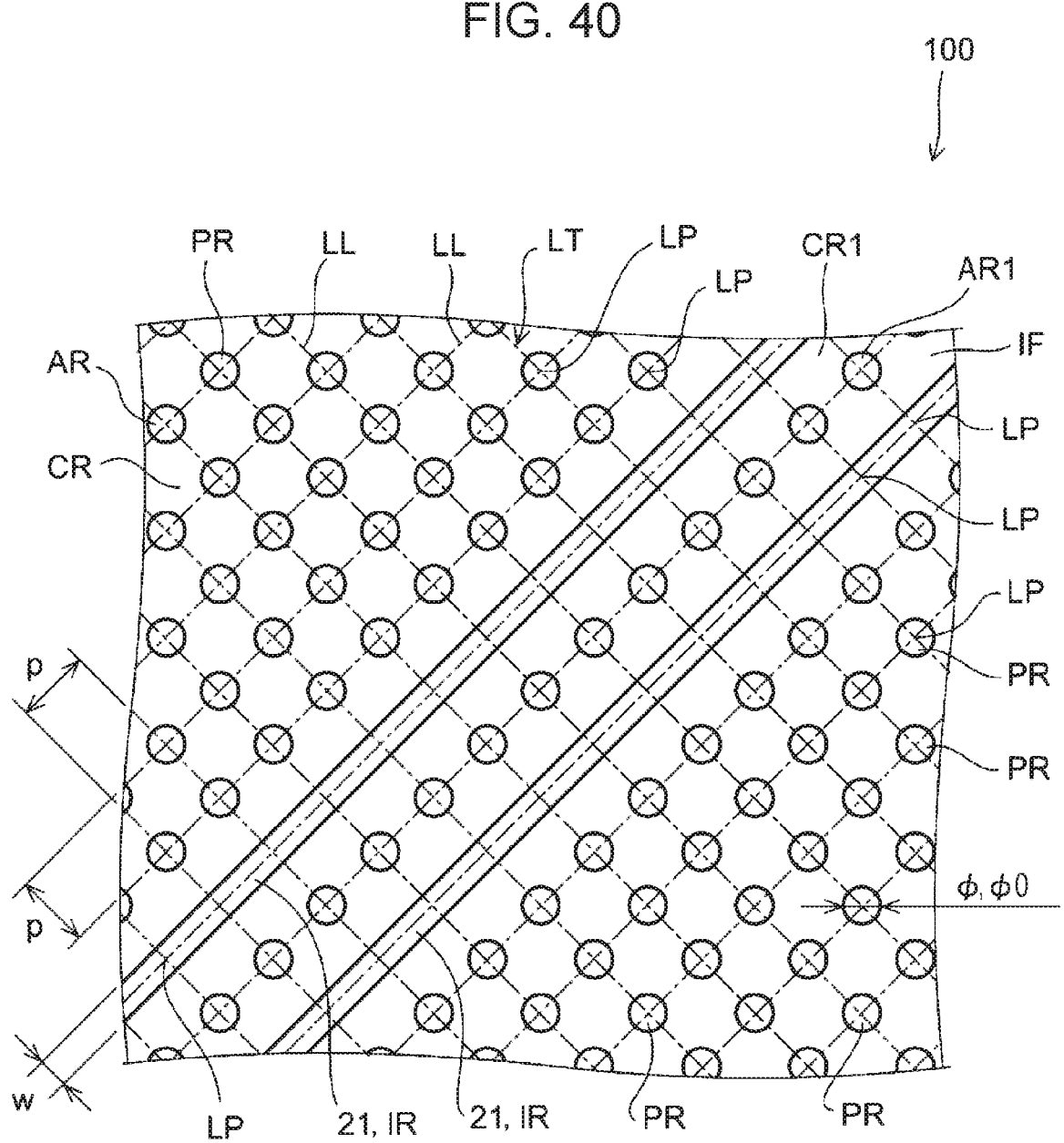
FIG. 40 is an enlarged plan view of a part of the detection region of the transparent electrode member according to the present embodiment.

FIG. 40 is an enlarged plan view of a part of the detection region of the transparent electrode member according to the present embodiment. FIG. 40 is the enlarged plan view of a region corresponding to a region A3 illustrated in FIG. 39.

The first transparent electrodes 4B1 and 4B2 in this example have first optical adjustment regions 41B that are substantially circular, second transparent electrodes 5B1 and 5B2 have second optical adjustment regions 51B that are substantially circular, and the insulating layers 21 are located between the first transparent electrodes 4B1 and 4B2 and the second transparent electrodes 5B1 and 5B2, which are common to the example illustrated in FIG. 24. An illustration of the insulating portions 20 and the bridge wiring portions 10 is omitted for convenience of description.

The coupling member 7 is a transparent wire (the first transparent wire) that is located between the first transparent electrode 4B1 and the first transparent electrode 4B2 in the Y1-Y2 direction (the first direction) and that electrically connects the first transparent electrode 4B1 and the first transparent electrode 4B2 to each other. Specifically, as illustrated in FIG. 39, the first transparent electrode 4B1 is located on a side of the coupling member 7 corresponding to Y1 in the Y1-Y2 direction (the first direction), and the first transparent electrode 4B2 is located on a side of the coupling member 7 corresponding to Y2 in the Y1-Y2 direction (the first direction). The first transparent electrode 4B1 and the coupling member 7 are continuous bodies that are in contact with each other along a first boundary line DL1, and the first transparent electrode 4B2 and the coupling member 7 are continuous bodies that are in contact with each other along a second boundary line DL2, when viewed in the Z1-Z2 direction (the direction of the normal to the first surface S1).

Another coupling member 7 as a continuous body in contact with a side of the first transparent electrode 4B1 corresponding to Y1 in the Y1-Y2 direction (the first direction) is disposed along a second boundary line DL2 when viewed in the Z1-Z2 direction (the direction of the normal to the first surface S1), although this is not illustrated. Another coupling member 7 as a continuous body in contact with a side of the first transparent electrode 4B2 corresponding to Y2 in the Y1-Y2 direction (the first direction) is disposed along a first boundary line DL1 when viewed in the Z1-Z2 direction (the direction of the normal to the first surface S1). The first transparent electrodes 4B1 and 4B2 are thus electrically connected to each other by using the coupling members 7, and a first electrode coupling body 8 that extends in the Y1-Y2 direction (the first direction) is formed.

Dummy regions IF that are electrically isolated by the insulating layers 21 from the first transparent electrodes 4B1 and 4B2 and the second transparent electrodes 5B1 and 5B2 are provided between the first transparent electrodes 4B1 and 4B2 and the second transparent electrodes 5B1 and 5B2 adjacent to each other and are surrounded by the insulating layers 21. The dummy regions IF have structures common to those of the conductive regions CR of the first transparent electrodes 4B1 and 4B2 and the second transparent electrodes 5B1 and 5B2, that is, include dummy conductive regions CR1 that contain conductive nanowires dispersing in an insulating material as a matrix. Providing the dummy regions IF enables the separation distances between the first transparent electrodes 4B1 and 4B2 and the second transparent electrodes 5B1 and 5B2 in an XY plane to be changed with the invisibility inhibited from being affected. The capacitance between the electrodes can be adjusted by changing the separation distances between the electrodes.

From the perspective that the visibility of the dummy regions IF is decreased, in the dummy regions IF, substantially circular dummy optical adjustment regions AR1 are discretely arranged within the dummy conductive regions CR1 in a plan view as in the first optical adjustment regions 41B and the second optical adjustment regions 51B. The dummy optical adjustment regions AR1 are formed in the same manner as the first optical adjustment regions 41B and the second optical adjustment regions 51B (a method of removing the conductive nanowires at least from a surface portion of the insulating material as the matrix) and have structures common to those of the first optical adjustment regions 41B and the second optical adjustment regions 51B.

The optical adjustment regions AR (the first optical adjustment regions 41B and the second optical adjustment regions 51B) and the dummy optical adjustment regions AR1 include partial regions PR that are located at lattice points LP of a lattice LT along the first surface S1 when viewed in the Z1-Z2 direction (the direction of the normal to the first surface S1). That is, in the case where the imaginary lattice LT along the first surface S1 is defined, the partial regions PR are located at the lattice points LP of the lattice LT. According to the present embodiment, angles between the direction of lattice lines LL of the lattice LT and the X1-X2 direction and the Y1-Y2 direction are 45 degrees. From the perspective that the invisibility of each partial region PR is ensured, the diameter ϕ0 of the partial region PR in terms of a circle is preferably 100 μm or less.

The insulating layers 21 that are disposed in the insulating regions IR (the insulating layers 21 that are located between the first transparent electrodes 4B1 and 4B2 and the second transparent electrodes 5B1 and 5B2 adjacent to each other, the insulating layers 21 that are located between the first transparent electrodes 4B1 and 4B2 and the dummy regions IF adjacent to each other, and the insulating layers 21 that are located between the second transparent electrodes 5B1 and 5B2 and the dummy regions IF adjacent to each other) do not overlap the partial regions PR and are disposed on lines connecting some of the lattice points LP when viewed in the Z1-Z2 direction (the direction of the normal to the first surface S1). That is, the insulating layers 21 (the insulating regions IR) are disposed so as to extend through (connect) some of the lattice points LP.

In an example illustrated in FIG. 40, the insulating layers 21 are disposed so as to linearly extend along the lattice lines LL. As a result of such arrangement, the direction in which the partial regions PR are arranged and the direction in which the insulating layers 21 extend match the direction in which the lattice points LP are arranged, and the partial regions PR and the insulating layers 21 are difficult to visually distinguish. Each insulating layer 21 may have the shape of a broken line when viewed in the Z1-Z2 direction (the direction of the normal to the first surface S1). In this case, each insulating layer 21 has the shape of a broken line that linearly extends between two lattice points and that has a bend point at a lattice point. Alternatively, each insulating layer 21 may extend between two lattice points and may have a curved portion therebetween when viewed in the Z1-Z2 direction (the direction of the normal to the first surface S1).

The minimum value (a width w) of the length of the insulating layers 21 in a direction intersecting an extension direction is preferably 10 μm or more when viewed in the Z1-Z2 direction (the direction of the normal to the first surface S1) from the perspective that the insulation properties between the first transparent electrodes 4B1 and 4B2 and the second transparent electrodes 5B1 and 5B2 adjacent to each other are appropriately maintained. From the perspective that the invisibility of the insulating layers 21 is ensured, the width w of the insulating layers 21 is preferably 20 μm or less. Also in consideration of the diameter ϕ0 of the partial regions PR in terms of a circle and the width w of the insulating layers 21, the spacing (lattice spacing p) of the imaginary lattice LT is set such that Sa/Sb described below is in the appropriate range.

Figure 41:
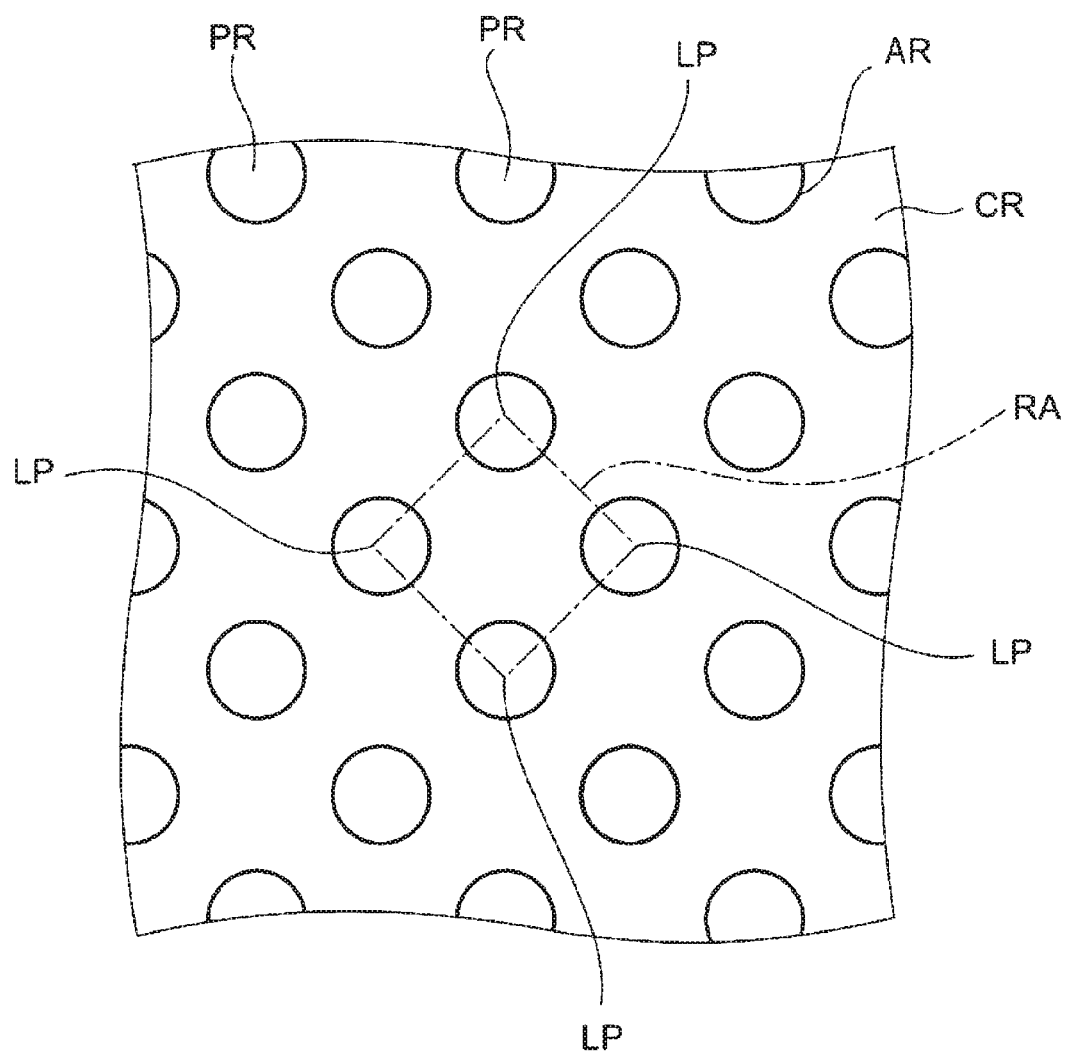
FIG. 41 is a plan view of an example of a rectangular region.

FIG. 41 is a plan view of an example of a rectangular region that is defined in a first method. As illustrated in FIG. 41, a rectangular region RA means a rectangular region defined such that four adjacent lattice points LP of the lattice points LP correspond to the corners thereof. Among rectangular regions RA that are presumed in an in-plane direction of the first surface S1, a rectangular region RA in which a part other than the conductive portion 111 is composed of the partial regions PR over the entire part is defined as a first rectangular region RA1 Among the rectangular regions RA, a rectangular region RA in which at least the insulating layer 21 is contained is defined as a second rectangular region RA2.

In this case, in the transparent electrode member 100 according to the present embodiment, the area Sa of the part other than the conductive portion 111 in the first rectangular region RA1 and the area Sb of a part other than the conductive portion 111 in the second rectangular region RA2 satisfy Sa/Sb=1±0.3. Specifically, the part other than the conductive portion 111 is composed of a region (the insulating region IR) composed of the insulating layer 21 other than the conductive region CR or the partial region PR. The relationship in the arrangement of the partial regions PR and the insulating layers 21 and the relationship between the areas Sa and Sb as described above are thus satisfied, and the insulating layers 21 are consequently disposed with the same regularity regarding an appearance as that with which the partial regions PR are arranged, in a group of the partial regions PR that are regularly arranged. As a result, the partial regions PR and the insulating layers 21 are difficult to visually distinguish, and the invisibility can be improved. That is, the lines of the insulating layers 21 are hidden in the regular arrangement of the partial regions PR, and the lines of the insulating layers 21 are inconspicuous when a wide range (for example, the whole) of the transparent electrode 110 is viewed, and the invisibility is improved.

FIG. 42A to FIG. 43D schematically illustrate the kinds of the rectangular region that is defined in the first method. The rectangular region RA is defined in the first method such that four adjacent lattice points LP of the lattice points LP correspond to the corners thereof.

Figure 42A:
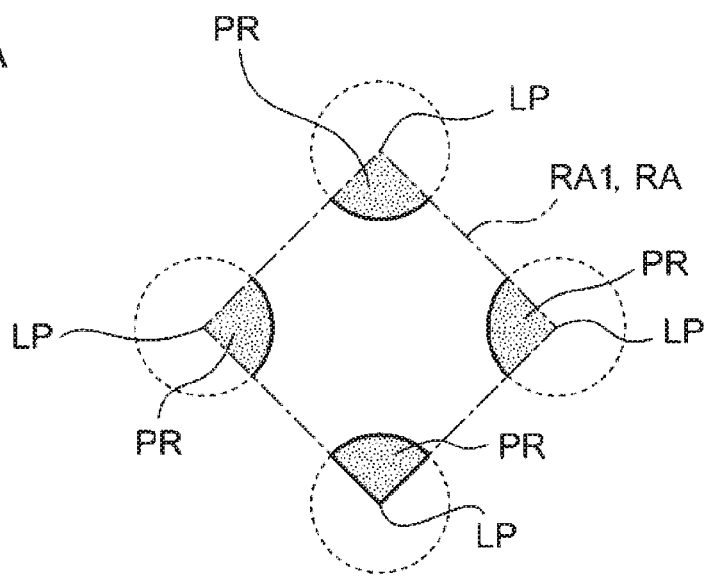
FIG. 42A to FIG. 42C schematically illustrate the kinds of the rectangular region by way of example.
Figure 42B:
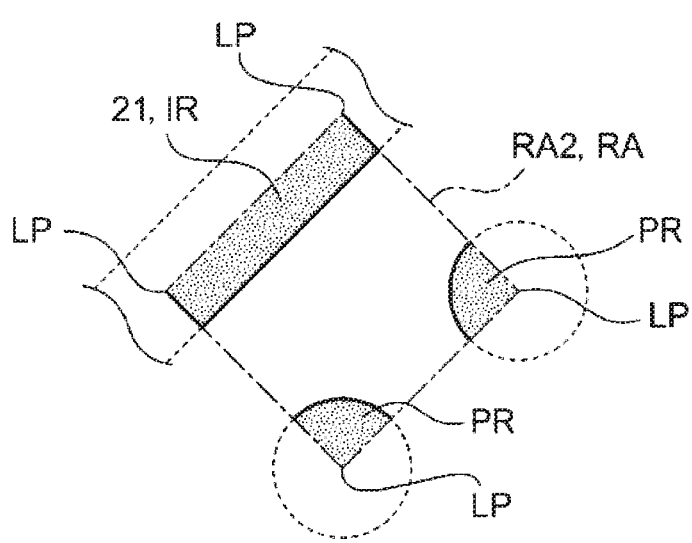

The rectangular region RA illustrated in FIG. 42A is an example of the first rectangular region RA1. As for the first rectangular region RA1, the partial regions PR are located on all of the four lattice points LP at the corners of the rectangular region RA. In the case where the partial regions PR are circular, the area Sa in the first rectangular region RA1 is given as (SPR/4)×4, where SPR is the area of the circle.

The rectangular regions RA illustrated in FIG. 42B to FIG. 43D are examples of the second rectangular region RA2. The second rectangular region RA2 illustrated in FIG. 42B contains the insulating layer 21 such that among four lattice points LP, two lattice points LP adjacent to each other along the lattice line LL are connected to each other, and the partial regions PR are located on the other two lattice points LP. The area Sb in the second rectangular region RA2 is given as (SPR/4)×2+S21a, where S21a is the area of the insulating layer 21 that connects the two lattice points LP adjacent to each other along the lattice line LL within the second rectangular region RA2 as in the second rectangular region RA2 illustrated in FIG. 42B.

Figure 42C:
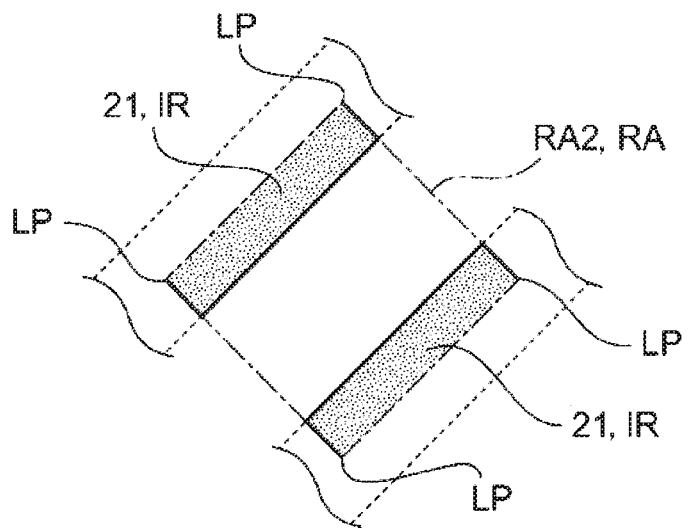

As for the second rectangular region RA2 illustrated in FIG. 42C, the two insulating layers 21 are disposed parallel to each other such that sets of two lattice points LP adjacent to each other along the respective lattice lines LL among four lattice points LP are connected to each other. That is, the second rectangular region RA2 illustrated in FIG. 42C contains only the insulating layers 21. The area Sb in the second rectangular region RA2 is given as S21a×2.

Figure 43A:
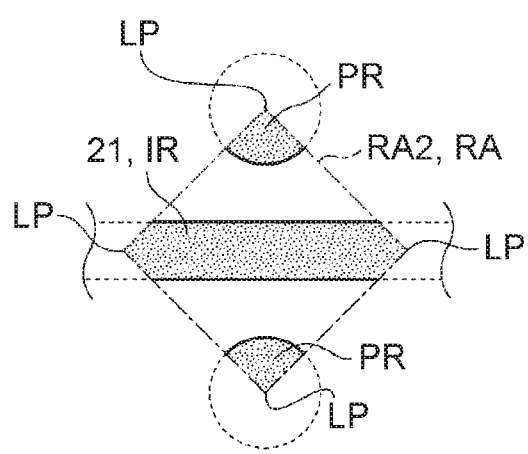
FIG. 43A to FIG. 43D schematically illustrate the kinds of the rectangular region by way of example.

As for the second rectangular region RA2 illustrated in FIG. 43A, the insulating layer 21 is disposed such that two lattice points LP that face each other among four lattice points LP are connected to each other, and the partial regions PR are located on the other two lattice points LP that face each other. The area Sb in the second rectangular region RA2 is given as (SPR/4)×2+S21b, where S21b is the area of the insulating layer 21 that is disposed such that the two lattice points LP that face each other among the four lattice points LP are connected to each other within the second rectangular region RA2 as in the second rectangular region RA2 illustrated in FIG. 43A.

Figure 43B:
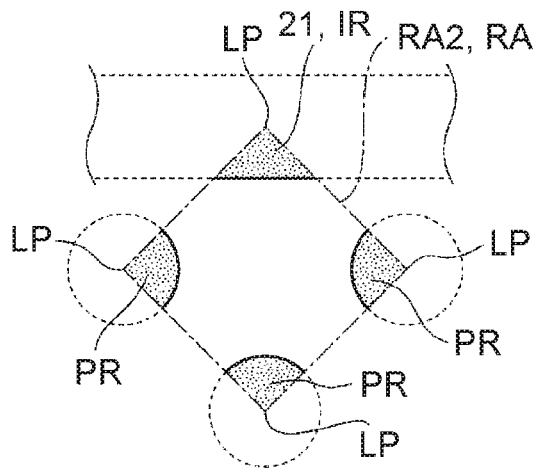

As for the second rectangular region RA2 illustrated in FIG. 43B, the insulating layer 21 passes through a single lattice point LP among four lattice points LP, and the partial regions PR are located on the other three lattice points LP. The area Sb in the second rectangular region RA2 is given as (SPR/4)×3+S21c, where S21c is the area of the insulating layer 21 that passes through the single lattice point LP within second rectangular region RA2 as in the second rectangular region RA2 illustrated in FIG. 43B.

Figure 43C:
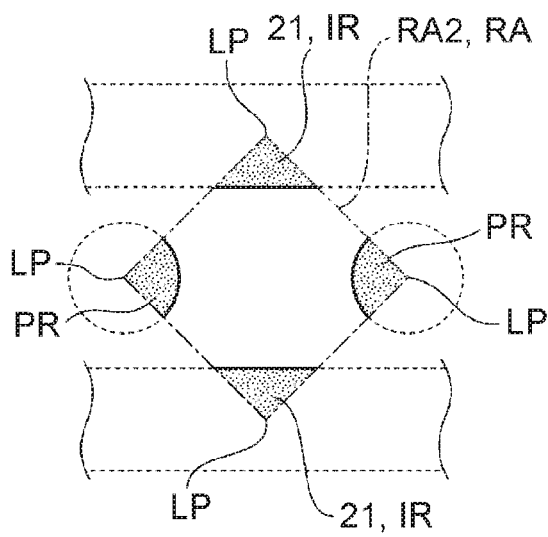

As for the second rectangular region RA2 illustrated in FIG. 43C, the insulating layers 21 pass through two respective lattice points LP that face each other among four lattice points LP, and the partial regions PR are located on the other two lattice points LP. The area Sb in the second rectangular region RA2 is given as (SPR/4)×2+(S21c×2).

Figure 43D:
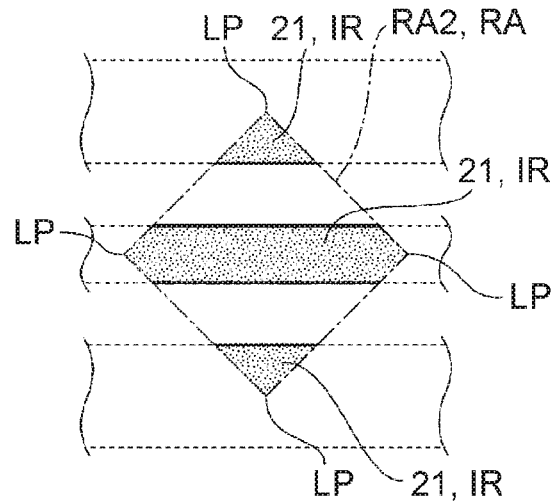
Figure 46:
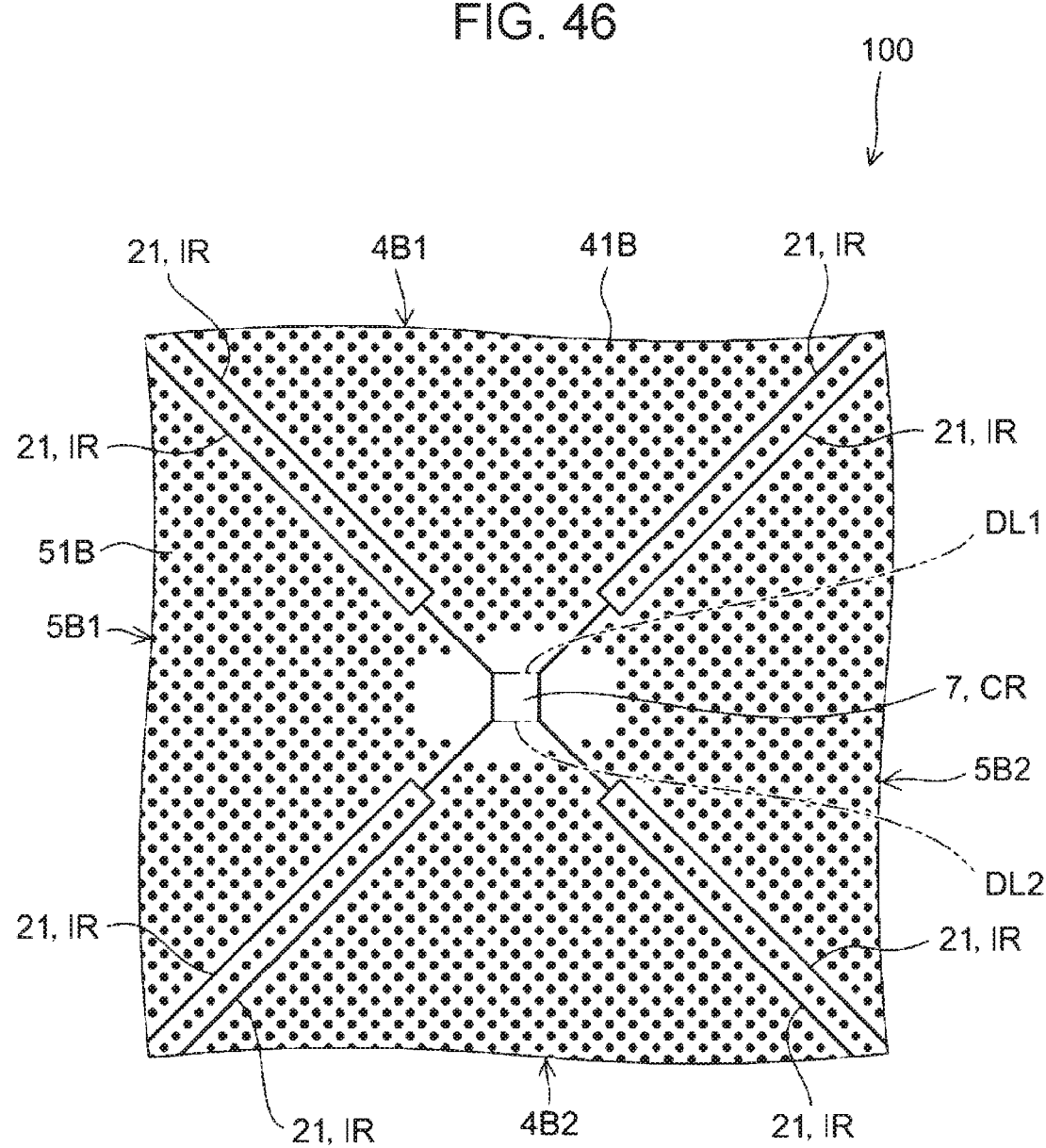
FIG. 46 is a plan view of an example of the transparent electrode member in the case where the diameter of the circular partial regions is changed.

As for the second rectangular region RA2 illustrated in FIG. 43D, the insulating layers 21 pass through two lattice points LP that face each other among four lattice points LP, and the other insulating layer 21 is disposed such that the other two lattice points LP are connected to each other. That is, the second rectangular region RA2 illustrated in FIG. 43D contains only the insulating layers 21. The area Sb in the second rectangular region RA2 is given as (S21c×2)+S21b.

FIG. 44 to FIG. 50 illustrate plan views of examples of the transparent electrode member in the case where the diameter of the circular partial regions is changed. FIG. 51 is a plan view of an example of a transparent electrode member in a reference example.

In the transparent electrode member illustrated in FIG. 44 to FIG. 50, the lattice spacing p is fixed at 68 μm, and the arrangement of the circular partial regions PR and the arrangement of the insulating layers 21 are the same. The width w of the insulating layers 21 is also fixed at 10 μm. Accordingly, in the transparent electrode member illustrated in FIG. 44 to FIG. 50, the diameter φ (equal to the diameter φ0 in terms of a circle) of the circular partial regions PR is changed to change Sa/Sb that is calculated based on the rectangular region that is defined in the first method. Table 1 illustrates a relationship between the diameter φ of the circular partial regions PR and Sa/Sb that is calculated based on the rectangular region RA that is defined in the first method.

TABLE 1

| Figure Number | φ (μm) | Sa/Sb |
|---|---|---|
| 44 | 25 | 1.19 |
| 45 | 29.6 | 1.00 |
| 46 | 33.4 | 0.89 |
| 47 | 35 | 0.85 |
| 48 | 39 | 0.79 |
| 49 | 40 | 0.77 |
| 50 | 45 | 0.71 |

In a transparent electrode member 1000 in the reference example illustrated in FIG. 51, partial regions PR are located at lattice points LP, insulating layers 21 are disposed on lines connecting some of the lattice points LP to each other, but the insulating layers 21 and the partial regions PR overlap. In the transparent electrode member in the reference example illustrated in FIG. 51, the partial regions PR and the insulating layers 21 are arranged so as to match the arrangement of the lattice points LP, but the insulating layers 21 and the partial regions PR overlap. Accordingly, the lines of the insulating layers 21 are easy to see, and the invisibility cannot be sufficiently obtained.

In the case were the partial regions PR and the insulating layers 21 are arranged so as to match the arrangement of the lattice points LP, and the insulating layers 21 and the partial regions PR do not overlap as in the examples illustrated in FIG. 44 to FIG. 50, the invisibility changes depending on the value of Sa/Sb. The invisibility was checked with the value of Sa/Sb changed as illustrated in FIG. 44 to FIG. 50, and the result was that when Sa/Sb=1±0.3 is satisfied, the invisibility can be sufficiently obtained unlike the reference example.

Each rectangular region RA may be a rectangular region that is defined in a second method described below instead of the rectangular region that is defined in the first method described above, that is, the rectangular region in which four adjacent lattice points LP correspond to the corners thereof. The rectangular region RA that is defined in the second method is such that four adjacent lattice points LP of the lattice points LP are located around a single centered lattice point LP and correspond to the corners thereof.

Figure 52:
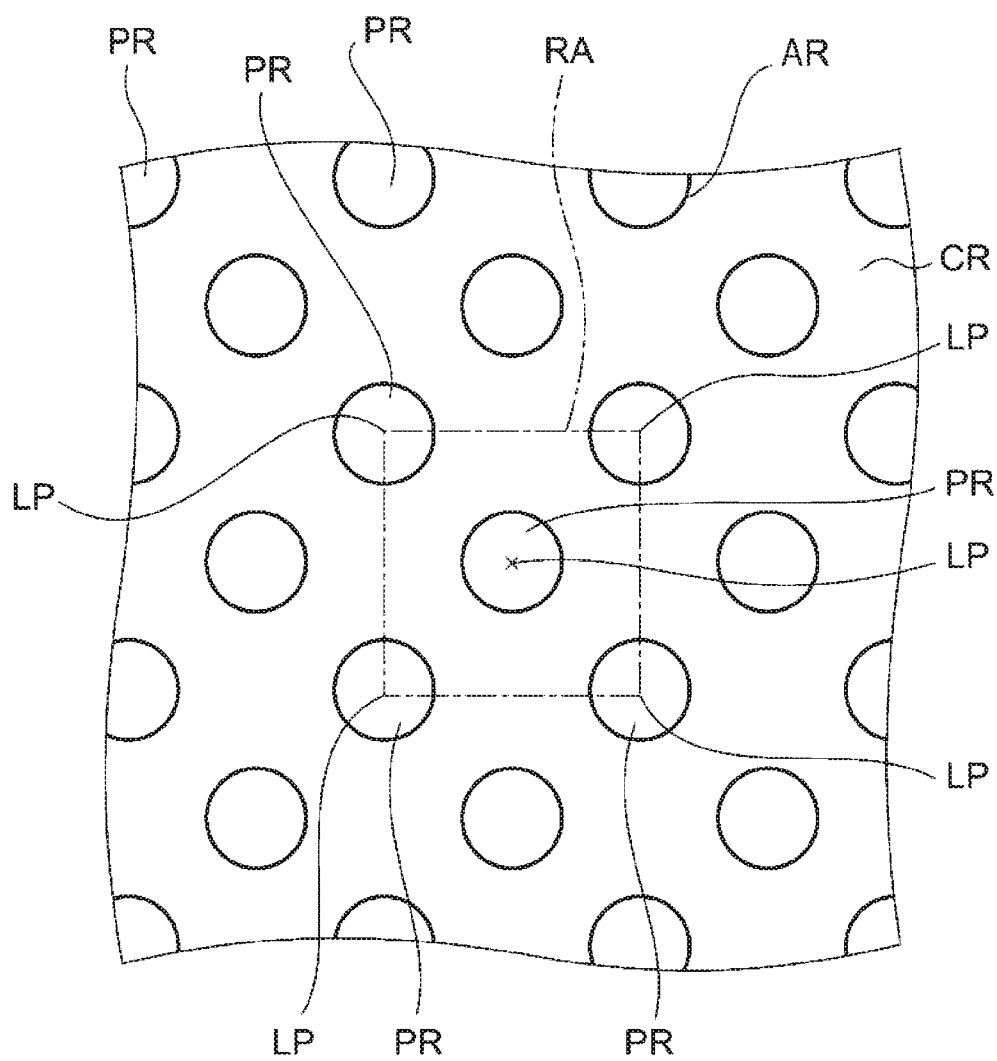
FIG. 52 is a plan view of another example of the rectangular region.

FIG. 52 is a plan view of an example of the rectangular region that is defined in the second method. The rectangular region RA illustrated in FIG. 52 is a rectangular region in which four adjacent lattice points LP around a single lattice point LP correspond to the corners thereof, based on the second method.

FIG. 53A to FIG. 54B schematically illustrate the kinds of the rectangular region that is defined in the second method by way of example.

Figure 53A:
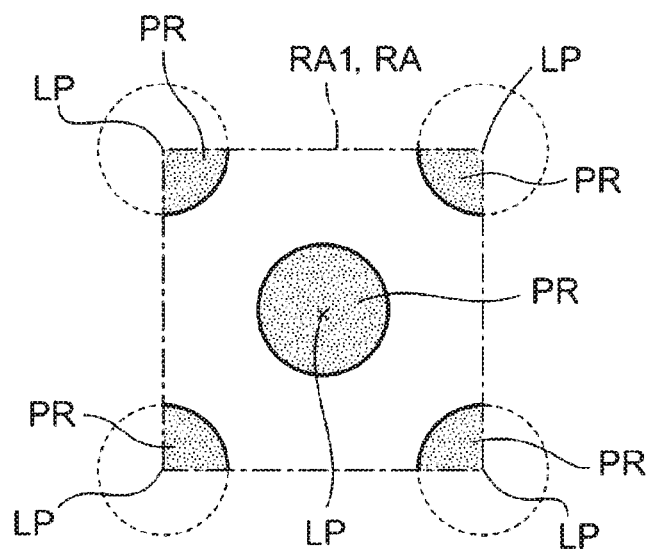
FIG. 53A and FIG. 53B schematically illustrate other kinds of the rectangular region by way of example.
Figure 53B:
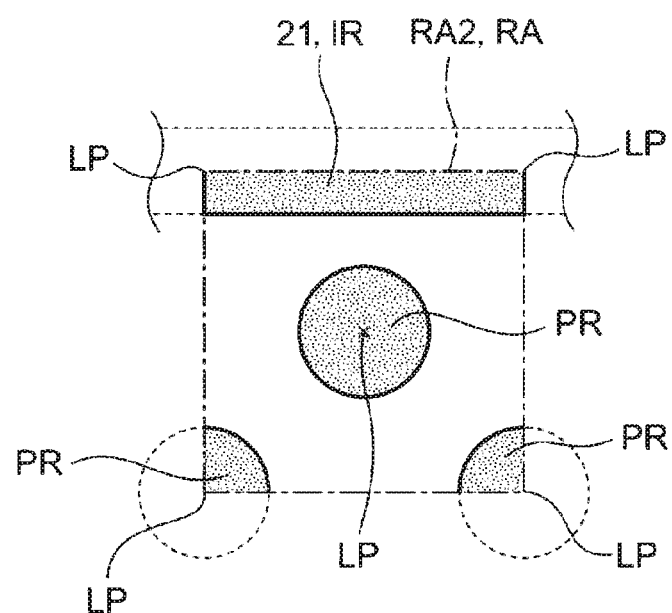

The rectangular region RA illustrated in FIG. 53A is an example of the first rectangular region RA1. As for the first rectangular region RA1, the partial regions PR are located on a single centered lattice point LP and all of four lattice points LP at corners. In this case, the area Sa in the first rectangular region RA1 is given as (SPR/4)×4+SPR.

The rectangular regions RA illustrated in FIG. 53B to FIG. 54B are examples of the second rectangular region RA2. The second rectangular region RA2 illustrated in FIG. 53B contains the insulating layer 21 such that among four lattice points LP that are located around a single centered lattice point LP, two adjacent lattice points LP are connected to each other, and the partial regions PR are located on the other two lattice points LP and the single centered lattice point LP. In this case, the area Sb in the second rectangular region RA2 is given as (SPR/4)×2+SPR+S21a.

Figure 54A:
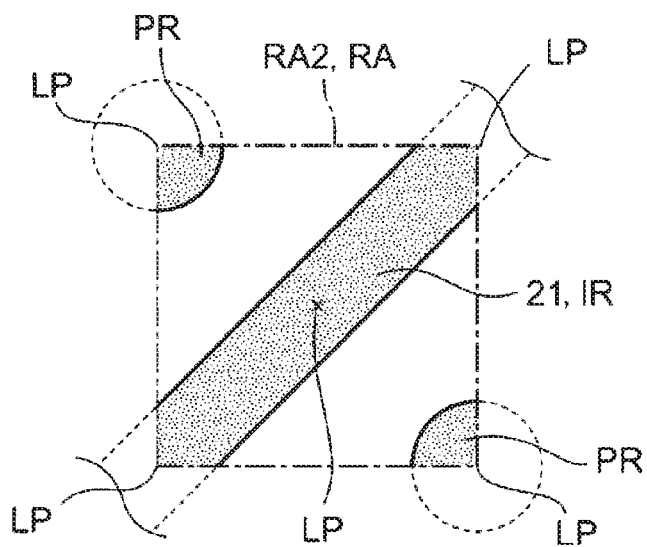
FIG. 54A and FIG. 54B schematically illustrate other kinds of the rectangular region by way of example.

As for the second rectangular region RA2 illustrated in FIG. 54A, the insulating layer 21 is disposed such that a single centered lattice point LP and two lattice points LP that face each other among four lattice points LP are connected to each other, and the partial regions PR are located on the other two lattice points LP that face each other. In this case, the area Sb in the second rectangular region RA2 is given as (SPR/4)×2+S21b.

Figure 54B:
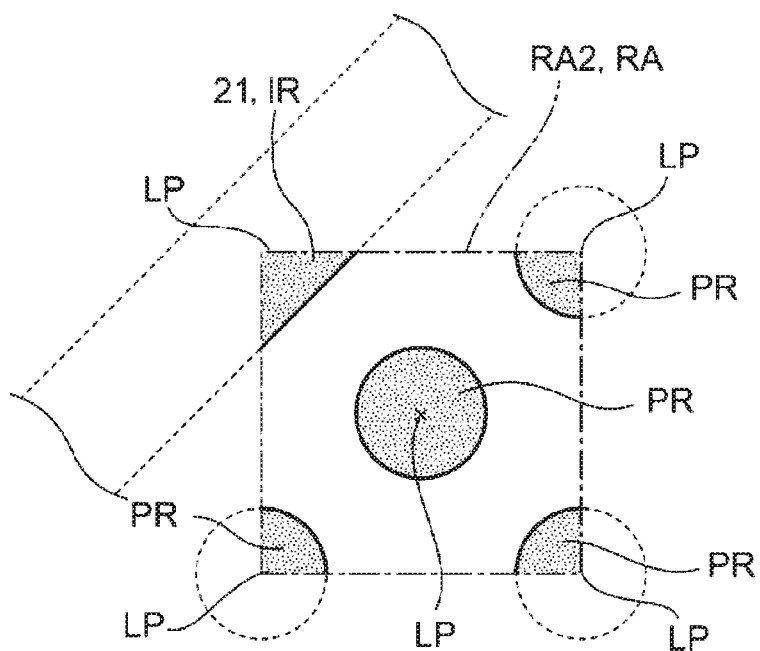

As for the second rectangular region RA2 illustrated in FIG. 54B, the insulating layer 21 passes through a single lattice points LP among four lattice points LP around a single centered lattice point LP, and the partial regions PR are located on the other four lattice points LP. In this case, the area Sb in the second rectangular region RA2 is given as (SPR/4)×3+SPR+S21c.

The kinds of the layout of the rectangular region RA in the second method other than those illustrated in FIG. 52(a) to FIG. 53B can include the following layouts:

(1) A layout in which a partial region PR is located on a single centered lattice point LP, and two insulating layers 21 are disposed such that sets of two adjacent lattice points of four peripheral lattice points LP are connected to each other;

(2) A layout in which an insulating layer 21 passes through a single centered lattice point LP, an insulating layer 21 is disposed such that two adjacent lattice points of four peripheral lattice points LP are connected to each other, partial regions PR are located on the other two adjacent lattice points LP;

(3) A layout in which an insulating layer 21 passes through a single centered lattice point LP, and two insulating layers 21 are disposed such that sets of two adjacent lattice points of four peripheral lattice points LP are connected to each other;

(4) A layout in which an insulating layer 21 is disposed such that a single centered lattice point LP and two lattice points LP that face each other among four peripheral lattice points LP are connected to each other, an insulating layer 21 passes through a single lattice point LP of the other two lattice points LP that face each other, and a partial region PR is located on the other single lattice point LP;

(5) A layout in which partial regions PR are located on a single centered lattice point LP and two lattice points LP that face each other among four peripheral lattice points LP, and two insulating layers 21 pass through the other two respective lattice points LP; and (6) A layout in which an insulating layer 21 is disposed such that a single centered lattice point LP and two lattice points LP that face each other among four lattice points LP are connected to each other, and two insulating layers 21 pass through the other two respective lattice points LP.

Table 2 illustrates the result of calculation of Sa/Sb in the examples illustrated in FIG. 44 to FIG. 50 by using the rectangular region RA in the second method illustrated in FIG. 52.

TABLE 2

| figure Number | φ (µm) | Sa/Sb |
|---|---|---|
| 44 | 25 | 1.59 |
| 45 | 29.6 | 1.20 |
| 46 | 33.4 | 1.00 |
| 47 | 35 | 0.93 |
| 48 | 39 | 0.80 |
| 49 | 40 | 0.77 |
| 50 | 45 | 0.66 |

As illustrated in Table 1 and Table 2, Sa/Sb in the transparent electrode member illustrated in FIG. 44 and FIG. 50, based on the first method is in the range of 1±0.3, but Sa/Sb based on the second method is out of the range of 1±0.3. When Sa/Sb=1±0.3 is satisfied regarding the first method or the second method, the invisibility can be ensured, and when Sa/Sb=1±0.3 is satisfied regarding both of the first method and the second method, the invisibility can be more stably ensured. Sa/Sb based on the second method more preferably satisfies 1±0.2, particularly preferably satisfies 1±0.1.

The above content will be described from another perspective. A transparent electrode member according to the present embodiment can be manufactured by a manufacturing method characterized in that the partial regions PR are arranged at the lattice points of the lattice LT that is imaginarily defined along the first surface S1 when viewed in the direction of the normal to the first surface S1, the insulating layers 21 do not overlap the partial regions PR and are disposed on lines connecting some of the lattice points LP, and the diameter φ0 of the partial regions PR in terms of a circle, the width w of the insulating layers 21, and the lattice spacing p are set such that Sa/Sb described above satisfies 1±0.3.

FIG. 55 illustrates the structure of a capacitive sensor according to another embodiment of the present invention. As illustrated in FIG. 55, in a transparent electrode member 500 that is included in a capacitive sensor 1A according to an embodiment of the present invention, the first electrode coupling bodies 8 that include the first transparent electrodes 4 are disposed on the first surface S1 that is one of the two main surfaces of the base 2 having a sheet shape, and the second electrode coupling bodies 12 that include the second transparent electrodes 5 are disposed on a second surface S2 that is the other surface of the two main surfaces. The second transparent electrodes are arranged side by side in the second direction (specifically, the X1-X2 direction) that differs from the first direction (the Y1-Y2 direction) of in-plane directions of the second surface S2 and are electrically connected to each other.

Figure 56:
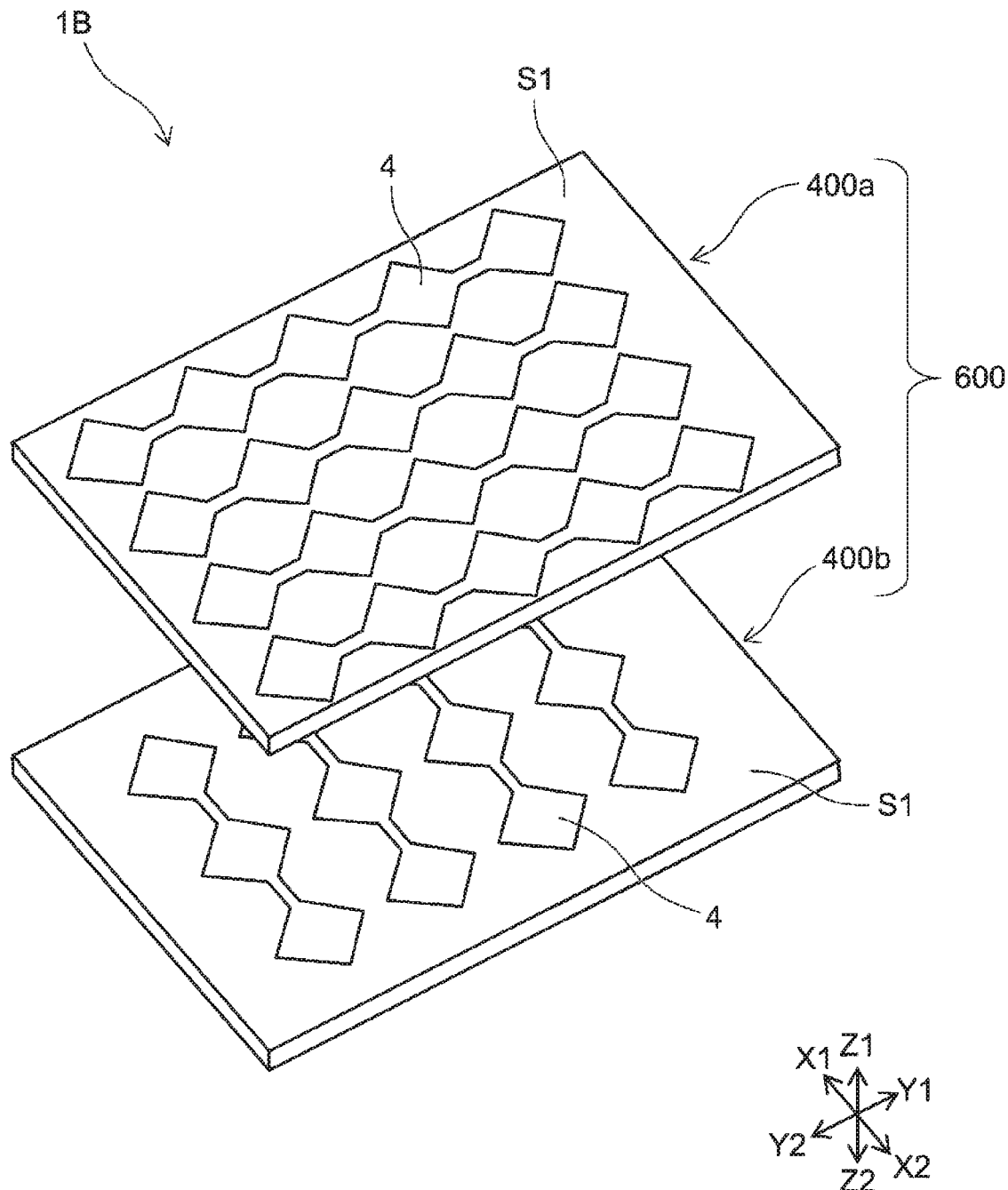
FIG. 56 illustrates the structure of a capacitive sensor according to another embodiment of the present invention.

FIG. 56 illustrates the structure of a capacitive sensor according to another embodiment of the present invention. As illustrated in FIG. 56, a capacitive sensor 1B according to an embodiment of the present invention includes a multilayer transparent electrode member 600 in which two transparent electrode members (a transparent electrode member 400a and a transparent electrode member 400b) are stacked in the direction of the normal to the first surface S1 (the Z1-Z2 direction). The first transparent electrodes 4 of the transparent electrode member 400a and the first transparent electrodes 4 of the transparent electrode member 400b are arranged such that the first directions of the two transparent electrode members (the transparent electrode member 400a and the transparent electrode member 400b) differ from each other. Specifically, in the transparent electrode member 400a relatively located at a position corresponding to Z1 in the Z1-Z2 direction, the first transparent electrodes 4 are arranged in the Y1-Y2 direction, and in the transparent electrode member 400b relatively located at a position corresponding to Z2 in the Z1-Z2 direction, the first transparent electrodes 4 are arranged in the X1-X2 direction.

What is claimed is:

1. A transparent electrode member comprising:
a translucent base having a first surface;
a plurality of transparent electrodes disposed on the first surface in a first region, each of the plurality of transparent electrodes being formed of a dispersion layer including a matrix made of an insulating material and conductive nanowires dispersed in the matrix, the dispersion layer including:
a conductive portion which has a first dispersion density of the conductive nanowires; and
an optical adjustment portion which has a second dispersion density of the conductive nanowires smaller than the first dispersion density; and an insulating layer disposed in an insulating region located in at least a part of a region surrounding the first region viewed from a normal direction which is normal to the first surface, wherein each transparent electrode includes, viewed from the normal direction:
- a conductive region formed of the conductive portion of the dispersion layer, and having a first conductivity; and
- an optical adjustment region formed of the optical adjustment portion of the dispersion layer, and having a second conductivity smaller than the first conductivity, wherein the optical adjustment region includes a plurality of discrete areas arranged in such a manner that each discrete area is disposed at a lattice point of a lattice defined along the first surface viewed from the normal direction, wherein the insulating layer is disposed, viewed from the normal direction, along a line connecting some lattice points at which the discrete areas are not disposed, and wherein when a plurality of rectangular regions are defined on the first surface such that four corners of each rectangular region are four adjacent lattice points with no other lattice points within the rectangular region, or such that four corners of each rectangular region are four adjacent lattice points surrounding a single lattice point as a center of the rectangular region, a first rectangular region is defined, among the rectangular regions, as that which only includes the conductive portion of the dispersion layer and the discrete areas disposed therewithin, a second rectangular region is defined, among the rectangular regions, as that which includes the conductive portion and at least part of the insulating layer, a portion of the first rectangular region other than the conductive portion is defined, which has an area Sa viewed from the normal direction, and a portion of the second rectangular region other than the conductive portion is defined, which has an area Sb viewed from the normal direction, then a relationship between the areas Sa and Sb satisfies following expression:

$$Sa/Sb = 1 \pm 0.3.$$

2. The transparent electrode member according to claim 1, wherein a minimum width of the insulating layer in a direction intersecting a direction in which the insulating layer extends, is 10 μm or more viewed from the normal direction.

3. The transparent electrode member according to claim 1, wherein the plurality of discrete areas are separated from each other by 30 μm or more.

4. The transparent electrode member according to claim 1, wherein an area ratio of the optical adjustment region per unit area in each transparent electrode is 40% or less.

5. The transparent electrode member according to claim 1, wherein the plurality of transparent electrodes include:
- a plurality of first transparent electrodes arranged in a first direction which is one of in-plane directions of the first surface, such that the first transparent electrodes adjacent to each other in the first direction are electrically connected to each other by a first transparent wire disposed therebetween, the first transparent wire being formed of the conductive portion of the dispersion layer; and
- a plurality of second transparent electrodes arranged in a second direction which is another of the in-plane directions of the first surface, such that the second transparent electrodes adjacent to each other in the second direction are electrically connected to each other by a second transparent wire, and wherein the first transparent wire and the second transparent wire partly overlap with each other in the normal direction, with an insulator interposed therebetween.

6. The transparent electrode member according to claim 5, wherein the second transparent wire is formed of a material having an electrical resistance higher than that of the second transparent electrodes.

7. The transparent electrode member according to claim 5, wherein the second transparent wire has end portions disposed on the adjacent second transparent electrodes, portions of the second transparent electrodes in contact with the second transparent wire being formed of the conductive region.

8. The transparent electrode member according to claim 1, wherein the translucent base is formed in a shape of a sheet having the first surface as one of two main surfaces thereof, and a second surface as the other of the two main surfaces, and wherein the plurality of transparent electrodes includes a plurality of second transparent electrodes disposed on the second surface and arranged in a second direction which is one of in-plane directions of the main surfaces, the second transparent electrodes adjacent to each other in the second direction being electrically connected to each other, the second direction being different from a first direction in which the transparent electrodes are arranged on the first surface.

9. A multilayer transparent electrode member comprising:
a pair of the transparent electrode members each according to claim 1, stacked in the normal direction,
wherein the pair of the transparent electrode members are arranged in such a manner that a direction in which the plurality of transparent electrodes of one of the pair of the transparent electrode members are arranged is different from a direction in which the plurality of transparent electrodes of the other of the pair of the transparent electrode members are arranged.

10. A capacitive sensor comprising:
the transparent electrode member according to claim 1; and
a detector configured to detect a change in capacitance between an operation body and the plurality of transparent electrodes.

* * * * *